United States Patent
Iwamoto et al.

(10) Patent No.: US 6,611,652 B1
(45) Date of Patent: Aug. 26, 2003

(54) VIDEO DATA RECORDING/REPRODUCING SYSTEM, AUDIO/VIDEO DATA RECORDING/REPRODUCING DEVICE, ITS SYSTEM, AND DATA REPRODUCING DEVICE

(75) Inventors: Tetsuya Iwamoto, Kanagawa (JP); Yoshinori Suzuki, Kanagawa (JP); Hiroshi Inamura, Kanagawa (JP); Atsumu Soda, Tokyo (JP); Tatsuji Yamazaki, Kanagawa (JP); Junichi Ogikubo, Tokyo (JP); Soichiro Niho, Kanagawa (JP); Nirokazu Ito, Kanagawa (JP); Hiroyuki Fujita, Kanagawa (JP); Yuichi Kojima, Kanagawa (JP)

(73) Assignee: Sony Corporation, Tokyo (JP)

( * ) Notice: Subject to any disclaimer, the term of this patent is extended or adjusted under 35 U.S.C. 154(b) by 625 days.

(21) Appl. No.: 08/860,537

(22) PCT Filed: Nov. 15, 1996

(86) PCT No.: PCT/JP96/03367

§ 371 (c)(1),
(2), (4) Date: Oct. 31, 1997

(87) PCT Pub. No.: WO97/18671

PCT Pub. Date: May 22, 1997

(30) Foreign Application Priority Data

Nov. 15, 1995 (JP) .............................. 7-297224
Dec. 20, 1995 (JP) .............................. 7-332296

(51) Int. Cl.[7] .............................. H04N 5/76; H04N 5/78
(52) U.S. Cl. .......................................... 386/46; 386/74
(58) Field of Search .............................. 386/46, 68, 80, 386/81, 52, 54, 65, 125, 74, 126, 116; 360/64

(56) References Cited

U.S. PATENT DOCUMENTS 5,164,839 A * 11/1992 Lang ........................... 386/101
5,576,907 A * 11/1996 Hasegawa ..................... 386/74
5,647,047 A * 7/1997 Nagasawa ..................... 386/52
5,687,160 A * 11/1997 Aotake et al. ............... 386/126

FOREIGN PATENT DOCUMENTS

| EP | 707311 | 4/1996 |
|----|--------|--------|
| JP | 6-236505 | 8/1994 |
| JP | 6-236506 | 8/1994 |
| JP | 8-115547 | 5/1996 |
| JP | 8-289246 | 11/1996 |
| JP | 8-336101 | 12/1996 |

* cited by examiner

*Primary Examiner*—Huy Nguyen
(74) *Attorney, Agent, or Firm*—Frommer Lawrence & Haug LLP; William S. Frommer

(57) ABSTRACT

An AV data input/output controlling circuit is connected through a data bus to a synchronous-asynchronous conversion circuit and through a control bus to a recording and reproduction controlling circuit. The AV data input/output controlling circuit inputs and outputs audio and/or video data of a normal data rate. The AV data input/output controlling circuit also inputs and outputs audio and/or video data of a higher data rate than usual. In the data recording and reproducing apparatus, audio and/or video data is transferred through a data bus synchronized with a reference synchronization signal S28 etc., the audio and/or video data input from an external unit is recorded in a storage device, and the audio and/or video data recorded in the storage device is reproduced and supplied to the outside.

9 Claims, 22 Drawing Sheets

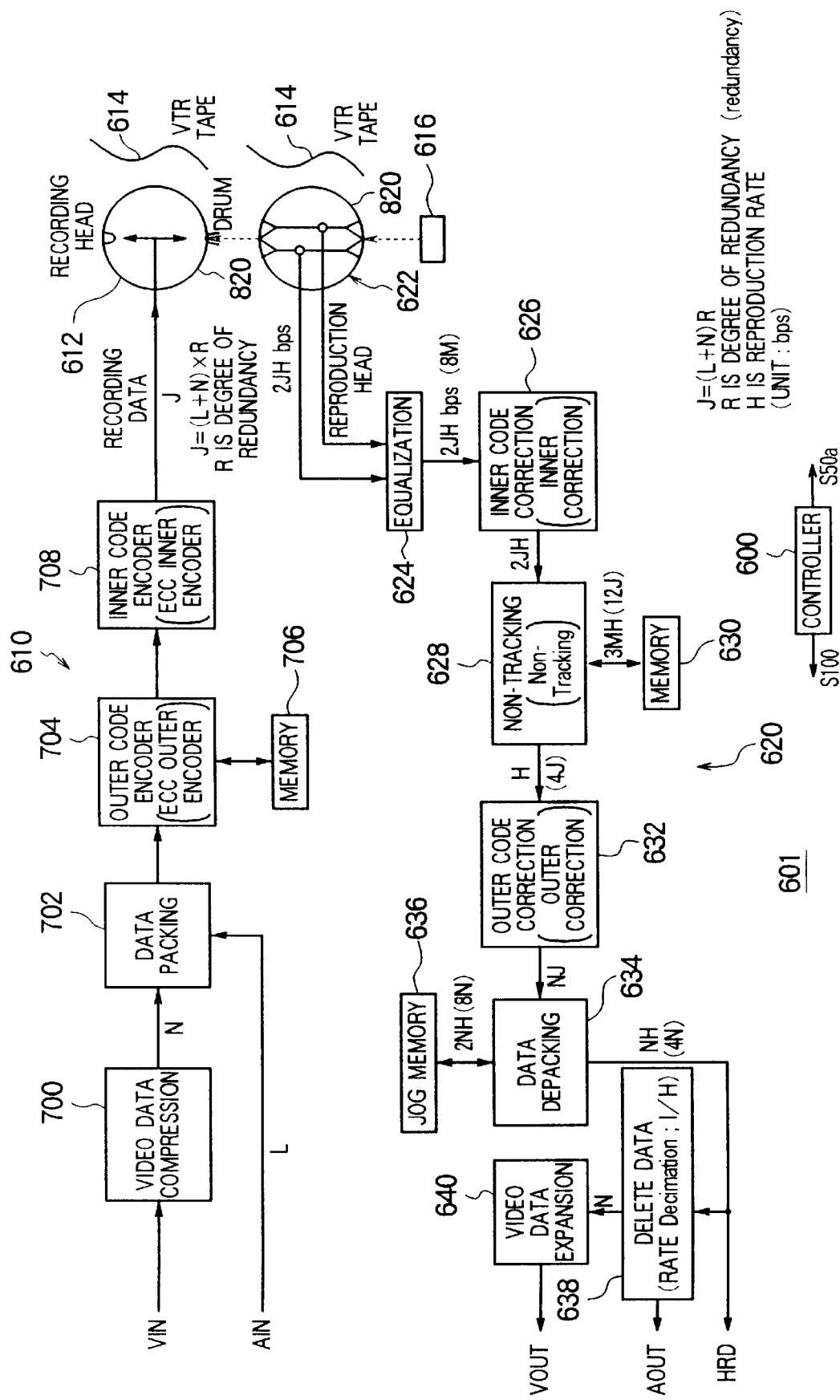

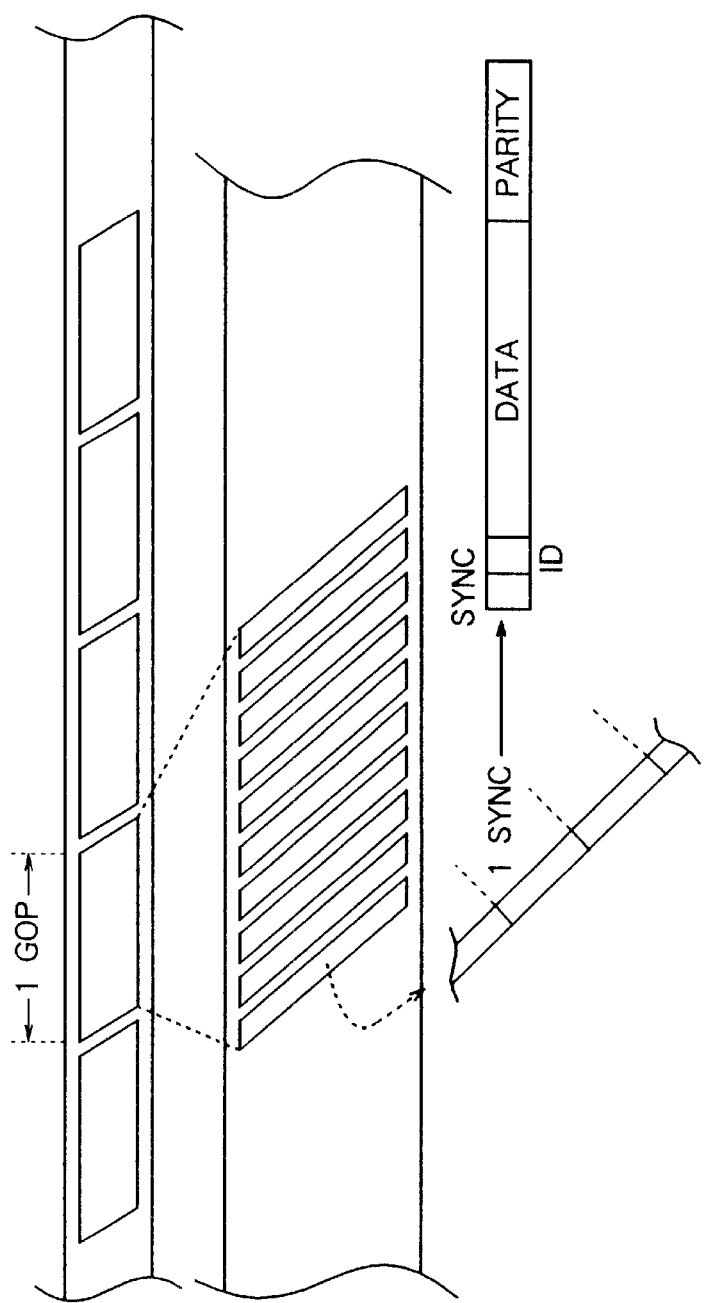

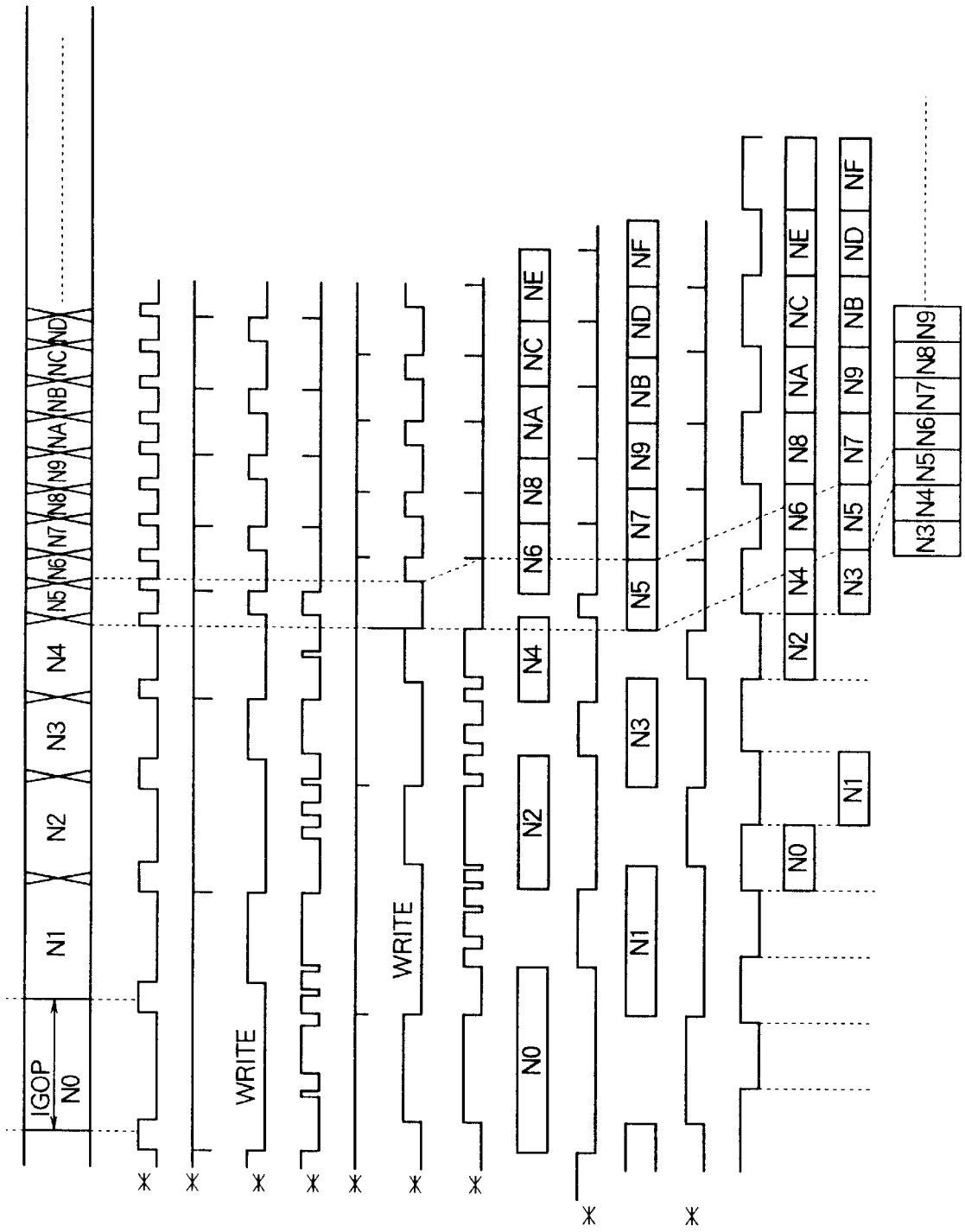

VIDEO DATA RECORDING/REPRODUCING SYSTEM, AUDIO/VIDEO DATA RECORDING/REPRODUCING DEVICE, ITS SYSTEM, AND DATA REPRODUCING DEVICE

TECHNICAL FIELD

The present invention relates to a video data recording and reproducing system, an audio and/or video data recording and reproducing apparatus and a system for the same, and a data reproducing means for recording audio and video data, or one of the same (audio and/or video data), of digital format and reproducing the recorded audio and/or video data.

BACKGROUND ART

For example, in a television broadcasting station, a video to be telecast in a news program etc. is usually produced by recording the videos (source video or stock videos) and sound serving as the basis of the video to be telecast by a TV camera etc. with a built in video tape recorder (VTR apparatus) on video tapes, individually managing these, then having an editor, if necessary, use a VTR apparatus in an editing room to reproduce one or more sets of the audio and/or video data (AV data) recorded on the video tapes, combine the reproduced stock videos, and record the video to be actually broadcast on another tape.

However, when managing stock video signal in a state recorded on video tapes, the work efficiency for selecting the necessary video from among a large number of stock video signals becomes bad and there also exists a need for conveying the tape on which the stock video signal is recorded from the storage place to the editing room. Further, it is hard for a number of editors to share stock video signal. Such a disadvantage is particularly conspicuous where a large number of stock video signals are used for the production of one news video.

Further, a news video signal produced on a VTR tape is generally manually carried to and loaded in a VTR apparatus for transmitting the program or a cart machine wit a built-in VTR apparatus for transmitting the program. However, it is also necessary to perform operations such as management of the news video at the stage of transmitting the program or a change of the order transmission by hand, so the efficiency is poor and mistakes due to human error may occur, so there is insufficient reliability.

In order to overcome such a disadvantage, use is made of a so-called server system used in a computing system enabling centralized management and use of the stock video or the video for broadcasts and common use of stock video.

However, a conventional server system of the same configuration as a computer is not always suitable for recording and reproducing high quality audio and/or video data in a television broadcasting station. The reason for this will be explained below. The data transfer capability of the bus is insufficient and the system size or expandability of the system is limited, copying (dubbing) of the audio and/or video data takes a relatively long time, synchronous connection with existing broadcasting equipment is difficult, the absolute amount of the system delay time is large and not constant, there is a possibility that audio and/or video data compressed and coded with a high compression rate will end up deteriorating to an extent where it cannot be used for television broadcasting, and other numerous disadvantages will arise.

The present invention was made in consideration with the above disadvantages of the prior art and has as its object to provide a video data recording and reproducing system and an audio and/or video data recording and reproducing apparatus and its system which enable dubbing of audio and/or video data from a VTR or other audio and/or video data reproducing apparatus to a recording and reproducing apparatus in a server system in a relatively short time.

Another object of the present invention is to provide a video data recording and reproducing system and an audio and/or video data recording and reproducing apparatus and its system which enable audio and/or video data to be reproduced at a high speed so as to enable dubbing of audio and/or video data in a recording and reproducing apparatus in a server system in a relatively short time.

Still another object of the present invention is to provide a video data recording and reproducing system and an audio and/or video data recording and reproducing apparatus and its system which, in a broadcast system of a television broadcasting station, enable the size and function of the server system for the audio and/or video data to be changed corresponding to the size of operations of each television broadcasting station or the type of operations to which the broadcast system is applied in the same television broadcasting station, which can be easily changed in function and structure, and which are low in cost.

Yet another object of the present invention is to provide a video data recording and reproducing system and an audio and/or video data recording and reproducing apparatus and its system which can handle audio and/or video data in slave synchronization with a reference synchronization signal etc. input from an external unit by taking into account the fact that the sending and transmission of the audio and/or video data is usually performed in strict synchronization with the reference synchronization signal or the time code in a broadcast system in a television broadcasting station and taking into account the ease of connection to the already existing broadcasting equipment.

Further, still another object of the present invention is to provide a video data recording and reproducing system and an audio and/or video data recording and reproducing apparatus and its system which can eliminate as many of the parts causing the system delay time in the audio and/or video data handled and thereby reduce the system delay time and, when operating under the control of an external control device, which can quickly adapt to control from the external control device by having the control commands from the external control device directly supplied to the portion performing the processing.

Further, another object of the present invention is to provide a video data recording and reproducing system and an audio and/or video data recording and reproducing apparatus and its system wherein the audio and/or video data are transferred and exchanged in synchronization with the reference synchronization signal as much as possible in the broadcast system and the portions requiring the synchronous/asynchronous conversion processing can be reduced.

Further, still another object of the present invention is to provide an audio a video data recording and reproducing system and an audio and/or video data recording and reproducing apparatus and its system enabling the transfer and exchange of base band digital audio and/or video data.

Still another object of the present invention is to provide a non-tracking type magnetic tape data reproducing apparatus (VTR apparatus) with which multiple speed reproduction is possible while using mechanical parts having a precision equivalent to that of a VTR apparatus performing normal speed reproduction.

Also, another object of the present invention is to provide a non-tracking type magnetic tape data reproducing apparatus with which multiple speed reproduction is possible without use of special high speed operating parts in an equalizing processing circuit or an error correction processing circuit etc.

Further, still another object of the present invention is to provide a magnetic tape data reproducing apparatus wherein the performances of other special reproduction processing facilities, for example, the jog shuttle reproduction facility, are enhanced by actively using the components used for realizing the multiple speed reproduction.

DISCLOSURE OF THE INVENTION

To attain the above object, the video recording and reproducing system according to the present invention is a video data recording and reproducing system provided with a recording and reproducing apparatus having a recording and reproducing means for recording and reproducing video data and an input/output controlling means for supplying to the recording and reproducing means the video data supplied from the outside and a reproducing apparatus having a reproducing means for reproducing the video data from a recording medium and supplying it to the input/output controlling means and a controlling means for controlling the reproducing means so as to reproduce the video data from the recording medium at a designated reproduction speed, characterized in that the controlling means of the reproducing apparatus inquires about the reproduction speed of the video data to the input/output controlling means of the recording and reproducing apparatus, receives reproduction speed authorization data or reproduction speed designation data supplied from the input/output controlling means and controls the reproducing means of the reproducing apparatus so as to reproduce the video data from the recording medium at the designated speed based on the received reproduction speed authorization data or reproduction speed designation data.

Further, an audio and/or video data recording and reproducing apparatus according to the present invention has a recording and reproducing means for recording and reproducing audio and/or video data; a first input/output controlling means for receiving a control input signal from an external unit and inputting and outputting the audio and/or video data of a first data rate with the recording and reproducing means in accordance with the received control input signal; a second input/output controlling means for receiving the control input signal and inputting and outputting the audio and/or video data of a second data rate higher than the first data rate with the recording and reproducing means in accordance with the received control input signal; and a recording and reproduction controlling means for transmitting and receiving a predetermined control signal to and from at least the first input/output controlling means and the second input/output controlling means and controlling the input/output controlling means of the first input/output controlling means and the second input/output controlling means.

Preferably, the recording and reproduction controlling means has a recording region assigning means for receiving a notification of a recording request signal requesting the recording of the input audio and/or video data input from the external unit to the recording and reproducing means from the first input/output controlling means and the second input/output controlling means and assigning the recording regions of the recording and reproducing means in which the input audio and/or video data is to be recorded and a recording region notifying means for notifying the first input/output controlling means and the second input/output controlling means of the recording region notification signal indicating the recording regions of the recording and reproducing means assigned to the input audio and/or video data and each of the first input/output controlling means and the second input/output controlling means has a recording request notifying means for notifying the recording and reproduction controlling means of the recording request signal from the external unit and a recording controlling means for receiving the recording region notification signal and controlling the recording and reproducing means and making the same record the input audio and/or video data in the recording regions of the recording and reproducing means indicated by the received recording region notification signal.

Preferably, the recording and reproducing control means has a recording region searching means for receiving the notification of the reproduction request signal requesting the reproduction of the audio and/or video data recorded in the recording and reproducing means and output of the same to the external unit from the input/output controlling means and searching for the reproduction regions of the recording and reproducing means in which the audio and/or video data for which the reproduction was requested is recorded and a reproduction region notifying means for notifying the first input/output controlling means of the reproduction region notification signal indicating the reproduction regions of the recording and reproducing means found as a result of search; each of the first input/output controlling means and the second input/output controlling means has a recording and reproduction notifying means for receiving the reproduction request signal from the external unit and notifying the recording and reproduction controlling means of the same, a reproduction controlling means for receiving the reproduction region notification signal from the reproduction region notifying means of the recording and reproduction controlling means and controlling the recording and reproducing means, reproducing the input audio and/or video data from the reproduction regions of the recording and reproducing means indicated by the received reproduction region notification signal, and outputting the same to the external unit, and an ending notifying means for receiving an audio and/or video data ending signal indicating the ending of the audio and/or video data for which the reproduction was requested from the recording and reproducing means and notifying the external unit of the same; and the recording and reproducing means has an audio and/or video data ending means for notifying the first input/output controlling means of the audio and/or video data ending signal indicating the ending of the audio and/or video data when the reproduced audio and/or video data is ended.

Preferably, the first input/output controlling means, the second input/output controlling means, and the recording and reproducing means are connected via a same data bus and the first input/output controlling means, the second input/output controlling means, and the recording and reproducing means are connected via the same control bus.

Preferably, the recording and reproducing means records and reproduces audio and/or video data with respect to a recording medium capable of recording and reproducing audio and/or video data of a base band of the first data rate.

In the audio and/or video data recording and reproducing apparatus according to the present invention, the recording and reproducing means records the audio and/or video data on a predetermined recording medium such as a hard disc, magneto-optical disc, semiconductor memory, or VTR tape.

The first input/output controlling means is used for the input/output of the audio and/or video data of the usual data rate (first data rate; in real time) obtained by reproducing from the VTR tape by for example a VTR apparatus at a usual speed (normal speed). To the first input/output means is connected, for example, a control device controlling the audio and/or video data recording and reproducing apparatus according to the present invention, for example, an editing apparatus. Each of the input/output controlling devices receives the control input signal. When the received control input signal is a recording request signal requesting for example the recording and reproducing means to record the audio and/or video data, the input/output controlling means receiving this signal notifies the recording and reproduction controlling means of the recording request signal via the bus for control.

The recording and reproduction controlling means receiving the notification of the recording request signal assigns recording regions of the recording and reproducing means to the input audio and/or video data to be input for the recording and returns a recording region notification signal indicating the assigned recording regions to the input/output controlling means.

The input/output controlling means controls the recording and reproducing means, transfers the input audio and/or video data via the data bus, and makes the recording and reproducing means record the audio and/or video data in the notified recording regions.

When the received control input signal is for example a reproduction request signal requesting reproduction of the audio and/or video data recorded in the recording and reproducing means and output of the same to the external unit, the input/output controlling means receiving this signal notifies the recording and reproduction controlling means of the reproduction request signal via the control use bus.

The recording and reproduction controlling means receiving the notification of the reproduction request signal searches for the recording regions of the recording and reproducing means in which the audio and/or video data for which the reproduction was requested is recorded and returns a reproduction region notification signal indicating the found recording regions to the input/output controlling means via the control use bus.

The second input/output controlling means is used for the input/output of audio and/or video data of a high speed data rate (second data rate; not in real time) obtained by reproducing from the VTR tape by for example a VTR apparatus while shortening the reproduction time to ½ or ⅓ and to which for example a high speed transmission device is connected and performs similar processing to that of the first input/output means.

The input/output controlling means controls the recording and reproducing means via the control use bus and makes the same reproduce the audio and/or video data for which the reproduction was requested from the recording regions indicated by the reproduction region notification signal.

When the recording and reproducing means ends the reproduction of the audio and/or video data for which the reproduction was requested, an audio and/or video data ending notification signal indicating the completion of the reproduction processing (ending of the audio and/or video data for which the reproduction was requested) is returned to the input/output controlling means via the control use bus. The input/output controlling means further notifies this fact to the control device connected to the external unit.

Further, an audio and/or video data recording and reproducing system according to the present invention has a plurality of audio and/or video data recording and reproducing apparatuses; each of the audio and/or video data recording and reproducing apparatuses having a recording and reproducing means for recording and reproducing the audio and/or video data, a first input/output controlling means for receiving a control input signal from the external unit and inputting and outputting audio and/or video data of a first data rate with the recording and reproducing means in accordance with the received control input signal, a second input/output controlling means for receiving a control input signal and inputting and outputting audio and/or video data of a second data rate higher than the first data rate with the recording and reproducing means in accordance with the received control input signal, and a recording and reproduction controlling means for transmitting and receiving a predetermined control signal to and from at least the first input/output controlling means and the second input/output controlling means and controlling the first input/output controlling means and the second input/output controlling means; the recording and reproduction controlling means having a recording region assigning means for receiving a notification of a recording request signal requesting the recording of the input audio and/or video data input from the external unit to the recording and reproducing means from the first input/output controlling means and the second input/output controlling means and assigning recording regions of the recording and reproducing means in which the input audio and/or video data is to be recorded and a recording region notifying means for notifying the first input/output controlling means and the second input/output controlling means of the recording region notification signal indicating the recording regions of the recording and reproducing means assigned to the input audio and/or video data; and each of the first input/output controlling means and the second input/output controlling means having a recording request notifying means for notifying the recording and reproduction controlling means of the recording request signal from the external unit and a recording controlling means for receiving the recording region notification signal and controlling the recording and reproducing means and making the same record the input audio and/or video data in the recording regions of the recording and reproducing means indicated by the received recording region notification signal; and the second input/output controlling means of the plurality of audio and/or video data recording and reproducing apparatuses are connected, and the audio and/or video data of the second data rate is transmitted and received between these audio and/or video data recording and reproducing apparatuses.

Further, the data reproducing apparatus according to the present invention is a data reproducing apparatus having a rotary drum, n (n≧2) number of data reading head means disposed on an outer peripheral surface of the rotary drum, and a data reproducing means and reproducing recorded data alternately recorded on helical tracks of the tape recording medium at a first azimuth angle and a second azimuth angle by using identification data recorded on the helical tracks and indicating an order of the recorded data, in which the rotary drum rotates at a constant rotational speed to make the n number of data reading head means scan the helical tracks; each of the n number of data reading head means has two first reproducing heads which scan the helical tracks said helical track given the first azimuth angle and a helical track separated by one track distance and read the recorded data and the identification data and two second reproducing heads which scan the helical tracks said helical track given the first azimuth angle and a helical track separated by one track distance and read the recorded data and the identification data; the data reproducing means has an error detecting means for detecting the error of each of the identification data and the recorded data read by the n number of data reading head means, a data selecting means for selecting each recorded data having the smallest error from among the recorded data read by each of the n number of data reading head means, and a data arranging means for arranging the recorded data selected based on the identification data corresponding to each of the selected recorded data in the order of the time of the recording and outputting the same.

Preferably, the data reproducing means has a plurality of error detecting means which are provided individually corresponding to the n number of data reading head means or parts and detect the error of each of the recorded data read by the respectively corresponding data reading head means and a plurality of data selecting means which are provided individually corresponding to the n number of data reading head means or parts and select the recorded data having the smallest error from among the recorded data whose error was detected by the respectively corresponding error detecting means; and the data arranging means arranges and outputs the recorded data selected by each of the n number of data selecting means in the order of the time of recording based on the corresponding identification data.

Preferably, the tape recording medium travels at a travelling speed of m times ($2 \leq |m| \leq n$) the travelling speed when reproducing the recorded data at normal speed; the rotary drum rotates at a rotational speed corresponding to the travelling speed of the tape recording medium when reproducing the recorded data at normal speed to make the n number of data reading head means scan the helical tracks; the n number of data reading head means scanning the helical tracks read the recorded data and the identification data from each of the scanned helical tracks; and the data reproducing means arranges the recorded data read by the m number of data reading head means among the n number of data reading head means in the order of the time of the recording based on the corresponding identification data and outputs the recorded data at m×speed.

Preferably, the recorded data is audio and/or video data; the tape recording medium travels at a travelling speed different from the travelling speed when reproducing the audio and/or video data at normal speed; the rotary drum rotates at a rotational speed corresponding to the travelling speed of the tape recording medium to makes all or one part of the n number of data reading head means scan the helical tracks; each of the data reading head means scanning the helical tracks reads the audio and/or video data and the identification data from each of the scanned helical tracks; the data reproducing means further has a buffering means for buffering the audio and/or video data arranged in the order of the time of recording and outputting the same; and the audio and/or video data read by the data reading head means scanning the helical tracks is sequentially output to perform jog shuttle reproduction.

In the VTR apparatus (data reproducing apparatus) according to the present invention, the helical tracks of the tape recording medium (VTR tape), which have alternately Inverting azimuth angles, are scanned by n (for example n=4) number of data reading head means each having two positive azimuth angle (first azimuth angle) reproducing heads (positive azimuth heads: first reproducing heads) and two negative azimuth angle (second azimuth angle) reproducing heads (negative azimuth heads: second reproducing heads) disposed on the tape travelling surface of the drum (rotary drum) at symmetrical positions with respect to the center of rotation of the rotary drum at one helical track's worth of intervals.

Further, in the data reproducing apparatus according to the present invention, the recorded data having a smaller amount of error is selected from among 8 (2×n) sets of recorded data (audio and/or video data) reproduced by the 8 (2×n) reproducing heads (first reproducing heads or second reproducing heads) having coincident azimuth angle among these 4×4 (4×n) reproducing heads and output, thereby to reproduce the audio and/or video data by a so-called non-tracking system.

The rotary drum rotates at the same rotational speed as that by the normal speed reproduction even in a case where multiple speed reproduction, for example, 2×speed reproduction, is carried out, to make the four (n) data reading head means scan all of the helical tracks of the tape recording medium.

On the tape recording medium, identification data indicating the order of the audio and/or video data is recorded together with the audio and/or video data. The four data reading head means scanning the helical tracks individually read four, i.e., a total of 4×2, sets of audio and/or video data and identification data.

The error detecting means of the data reproducing means detects the error of the 4×2 sets of audio and/or video data read by each two of the data reading head means having azimuth angles coincident with that of the helical tracks being scanned by one of the four reproducing heads and correctly tracing the helical tracks by using, for example, the error correction code added to the audio and/or video data.

The data selecting means selects the audio and/or video data having the smallest error from among the four sets of audio and/or video data read by each of the two data reading head means as the audio and/or video data read by the reproducing heads (either of two first reproducing heads or two second reproducing heads) having coincident azimuth angle and correctly tracing the helical tracks. That is, the data selecting means selects two sets of audio and/or video data individually corresponding to the two data reading head means from among the 4×2 sets of audio and/or video data read by the two data reading head means.

The data arranging means arranges and outputs the selected two sets of audio and/or video data in the order of the time of the recording based on the corresponding identification data.

Note that, where the data reproducing apparatus according to the present invention performs 4×speed reproduction, the tape recording medium is made to travel at a speed four times the speed at normal speed reproduction, the audio and/or video data is read by using all of the four data reading head means, four sets of audio and/or video data individually corresponding to the four data reading head means are selected from among the read 4×4 sets of audio and/or video data, and these are arranged in the order of the time of the recording and output.

Further, where the data reproducing apparatus according to the present invention performs normal speed reproduction, the tape recording medium is made to travel at the speed of the time of the normal speed reproduction, the audio and/or video data is read by using one of the four data reading head means, one set of audio and/or video data is selected from among read four sets of audio and/or video data, and this is arranged in the order of the time of the recording and output.

BRIEF DESCRIPTION OF THE DRAWINGS

The above objects and features of the present invention will become clearer from the following description given with reference to the appended drawings, in which:

FIG. 13 is view of the configuration of a VTR apparatus according to a sixth embodiment of the present invention;

FIGS. 16A to 16C are views showing a recording format when recording data (FIGS. 14A and 14B) on the VTR tape (FIG. 13);

FIGS. 19A to 19P are timing charts showing the operation timing of components of the reproduction unit shown in FIG. 17;

BEST MODE FOR CARRYING OUT THE INVENTION

Server System Adopting Same Configuration as Computer

To further clarify the objects and features of the present invention and make them easier to understand, before explaining the embodiments, an explanation will be given of a server system adopting the same configuration as a computer.

Figure 1:
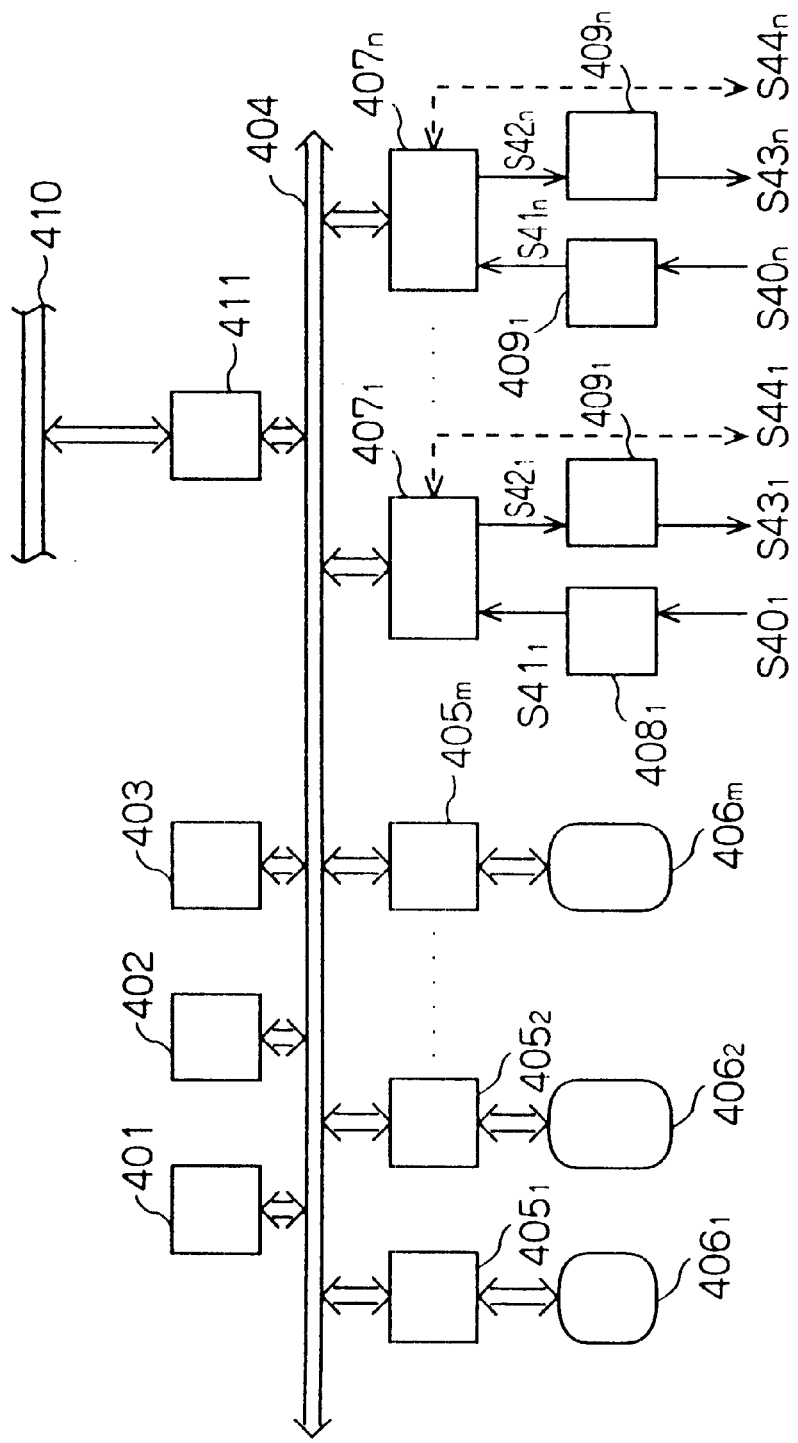
FIG. 1 is a view of an example of the configuration of a server system for audio and/or video data adopting the same configuration as a computer.

FIG. 1 is a view of an example of the configuration of a conventional server system 8 for audio and/or video data.

As shown in FIG. 1, the server system 8 is basically constituted by fundamental components of a computer, that is, a CPU 401, ROM 402, RAM 403, high speed bus 404, a data recording and reproducing apparatus $406_m$ connected via a device interface $405_m$, an audio and/or video data compressing means $408_n$ connected via an input/output interface $407_n$, and an audio and/or video data expanding means $409_n$ corresponding to the audio and/or video data compressing means $408_n$.

Further, when the server system 8 is realized on a computer different from the host application system, a LAN use interface 411 connecting a LAN 410 and the server system 8 is provided.

When the server system 8 records the audio and/or video data, the audio and/or video data compressing means $408_n$ compresses the input audio and/or video data $S40_n$ to generate the compressed audio and/or video data $S41_n$ and transfers the same via the input/output interface $407_n$ to the high speed bus 404.

The compressed audio and/or video data transferred to the high speed bus 404 is usually temporarily stored (buffered) in the RAM 403 for the data flow rate control etc. and then transferred to the bus 404 again and appropriately recorded in the data recording and reproducing apparatus $406_m$ via the device interface $405_m$.

Further, when the server system 8 reproduces the audio and/or video data, the compressed audio and/or video data recorded in the data recording and reproducing apparatus $406_n$ is reproduced and then transferred via the device interface $405_m$ to the high speed bus 404.

The compressed audio and/or video data transferred to the high speed bus 404 is buffered in the RAM 403 for the data flow rate control etc. similar to that at the time of recording, is transferred again to the high speed bus 404, passes through the input/output interface $407_n$, and becomes the input data $S42_n$ to the audio and/or video data expanding means $409_n$.

The audio and/or video data expanding means $409_n$ decodes the video signal $S43_n$ from the input data $S42_n$ and outputs the same from the system.

When the server system 8 records and reproduces the audio and/or video data, the operations of all of the input/output interface $407_n$, the high speed bus 404, and the device interface $405_m$ are controlled by the CPU 401 based on the command transferred from the application system via the LAN 410, LAN use interface 411, high speed bus 404, and the RAM 403.

Figure 4:
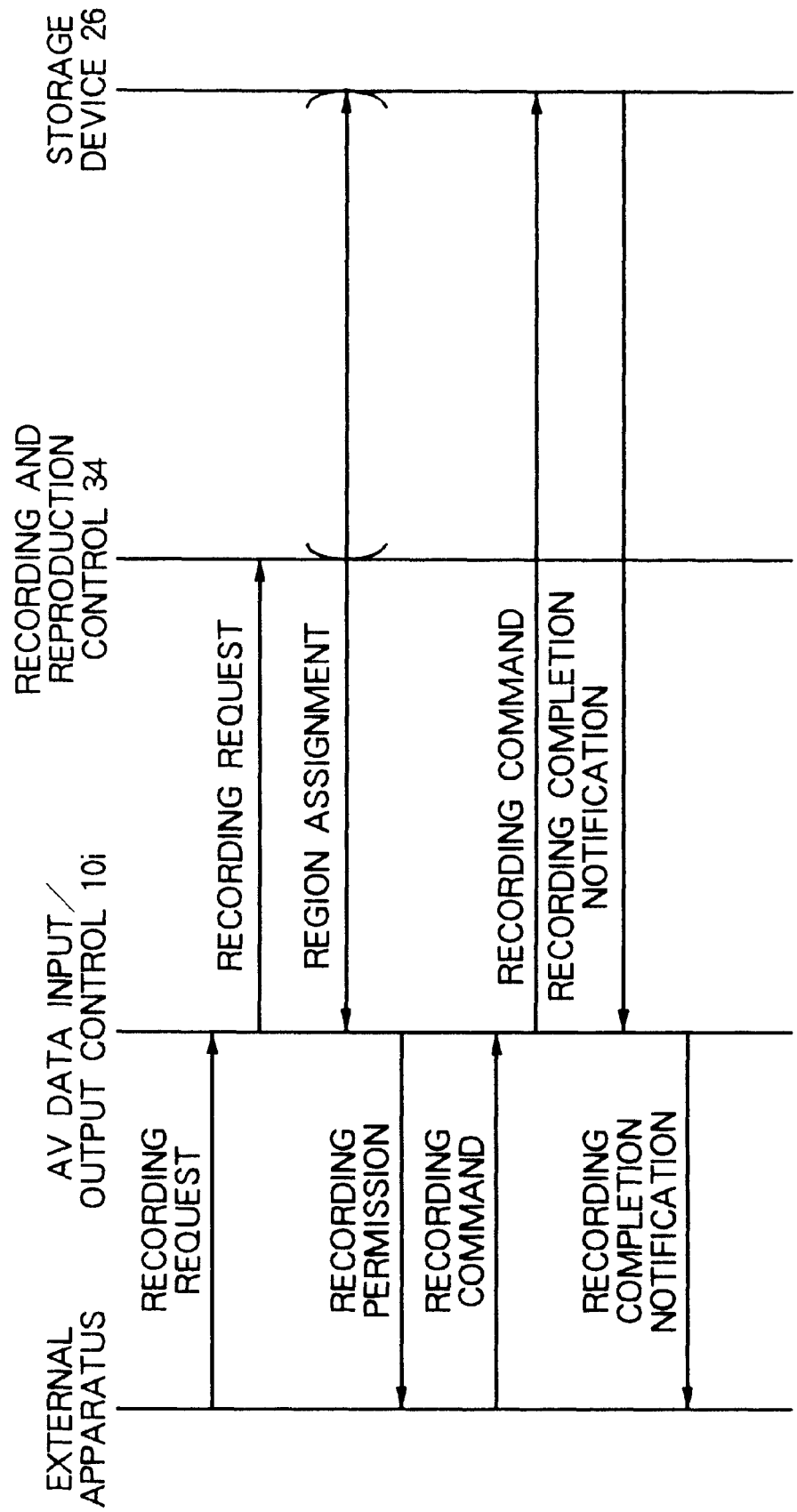
FIG. 4 is a view showing a signal sequence between components of a data recording and reproducing apparatus where the audio and/or video data is recorded in a storage device shown in FIG. 2.

Note that when the operation command is supplied from not the application system, but the input/output side of the video signal, a control line S44$_n$ connected to the input/output interface 407$_n$ as indicated by a broken line in FIG. 4 becomes necessary. In this case, the command supplied from the control line S44$_n$ is communicated to the CPU 401 via the input/output interface 407$_n$, high speed bus 404, and the RAM 403, and the CPU 401 controls the operation of the input/output interface 407$_n$, high speed bus 404, and the device interface 405$_m$ based on the command supplied from the control line S44$_n$.

However, the server system 8 shown in FIG. 1 is not always suitable for recording and reproducing high quality audio and/or video data in a television broadcasting station. The reason for this will be explained below.

First, when the server system 8 handles high quality audio and/or video data of a level that is used in a television broadcasting station, the data transfer capability of the bus is insufficient and the system size or expandability of the system is limited.

That is, the data rate of the current digital format of the audio and/or video data used for television is 100 Mbps or more. Also the coded audio and/or video data obtained by high efficient coding of this audio and/or video data has a data rate of about 30 Mbps (4 Mbytes/s) as disclosed in for example CCIR recommendation 723 taking into account deterioration due to the editing.

For example, in the server system 8, when eight editors want to perform editing work (so-called AB roll editing) at the same time using two stock videos of 30 Mbps (4 MBps), taking into account the necessity of buffering the audio and/or video data as mentioned above, as much as 48 sets of [=3 (due to the necessity of simultaneously reproducing two stock videos and recording one video after editing)×2 (two-way transmission for buffering)×8 (number of editors)] coded audio and/or video data will be simultaneously transferred on the high speed bus 404. Accordingly, the high speed bus 404 is required to have a valid data transfer rate of a minimum of 192 Mbps just for the transfer of the coded audio and/or video data.

Second, when the audio and/or video data is transferred to the input/output interface 407$_n$, there is a limitation inherent in a server system 8 in a television broadcasting station that instantaneous disconnection must not occur, therefore there also arises a problem of the processing capability of the CPU 401 controlling the high speed bus 404 and the RAM 403. In addition, the physical transfer speed of the bus in a high performance computer is usually about 100 Mbps. According to the configuration of the server system 8 shown in FIG. 1, realization of editing work in which as many as about eight editors commonly use stock video is not necessarily easy in terms of technology.

Third, when reproducing audio and/or video data from a VTR or other audio and/or video data reproducing apparatus and recording that audio and/or video data by a data recording and reproducing apparatus 406$_m$ of the server system 8 shown in FIG. 1, since the data transfer capability in the server system 8 is small, dubbing takes a relatively long time.

Fourth, when realizing a server system usable in a television broadcasting station, the server system must be brought into slave synchronization with a synchronization signal or time stamp supplied from an external unit.

Usually, the sending and transmission of audio and/or video data between the broadcasting equipment in a television broadcasting station are carried out in strict synchronization with a reference synchronization signal or time code for the audio and/or video data.

Accordingly, so as to connect the already existing apparatuses with the server system, it is necessary to perform the input and output (input/output) of the audio and/or video data of the server system in synchronization with a reference synchronization signal or the like. However, in the server system 8, which performs the transfer of the audio and/or video data by using a basically asynchronously operating computer, it is not always easy to perform the input/output of the audio and/or video data in synchronization with a reference synchronization signal or time code.

That is, in the server system 8 having the configuration shown in FIG. 1, when the transfer and exchange (routing) of the audio and/or video data are carried out by using the asynchronous high speed bus 404 and RAM 403, synchronous/asynchronous conversion processing for passing the audio and/or video data to be inherently transmitted in synchronization with the reference synchronization signal etc. through the asynchronous transfer system inside the server system 8 and then bringing the same into synchronization with the external reference synchronization signal again becomes necessary. Therefore the apparatus becomes large in size and also the manufacturing cost rises.

Fifth, in the server system 8 used in a television broadcasting station, a system delay occurs since the transfer and exchange of the audio and/or video data are carried out by using the asynchronous high speed bus 404 and RAM 403. This obstructs the operation of the television broadcasting station system.

Regarding the system delay of the server system 8, there arises a problem of the absolute amount of the system delay time and, in addition, the disadvantage of whether or not the system delay time has a constant value.

Due to the absolute amount of the system delay time of the server system 8, for example, when reproducing the audio and/or video data, buffering for the data flow rate control etc. becomes necessary at three positions of the device interface 405$_m$, RAM 403, and the input/output interface 407$_n$. It is basically difficult to satisfy the response performance required in editing work.

Further, as to the disadvantage of whether or not the system delay time is constant, the components serving as the basis of the system such as the CPU and the RAM of the server system 8 essentially operate asynchronously, therefore there is a good possibility of a change of the system delay time along with the elapse of time and it is not easy to guarantee a constant value.

Sixth, for example, in a television broadcasting station, where the recording and reproduction of the audio and/or video data to and from the server system 8 are controlled by a control device outside the server system 8, due to the time required for the control processing, synchronization between the external reference synchronization signal, etc. and the audio and/or video data sometimes becomes impossible or a system delay occurs. To control the server system 8 from an external control device, as indicated by a broken line in for example FIG. 1, it is necessary to connect the dedicate control line to the input/output interface 407$_n$.

Where the dedicated control line is connected to the input/output interface 407$_n$, however, the control command is communicated via the high speed bus 404 to the CPU 401 and communicated again via the high speed bus 404 to the device interface 405$_m$ and the input/output interface 407$_n$, therefore a delay time is caused in the communication per se of the command for control. Further, even if the delay time regarding the control is too short to cause a problem, the disadvantage of the system delay of the server system 8 remains.

Seventh, in the server system 8 used in a television broadcasting station, since the transfer and exchange of the audio and/or video data are carried out by using the high speed bus 404 and the RAM 403, it is necessary to raise the compression rate and transfer coded audio and/or video data suited to the transfer capability of the high speed bus 404. Accordingly, in the server system 8, the transfer and exchange of the base band digital audio and/or video data free from deterioration are difficult, and the high efficient coded audio and/or video data must be supplied to all broadcasting equipment connected to the server system 8.

The supply of high efficient coded audio and/or video data is an excellent technique for effective utilization of hardware resources. However, the quality of the audio and/or video data after expanding and decoding the high efficient coded audio and/or video data is always deteriorated. For this reason, there exists an occasional possibility of deterioration of the quality of the audio and/or video data after the expansion and decoding to an extent that the audio and/or video data cannot be used for a television broadcast.

The embodiments of the present invention shown below are configured so as to solve the problems of the server system 8 shown in FIG. 1.

First Embodiment

Below, a first embodiment of the present invention will be explained.

Figure 2:
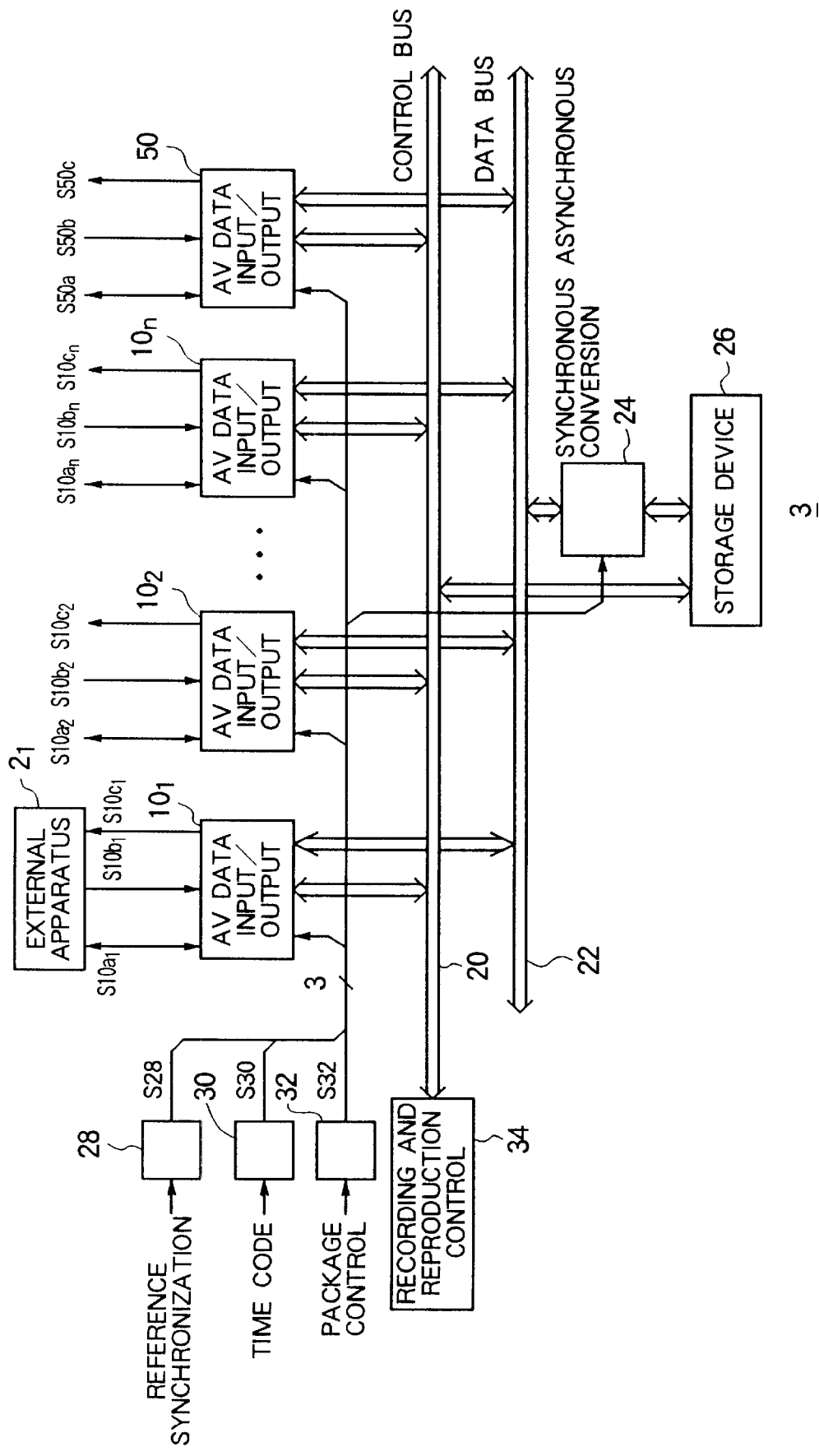
FIG. 2 is a view of the configuration of a data recording and reproducing apparatus according to a first embodiment of the present invention.

FIG. 2 is a view of the configuration of a data recording and reproducing apparatus 1 according to a first embodiment of the present invention.

As shown in FIG. 2, the data recording and reproducing apparatus 1 is constituted by n number of audio and/or video data input/output controlling circuits (AV data input/output controlling circuits) $10_1$ to $10_n$, a recording and reproduction controlling circuit 34, a synchronous-asynchronous conversion circuit 24, a storage device 26, a synchronization signal interface circuit (synchronization signal IF circuit) 28, a time code interface circuit (TCIF circuit) 30, and a multiplexing control interface circuit (multiplexing IF circuit) 32.

In the data recording and reproducing apparatus 1, the AV data input/output controlling circuits $10_1$ to $10_n$ and the synchronous-asynchronous conversion circuit 24 are connected to each other via a data bus 22, and the recording and reproduction controlling circuit 34, the AV data input/output controlling circuits $10_1$ to $10_n$, and the storage device 26 are connected to each other via a control bus 20.

Further, the AV data input/output controlling circuit $10_i$ receives as input a reference synchronization signal S28 from an external unit, for example, an external apparatus 2 (host controller system) such as an editing device, via the synchronization signal IF circuit 28 according to need, receives as input a time code S30 indicating the time of the audio and/or video data and used for the establishment of synchronization via the TCIF circuit 30, and receives as input a package control signal S32 controlling the operation of the AV data input/output controlling circuits $10_1$ to $10_n$ together via the multiplexing IF circuit 32.

In the data recording and reproducing apparatus 1, the transfer of audio and/or video data on the data bus 22 in synchronization with a reference synchronization signal and time code etc. input from an external unit is possible, and package input/output control with respect to a plurality of audio and/or video data becomes possible by connecting the host application system such as an editing apparatus via the AV data input/output controlling circuits $10_1$ to $10_n$.

By these components, the data recording and reproducing apparatus 1 disperses the load of the input/output control and the recording and reproduction control regarding the real time audio and/or video data obtained by reproducing the audio and/or video data from for example the VTR apparatus at normal speed (usual speed), simultaneously inputs and outputs the audio and/or video data of multiple channels, and records and reproduces the same.

Figure 3:
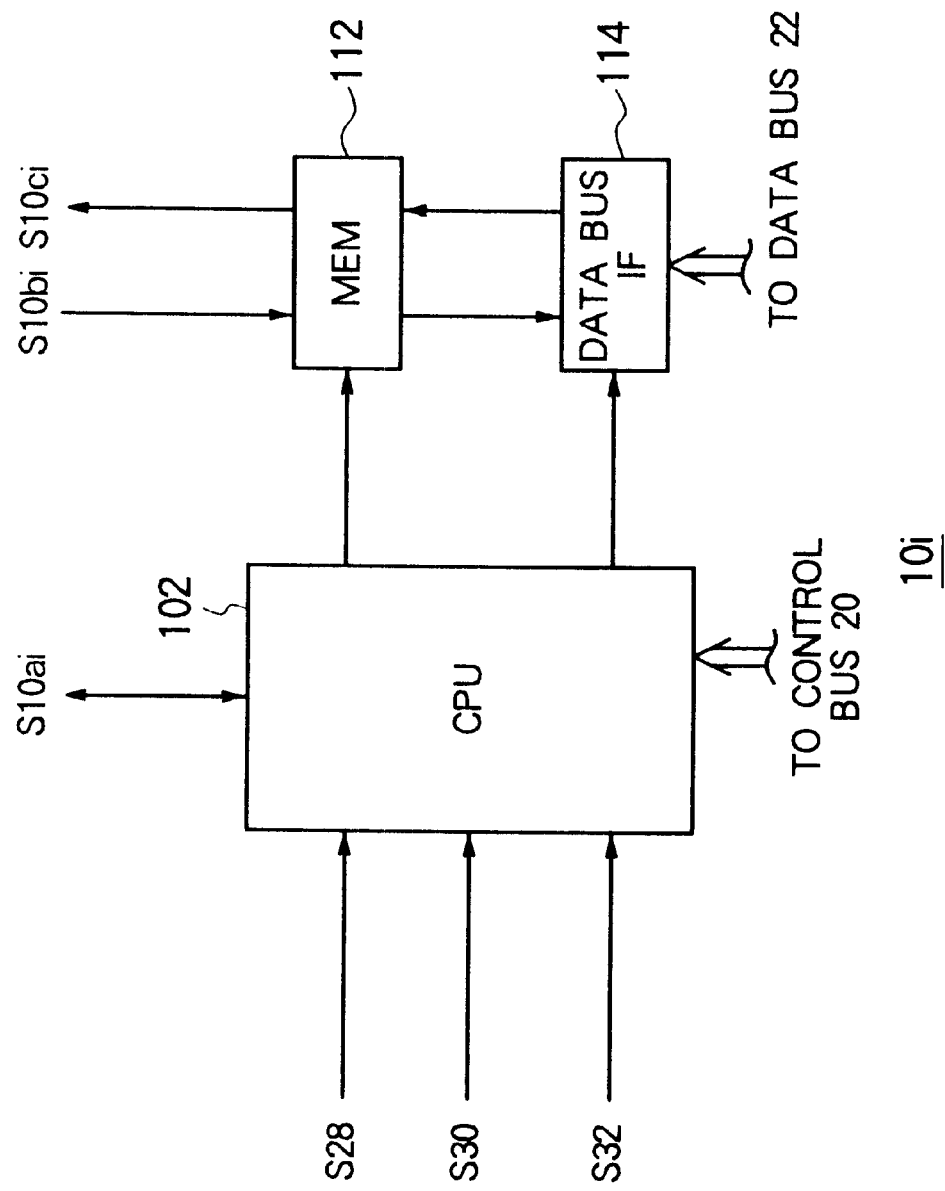
FIG. 3 is a view of the configuration of a first AV data input/output circuit.

FIG. 3 is a view of the configuration of the first AV data input/output controlling circuit $10_i$ (where, i is an integer: $1 \leq i \leq n$, the same for the following).

Where noncompressed audio and/or video data is input and output between the external apparatus 2 and the storage device 26, as shown in FIG. 3, use is made of the first AV data input/output controlling circuit $10_i$ constituted by a microprocessor (CPU) 102, a memory circuit (MEM) 112, and a data bus interface circuit (data bus IF) 114.

In the AV data input/output controlling circuit $10_i$, the microprocessor 102 is constituted by a one-chip microprocessor etc. with a built-in ROM storing for example the programs.

Further, the microprocessor 102 transmits and receives the control signal $S10a_i$ with the external apparatus 2 and transmits and receives the control signal with the recording and reproduction controlling circuit 34 via the control bus 20.

Further, the microprocessor 102 controls the operation of the memory circuit 112 and the data bus IF 114 and controls the input/output of the audio and/or video data between the external apparatus 2 and the storage device 26 based on the control signal input from the recording and reproduction controlling circuit 34, the control signal $S10a_i$ input from the external apparatus 2, and, if necessary, the reference synchronization signal S28 input via the TCIF circuit 30 and the multiplexing IF circuit 32, the time code S30, and the package control signal S32.

The data bus IF 114 inputs and outputs the audio and/or video data via the data bus 22 with the storage device 26 under the control of the microprocessor 102. That is, it outputs the audio and/or video data buffered in the memory circuit 112 to the storage device 26 (synchronous-asynchronous conversion circuit 24) and outputs the audio and/or video data input from the storage device 26 to the data memory circuit 112.

The memory circuit 112 buffers the audio and/or video data $S10b_i$ input from the external apparatus 2 under the control of the microprocessor 102 and outputs the same via the data bus IF 114 to the storage device 26 (synchronous-asynchronous conversion circuit 24).

Further, the memory circuit 112 buffers the audio and/or video data input from the storage device 26 via the data bus IF 114 and outputs the same as the audio and/or video data $S10c_i$ to the external apparatus 2.

Referring to FIG. 2 again, the components of the data recording and reproducing apparatus 1 other than the AV data input/output controlling circuit $10_i$ will be explained.

The recording and reproduction controlling circuit 34 transmits and receives the control signals with the AV data input/output controlling circuit $10_i$, the synchronous-asynchronous conversion circuit 24 and the storage device 26 via the control bus 20 and controls the operation of these components.

Further, the recording and reproduction controlling circuit 34 manages the recording regions of the storage device 26, determines the recording regions of the storage device 26 in which the audio and/or video data is to be recorded where it receives a recording request signal of the audio and/or video data with respect to the storage device 26 from the AV data input/output controlling circuit 10, notifies this to the AV data input/output controlling circuit $10_i$, and, when the reproduction of the audio and/or video data recorded in the storage device 26 is supplied from the AV data input/output controlling circuit $10_i$, searches for the recording regions of the storage device 26 in which the audio and/or video data to be reproduced is recorded and notifies the found recording regions to the AV data input/output controlling circuit $10_i$.

The synchronization signal IF circuit 28 receives a reference synchronization signal such as a house clock used for establishing synchronization of the broadcast equipment in the television broadcasting station in synchronization with the audio and/or video data $10b_i$ and $10c_i$ handled by the external apparatus 2 and supplies the same as the reference synchronization signal S28 to the AV data input/output controlling circuit $10_i$ and the synchronous-asynchronous conversion circuit 24.

The TCIF circuit 30 receives the time code, which is input from an external unit such as an external apparatus 2, indicates the elapsed time or display time of audio and/or video data etc., and is used for establishing synchronization between the audio and video in the external apparatus 2, and supplies the same as the time code S30 to the AV data input/output controlling circuit 101 and the synchronous-asynchronous conversion circuit 24.

The multiplexing IF circuit 32 receives the package control signal which is input from the external unit such as external apparatus 2, indicates the same processing content with respect to all of the AV data input/output controlling circuits $10_1$ to $10_n$, and controls them together, and supplies this as the package control signal S32 to the AV data input/output controlling circuits $10_1$ to $10_n$.

The synchronous-asynchronous conversion circuit 24 is used when the data transfer in synchronization with the reference synchronization signal S28 or the time code S30 is carried out on the data bus 22, asynchronously records the audio and/or video data input from the AV data input/output controlling circuit $10_i$ via the data bus 22 in synchronization with these signals in the storage device 26, and outputs the audio and/or video data asynchronously reproduced by the storage device 26 to the AV data input/output controlling circuit $10_i$ via the data bus 22 in synchronization with these signals.

The storage device 26 records the compressed and coded (time-compressed) audio and/or video data input from the AV data input/output controlling circuit $10_i$ via the data bus 22 and the synchronous-asynchronous conversion circuit 24 on the recording medium to and from which the data can be recorded and reproduced with a data rate of the audio and/or video data of the base band in real time, for example, a hard disc or semiconductor memory, under the control of the recording and reproduction controlling circuit 34 via the control bus 20 and reproduces the recorded audio and/or video data and outputs the same to the AV data input/output controlling circuit $10_i$ via the synchronous-asynchronous conversion circuit 24 and the data bus 22.

Note that, it is possible for the storage device 26 to independently and simultaneously record and reproduce a plurality of sets of audio and/or video data, and the plurality of AV data input/output controlling circuits $10_i$ can record and reproduce the audio and/or video data to and from the storage device 26 as if each of them had one VTR apparatus. By having such a storage device 26, it becomes possible to reproduce any part of the same stock data at any timing.

Below, the operation of the data recording and reproducing apparatus 1 will be explained.

FIG. 4 is a view showing a signal sequence between components of the data recording and reproducing apparatus 1 where the audio and/or video data is recorded in the storage device 26. Note that, in FIG. 4, special case processing such as a case where there is no empty recording region in the storage device 26 is omitted for simplification of the explanation.

As shown in FIG. 4, a recording request signal is output from the external apparatus 2 to the AV data input/output controlling circuit $10_i$ as the control signal $S10a_i$.

The AV data input/output controlling circuit $10_i$ receiving the recording request signal outputs the recording request signal to the recording and reproduction controlling circuit 34 via the control bus 20.

The recording and reproduction controlling circuit 34 receiving the recording request signal searches for empty recording regions of the storage device 26 and outputs a region assignment signal indicating the recording regions assigned to the audio and/or video data for which the recording was requested to the AV data input/output controlling circuit $10_i$ and the storage device 26.

The AV data input/output controlling circuit $10_i$ receiving the region assignment signal outputs the recording authorization signal to the external apparatus 2 as the control signal $S10a_i$.

The external apparatus 2 receiving the recording authorization signal outputs the recording command signal to the AV data input/output controlling circuit $10_i$. The AV data input/output controlling circuit $10_i$ outputs the recording command signal received to the storage device 26 via the control bus 20.

Further, the external apparatus 2 outputs the real time audio and/or video data $S10b_i$ (not illustrated in FIG. 4) for which the recording is requested to the storage device 26 to the AV data input/output controlling circuit $10_i$.

The audio and/or video data $S10b_i$ output by the external apparatus 2 is recorded in the storage device 26 via the AV data input/output controlling circuit $10_i$ and the data bus 22.

When the audio and/or video data is recorded in all of the recording regions assigned by the recording and reproduction controlling circuit 34, the storage device 26 outputs the recording completion notification signal to the AV data input/output controlling circuit $10_i$ via the control bus 20.

The AV data input/output controlling circuit $10_i$ receiving the recording completion notification signal outputs the recording completion notification signal to the external apparatus 2.

Figure 5:
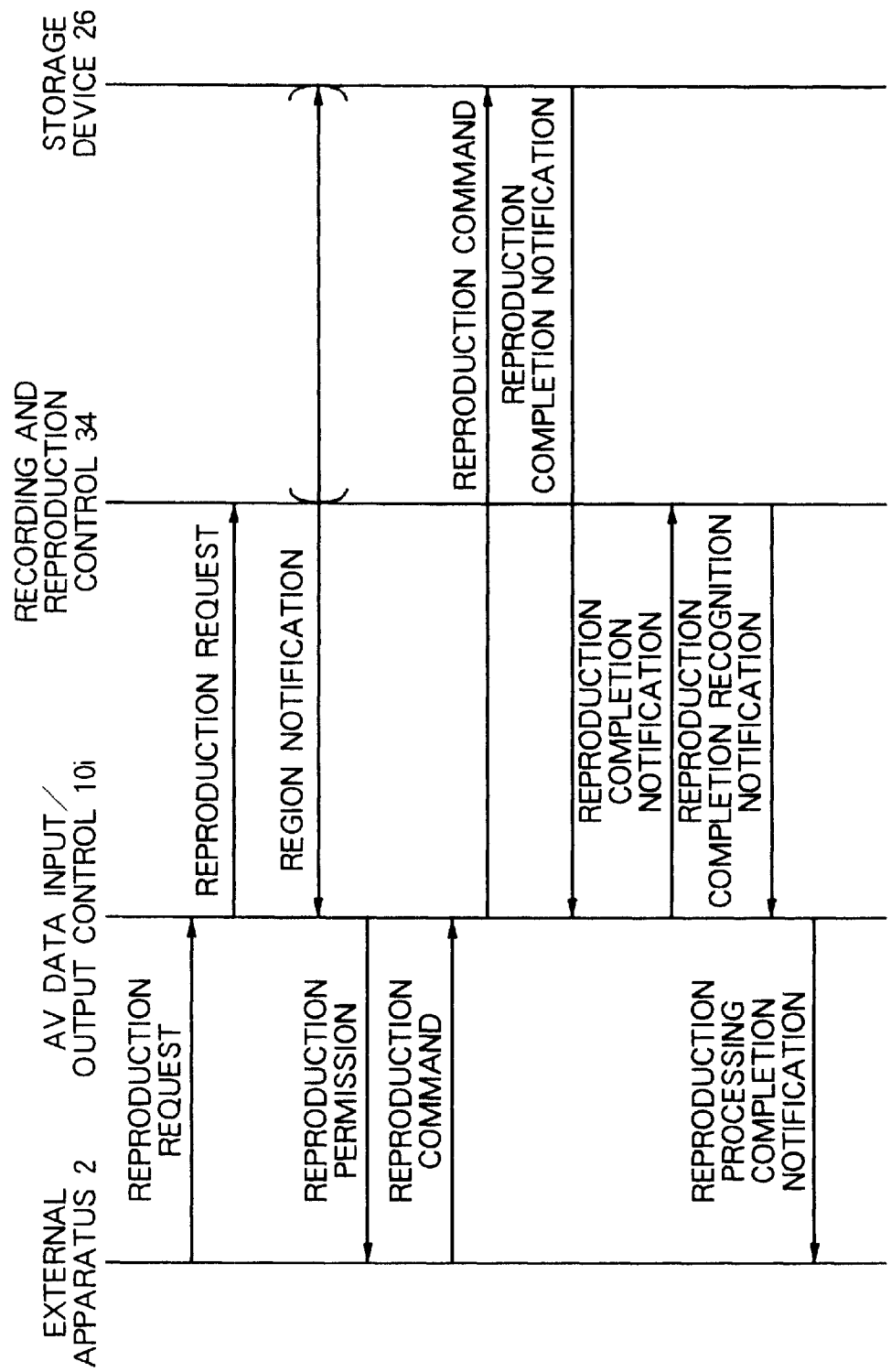
FIG. 5 is a view showing the signal sequence between components of the data recording and reproducing apparatus where the audio and/or video data recorded in the storage device is reproduced.

FIG. 5 is a view showing the signal sequence between the components of the data recording and reproducing apparatus 1 where the audio and/or video data recorded in the storage device 26 is reproduced. Note that, in FIG. 5, for the simplification of explanation, special case processing such as a case where the audio and/or video data for which the reproduction was requested is not recorded in the storage device 26 is omitted.

As shown in FIG. 5, the external apparatus 2 outputs the reproduction request signal requesting the reproduction of the audio and/or video data recorded in the storage device 26 to the AV data input/output controlling circuit $10_i$ as the control signal $S10a_i$.

The AV data input/output controlling circuit $10_i$ receiving the reproduction request signal outputs the reproduction request signal to the recording and reproduction controlling circuit 34 via the control bus 20.

The recording and reproduction controlling circuit 34 receiving the reproduction request signal searches for the regions of the storage device 26 in which the audio and/or video data for which the reproduction was requested is recorded and outputs the region notification signal indicating the found recording regions to the AV data Input/output controlling circuit $10_i$ and the storage device 26 via the control bus 20.

The AV data input/output controlling circuit $10_i$ receiving the region notification signal outputs the reproduction authorization signal as the control signal $10a_i$ to the external apparatus 2.

The external apparatus 2 receiving the reproduction authorization signal outputs the reproduction command signal as the control signal $S10a_i$ to the AV data input/output controlling circuit $10_i$. The AV data input/output controlling circuit $10_i$ receiving the reproduction command signal outputs the reproduction command signal via the control bus 20 to the storage device 26.

The storage device 26 receiving the reproduction command signal reproduces the audio and/or video data for which the reproduction was requested from the recording regions indicated by the region notification signal received from the recording and reproduction controlling circuit 34 and outputs this to the AV data input/output controlling circuit $10_i$ via the data bus 22.

The AV data input/output controlling circuit $10_i$ outputs the audio and/or video data received from the storage device 26 as the real time audio and/or video data $S10c_i$ to the external apparatus 2 (not illustrated in FIG. 5).

The storage device 26 outputs the reproduction completion notification signal to the AV data input/output controlling circuit $10_i$ via the control bus 20 when terminating the reproduction of all of the audio and/or video data from the recording regions indicated by the region notification signal received from the recording and reproduction controlling circuit 34.

The AV data input/output controlling circuit $10_i$ receiving the reproduction completion notification signal outputs the reproduction completion notification to the recording and reproduction controlling circuit 34 via the control bus 20.

The recording and reproduction controlling circuit 34 receiving the reproduction completion notification signal outputs the reproduction completion recognition notification signal to the AV data input/output controlling circuit $10_i$ via the control bus 20.

The AV data input/output controlling circuit $10_i$ receiving the reproduction completion recognition notification outputs the reproduction processing completion notification signal to the external apparatus 2 as the control signal $S10a_i$.

Note that, where the same control signal (package control signal S32) is input to all of the AV data input/output controlling circuits $10_1$ to $10_i$ n from the external unit such as the external apparatus 2 via the multiplexing IF circuit 32, all of the AV data input/output controlling circuits $10_1$ to $10_n$ perform the same recording or reproduction operation.

Further, where the AV data input/output controlling circuits $10_1$ to $10_n$ and the synchronous-asynchronous conversion circuit 24 are controlled so that the reference synchronization signal S28 or the time code S30 is input from the synchronization signal IF circuit 28 or the TCIF circuit 30, and the recording and reproduction controlling circuit 34 performs the data transfer in synchronization with the reference synchronization signal S28 or the time code S30, the transfer of the audio and/or video data on the data bus 22 is carried out in synchronization with these signals.

Second Embodiment

Below, a second embodiment of the present invention will be explained.

Figure 6:
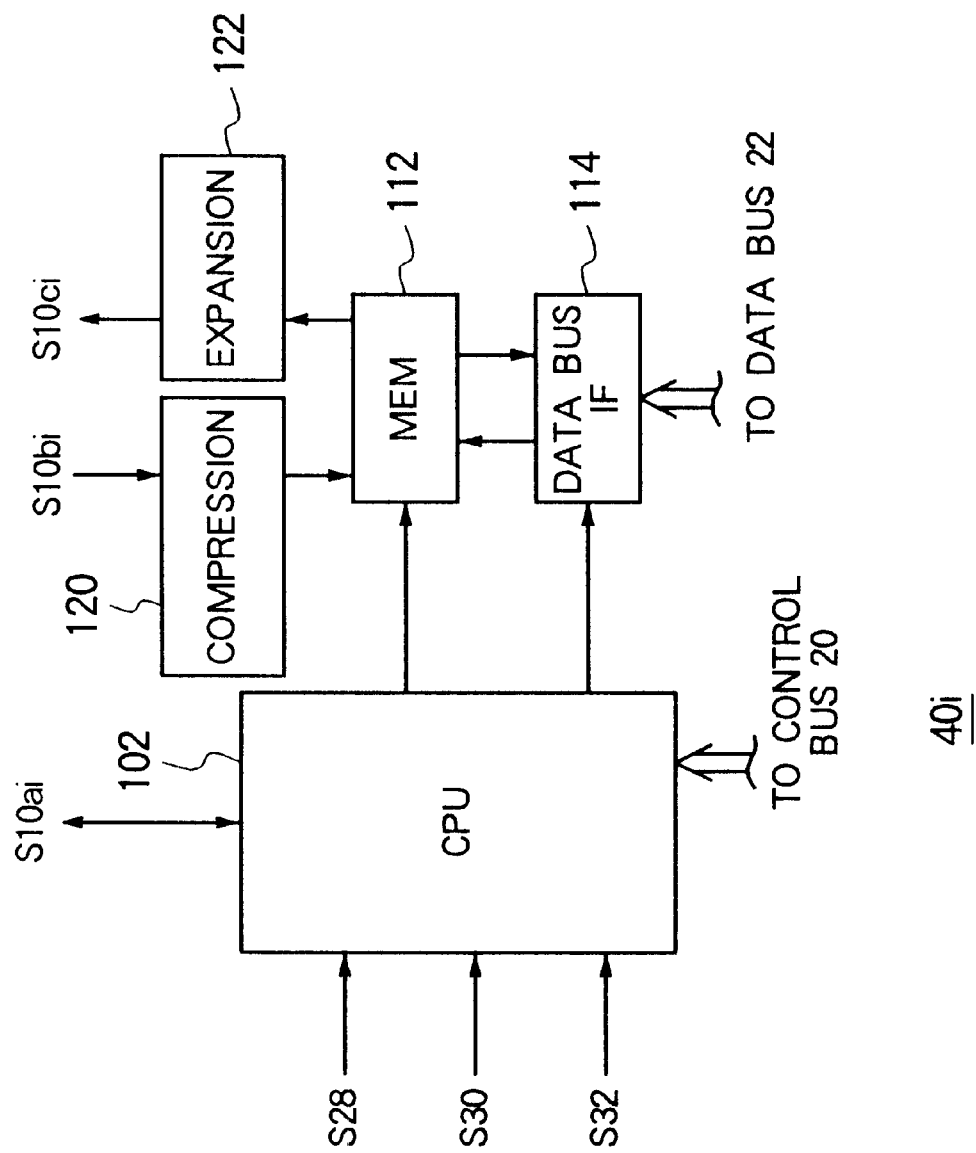
FIG. 6 is a view of the configuration of the AV data input/output controlling circuit according to a second embodiment of the present invention.

FIG. 6 is a view of the configuration of the AV data input/output controlling circuit 401 according to a second embodiment of the present invention.

As shown in FIG. 6, the AV data input/output controlling circuit $40_i$ has a configuration obtained by adding the compressing and coding circuit 120 and an expanding and decoding circuit 122 between the memory circuit 112 and the external apparatus 2 of the AV data input/output controlling circuit $10_i$ shown in FIG. 3.

The AV data input/output controlling circuit $40_i$ is used in place of the AV data input/output controlling circuit $10_i$ when inputting and outputting noncompressed audio and/or video data $10b_i$ and $10c_i$ of the base band with the external apparatus 2 in the data recording and reproducing apparatus 1 shown in FIG. 2 and recording and reproducing compressed and coded audio and/or video data in the storage device 26.

The compressing and coding circuit 120 compresses and codes the noncompressed real time audio and/or video data $S10b_i$ input from the external apparatus 2 by a compressing and coding system such as the MPEG and outputs the resultant data to the memory circuit 112.

The expanding and decoding circuit 122 expands and decodes the compressed and coded compression audio and/or video data input from the data bus IF 114 and outputs the resultant data as the noncompressed audio and/or video data $S10c_i$ of the base band in real time to the external apparatus 2.

Below, the operation of the data recording and reproducing apparatus 1 using the AV data input/output controlling circuit $40_i$ in place of the AV data input/output controlling circuit $10_i$ will be simply explained.

By the signal sequence shown in FIG. 4, the real time noncompressed audio and/or video data input from the external apparatus 2 to the compressing and coding circuit 120 is compressed and coded by the compressing and coding circuit 120, output to the storage device 26 via the memory circuit 112 and the data bus IF 114, and recorded on the predetermined recording medium by the storage device 26.

Further, by the signal sequence shown in FIG. 5, the compressed audio and/or video data reproduced from the storage device 26 is input to the expanding and decoding circuit 122 via the data bus IF114 and the memory circuit 112, expanded and decoded, and output as the real time audio and/or video data to the external apparatus 2.

By providing the compressing and coding circuit 120 and the expanding and decoding circuit 122 in the AV data input/output controlling circuit $40_i$, the audio and/or video data $S10_i$ input as the audio and/or video data of the base band can be compressed and coded and recorded in the storage device 26, and the compressed audio and/or video data reproduced by the storage device 26 can be output as the audio and/or video data $S10c_i$ of the base band to the external apparatus 2.

Note that, it is also possible to constitute the compressing and coding circuit 120 and the expanding and decoding circuit 122 to handle either of the audio data or the video data.

Further, where the synchronous data transfer in the control bus 20 is not necessary, it is also possible to delete the synchronous-asynchronous conversion circuit 24 and stop the operation of the synchronous-asynchronous conversion circuit 24.

Third Embodiment

Below, a third embodiment of the present invention will be explained.

The AV data input/output controlling circuit $10_i$ of the data recording and reproducing apparatus 1 shown in the first embodiment is aimed at the input/output of real time audio and/or video data.

In the data recording and reproducing apparatus 1, however, only the input/output of the real time audio and/or video data is possible, therefore, a high speed transfer of audio and/or video data between the data recording and reproducing apparatus 1 and the external apparatus 2, for example, the audio and/or video data in multiple speed reproduction, can not be carried out, a long time is taken for the transfer of the audio and/or video data, and the efficiency of the editing work in the external apparatus 2 is lowered.

Further, where the AV data input/output controlling circuit $40_i$ shown in the second embodiment is used, deterioration of the audio and/or video data occurs due to the compression and expansion processing.

The data recording and reproducing apparatus 3 shown in the third embodiment is made so as to solve such a problem and adopts a configuration in which the AV data input/output controlling circuit 50 for inputting and outputting non-real time audio and/or video data is added to the data recording and reproducing apparatus 1.

Figure 7:
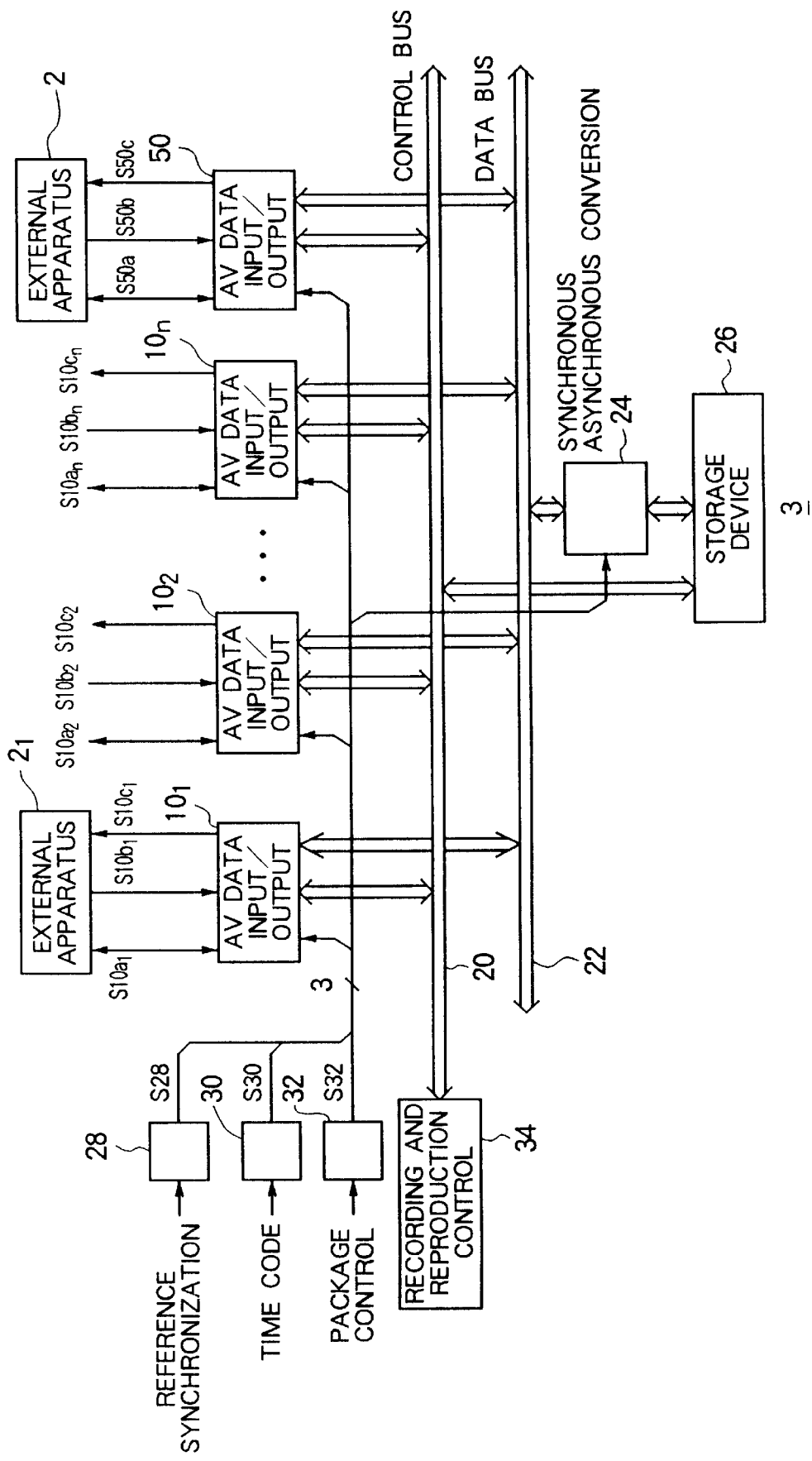
FIG. 7 is a view of the configuration of the data recording and reproducing apparatus according to a third embodiment of the present invention.

FIG. 7 is a view of the configuration of the data recording and reproducing apparatus 3 according to the third embodiment of the present invention. Note that, among the components of the data recording and reproducing apparatus 3 shown in FIG. 7, the same components as those of the data recording and reproducing apparatus 1 shown in FIG. 2 are shown by the same reference numerals.

As shown in FIG. 7, as the same components as those of the data recording and reproducing apparatus 1 shown in the first embodiment and the second embodiment, the data recording and reproducing apparatus 3 has n number of AV data input/output controlling circuits $10_1$ to $10_n$ for real time audio and/or video data, the recording and reproduction controlling circuit 34, synchronous-asynchronous conversion circuit 24, storage device 26, synchronization signal IF circuit 28, TCIF circuit 30, and the multiplexing IF circuit 32. Further, the data recording and reproducing apparatus 3 has the AV data input/output controlling circuit 50 as a component different from the data recording and reproducing apparatus 1 shown in the first embodiment and the second embodiment.

In the data recording and reproducing apparatus 3, the AV data input/output controlling circuit 50 is used for inputting and outputting the audio and/or video data (non-real time audio and/or video data) of a data rate different from that of the usual real time audio and/or video data obtained from the VTR apparatus by performing multiple speed reproduction such as 2×speed or 3×speed reproduction with the external apparatus 2.

Note that, similar to the AV data input/output controlling circuits $10_1$ to $10_n$, the AV data input/output controlling circuit 50 is connected to the synchronous-asynchronous conversion circuit 24 via the data bus 22. Further, the AV data input/output controlling circuit 50 is connected to the recording and reproduction controlling circuit 34 and the storage device 26 via the control bus 20.

Further, similar to the AV data input/output controlling circuits $10_1$ to $10_n$, the reference synchronization signal S28 is input to the AV data Input/output controlling circuit 50 via the synchronization signal IF circuit 28 from the external apparatus 2 according to need.

Further, the AV data input/output controlling circuit 50 receives as input the time code S30 Indicating the time of the audio and/or video data used for the establishment of synchronization via the TCIF circuit 30.

Further, the AV data input/output controlling circuit 50 receives as input the package control signal S32 used for collectively controlling the operation of the AV data Input/output controlling circuits $10_1$ to $10_n$ and the AV data input/output controlling circuit 50 via the multiplexing IF circuit 32.

In this way, in the data recording and reproducing apparatus 3, the transfer of the audio and/or video data on the data bus 22 In synchronization with the reference synchronization signal and time code etc. input from the external unit is possible.

Further, the data recording and reproducing apparatus 3 can perform the input/output of audio and/or video data in real time via the AV data input/output controlling circuits $10_1$ to $10_n$ with the external apparatus 2 and, in addition, can perform the input/output of audio and/or video data not in real time via the AV data input/output controlling circuit 50 with the external apparatus 2.

Figure 8:
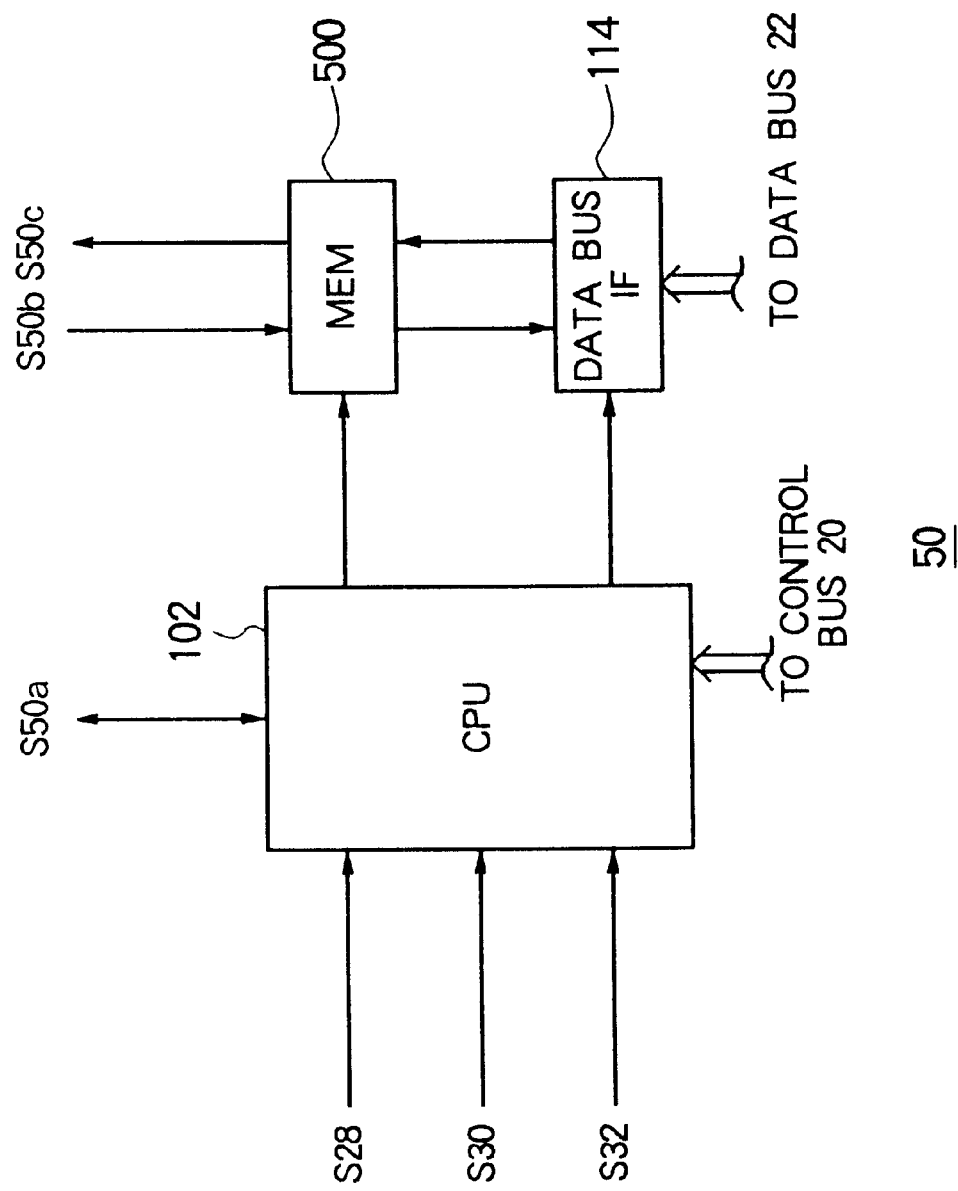
FIG. 8 view of the configuration of the AV data input/output controlling circuit for the noncompressed audio and/or video data of the base band in non-real time shown in the third embodiment.

FIG. 8 is a view of the configuration of the AV data input/output controlling circuit 50 for the noncompressed audio and/or video data of the non-real time base band shown in the third embodiment. Note that, among the components of the AV data input/output controlling circuit 50 shown in FIG. 8, the same components as those of the AV data input/output controlling circuits $10_1$ to $10_n$ shown in FIG. 3 are shown by the same reference numerals.

As shown in FIG. 8, the AV data input/output controlling circuit 50 inputting and outputting the noncompressed audio and/or video data with the external apparatus 2 and the storage device 26 is constituted by a microprocessor 102, a memory circuit 500, and a data bus IF 114.

The memory circuit 500 buffers the audio and/or video data S50b input from the external apparatus 2 under the control of the microprocessor 102 similar to the data recording and reproducing apparatus 112 (FIG. 3) and outputs the buffered data via the data bus IF 114 to the storage device 26 (synchronous-asynchronous conversion circuit 24).

Further, the memory circuit 500 buffers the audio and/or video data input from the storage device 26 via the data bus IF 114 and outputs the same as the audio and/or video data S50a to the external apparatus 2.

Note that the AV data input/output controlling circuit 500 inputs and outputs the non-real time audio and/or video data having a higher data rate than that of the real time audio and/or video data input and output by the AV data input/output controlling circuit $10_1$, therefore the memory circuit 500 has a larger storage capacity in comparison with the memory circuit 112 of the AV data input/output controlling circuits $10_1$ to $10_n$ shown in FIG. 3.

Below, the operation of the data recording and reproducing apparatus 3 will be explained.

Figure 9:
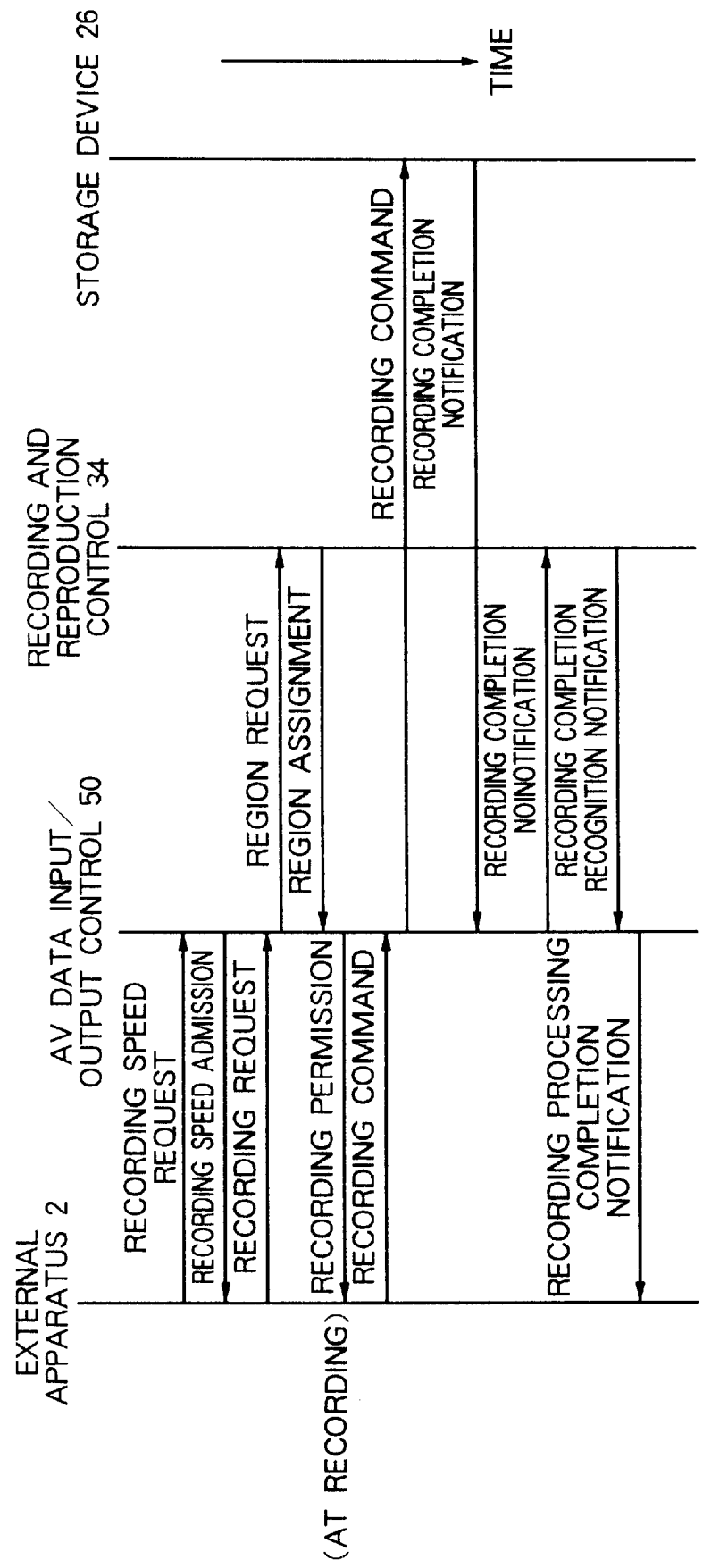
FIG. 9 is a view showing the signal sequence between components of the data recording and reproducing apparatus where the audio and/or video data of the base band in non-real time is recorded in the storage device shown in FIG. 7.

FIG. 9 is a view showing the signal sequence between components of the data recording and reproducing apparatus 3 where the non-real time audio and/or video data of the base band are recorded in the storage device 26 shown in FIG. 7. Note that, in FIG. 9, for the simplification of explanation, special case processing such as a case where no empty recording region exists in the storage device 26 is omitted.

As shown in FIG. 8, the recording speed request signal is output from the external apparatus 2 to the AV data input/output controlling circuit 50 as the control signal S50a. The external apparatus 2 notifies the data rate of the non-real time data audio and/or video data to be recorded in the data recording and reproducing apparatus 3 by this recording speed request signal.

The AV data input/output controlling circuit 50 outputs the recording speed authorization signal notifying that the recording is possible with the notified data rate to the external apparatus 2 as the control signal S50a.

The external apparatus 2 receiving the recording speed authorization signal outputs the recording request signal to the AV data input/output controlling circuit 50.

The AV data input/output controlling circuit 50 receiving the recording request signal outputs the recording request signal to the recording and reproduction controlling circuit 34 via the control bus 20.

The recording and reproduction controlling circuit 34 receiving the recording request signal searches for the empty recording regions of the storage device 26 and outputs a region assignment signal indicating the recording regions assigned to the audio and/or video data for which the recording was requested to the AV data input/output controlling circuit 50 and the storage device 26.

The AV data input/output controlling circuit 50 receiving the region assignment signal outputs the recording authorization signal to the external apparatus 2.

The external apparatus 2 receiving the recording authorization signal outputs the recording command signal to the AV data Input/output controlling circuit 50. The AV data input/output controlling circuit 50 outputs the received recording command signal to the storage device 26 via the control bus 20.

Further, the external apparatus 2 outputs the audio and/or video data S50b (not illustrated in FIG. 9) of the base band in non-real time requesting the recording to the storage device 26 to the AV data input/output controlling circuit 50.

The audio and/or video data S50b output by the external apparatus 2 is recorded in the storage device 26 via the AV data input/output controlling circuit 50 and the data bus 22.

When the audio and/or video data is recorded in all of the recording regions assigned by the recording and reproduction controlling circuit 34, the storage device 26 outputs the recording completion notification signal to the AV data input/output controlling circuit 50 via the control bus 20.

The AV data input/output controlling circuit 50 receiving the recording completion notification signal outputs the recording completion notification signal to the external apparatus 2.

As explained above, in the data recording and reproducing apparatus 3 as well, just by placing the recording speed request signal and the recording speed authorization signal in front of the signal sequence (FIG. 4) of the time of the recording of the data recording and reproducing apparatus 1, the non-real time audio and/or video data can be recorded in the storage device 26.

Figure 10:
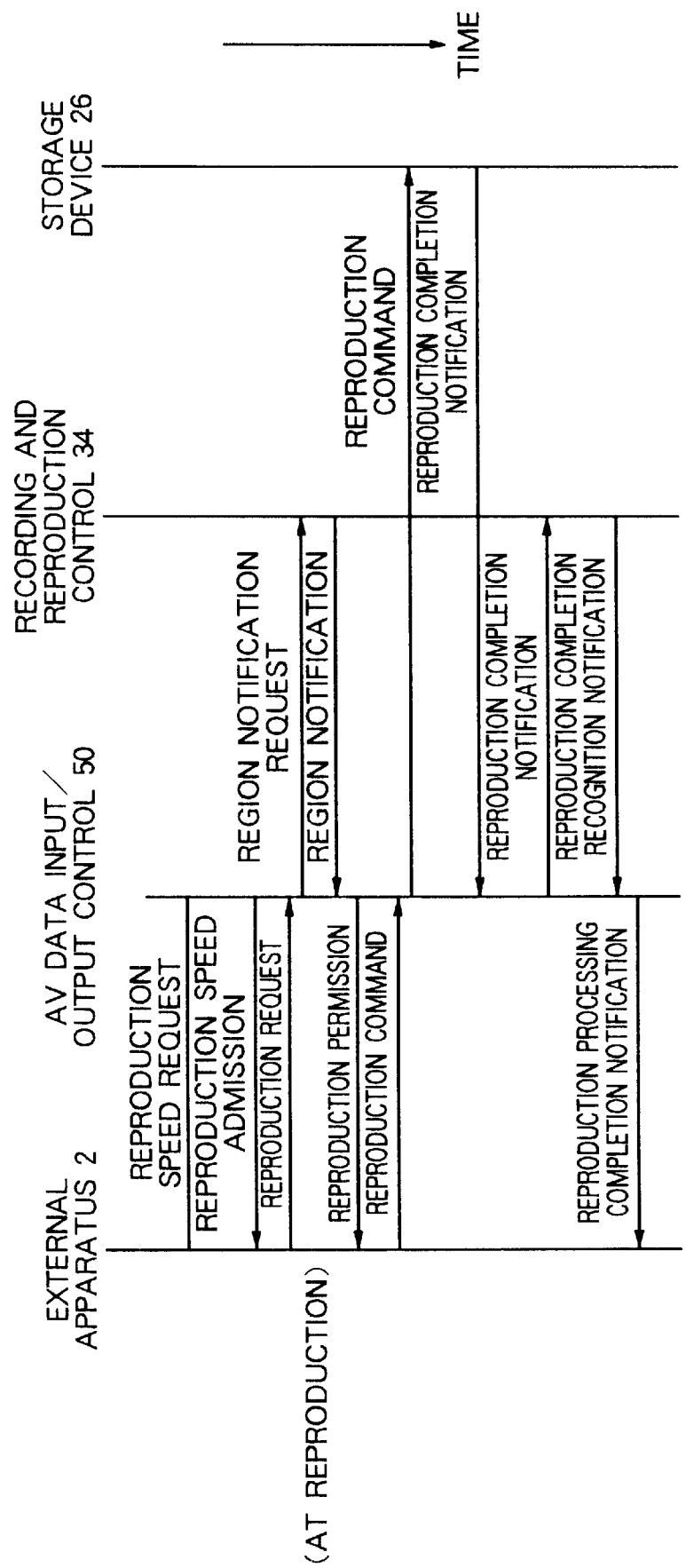
FIG. 10 is a view showing the signal sequence between components of the data recording and reproducing apparatus where the audio and/or video data of the base band in non-real time recorded in the storage device shown in FIG. 7 is reproduced.

FIG. 10 is a view showing the signal sequence between components of the data recording and reproducing apparatus 3 when the audio and/or video data of base band in non-real time recorded in the storage device 26 shown in FIG. 7 is reproduced. Note that, in FIG. 10, special case processing such as a case where the audio and/or video data for which the reproduction was requested is not recorded in the storage device 26 is omitted.

As shown in FIG. 10, the external apparatus 2 outputs the reproduction speed request signal, notifying the data rate of the audio and/or video data to be reproduced to the data recording and reproducing apparatus 3, to the AV data input/output controlling circuit 50.

The AV data input/output controlling circuit 50 outputs the reproduction speed authorization signal notifying that the reproduction is possible with the notified data rate as the control signal S50a.

The external apparatus 2 receiving this reproduction speed authorization signal outputs the reproduction request signal to the AV data input/output controlling circuit 50.

The AV data input/output controlling circuit 50 receiving the reproduction request signal outputs the reproduction request signal to the recording and reproduction controlling circuit 34 via the control bus 20.

The recording and reproduction controlling circuit 34 receiving the reproduction request signal searches for the regions of the storage device 26 in which the audio and/or video data for which the reproduction was requested is recorded and outputs the region notification signal indicating the found recording regions via the control bus 20 to the AV data input/output controlling circuit 50 and the storage device 26.

The AV data input/output controlling circuit 50 receiving the region notification signal outputs the reproduction authorization signal as the control signal S50a to the external apparatus 2.

The external apparatus 2 receiving the reproduction authorization signal outputs the reproduction command signal as the control signal S50a to the AV data input/output controlling circuit 50. The AV data input/output controlling circuit 50 receiving the reproduction command signal outputs the reproduction command signal via the control bus 20 to the storage device 26.

The storage device 26 receiving the reproduction command signal reproduces the audio and/or video data for which the reproduction was requested from the recording regions indicated by the region notification signal received from the recording and reproduction controlling circuit 34 and outputs the same to the AV data input/output controlling circuit 50 via the data bus 22.

The AV data input/output controlling circuit 50 outputs the audio and/or video data received from the storage device 26 as the non-real time audio and/or video data S50a to the external apparatus 2 (not illustrated in FIG. 10).

The storage device 26 outputs the reproduction completion notification signal to the AV data input/output controlling circuit 50 via the control bus 20 when terminating the reproduction of all of the audio and/or video data from the recording regions indicated by the region notification signal received from the recording and reproduction controlling circuit 34.

The AV data Input/output controlling circuit 50 receiving the reproduction completion notification signal outputs the reproduction completion notification via the control bus 20 to the recording and reproduction controlling circuit 34.

The recording and reproduction controlling circuit 34 receiving the reproduction completion notification signal outputs the reproduction completion recognition notification signal to the AV data input/output controlling circuit 50 via the control bus 20.

The AV data input/output controlling circuit 50 receiving the reproduction completion recognition notification outputs the reproduction processing completion notification signal to the external apparatus 2 as the control signal S50$a$.

As explained above, in the data recording and reproducing apparatus 3 as well, just by placing the reproduction speed request signal and reproduction speed authorization signal in front of the signal sequence (FIG. 5) at the time of reproduction of the data recording and reproducing apparatus 1, the non-real time audio and/or video data can be reproduced from the storage device 26.

Note that, where the same control signal (package control signal S32) is input to all of the AV data input/output controlling circuits $10_1$ to $10_n$ and the AV data input/output controlling circuit 50 from the external unit such as the external apparatus 2 via the multiplexing IF circuit 32, the AV data input/output controlling circuits $10_1$ to $10_n$ and the AV data input/output controlling circuit 50 perform the same recording or reproduction operation.

Further, where the AV data input/output controlling circuits $10_1$ to $10_n$, AV data input/output controlling circuit 50, and the synchronous-asynchronous conversion circuit 24 are controlled so that the reference synchronization signal S28 or the time code S30 is input from the synchronization signal IF circuit 28 or the TCIF circuit 30, and the recording and reproduction controlling circuit 34 performs the data transfer in synchronization with the reference synchronization signal S28 or the time code S30, the transfer of the audio and/or video data on the data bus 22 is carried out in synchronization with these signals.

Further, in the data recording and reproducing apparatus 3 as well, needless to say the AV data input/output controlling circuit $10_i$ can perform the recording and reproduction of the audio and/or video data in parallel to the recording and reproduction operation of the AV data input/output controlling circuit 50.

As explained above, according to the data recording and reproducing apparatus 3 shown in the third embodiment, the input/output of the non-real time audio and/or video data having a higher data rate than that of the real time audio and/or video data becomes possible, the time required for the transfer of the audio and/or video data to and from the external apparatus 2 is shortened, and the efficiency of the editing work in the external apparatus 2 is improved.

Further, where the AV data input/output controlling circuit 50 is used, since the noncompressed audio and/or video data can be transferred at a high speed, unlike the case of using the AV data input/output controlling circuit $40_i$ shown in the second embodiment, no deterioration of audio and/or video data occurs.

Note that, by further adding the higher speed compressing and coding circuit 120 and expanding and decoding circuit 122 to the AV data input/output controlling circuit 50, the AV data input/output controlling circuit 50 can be modified so as to be able to input and output the compressed and coded audio and/or video data.

Further, it is also possible to constitute the system so that the data recording and reproducing apparatus 3 has a plurality of AV data input/output controlling circuits 50.

Further, similar modifications to those shown in the first embodiment and the second embodiment are possible for the data recording and reproducing apparatus 3 shown in the third embodiment.

Fourth Embodiment

Below, a fourth embodiment of the present invention will be explained as the first use of the data recording and reproducing apparatus 3 according to the present invention.

Figure 11:
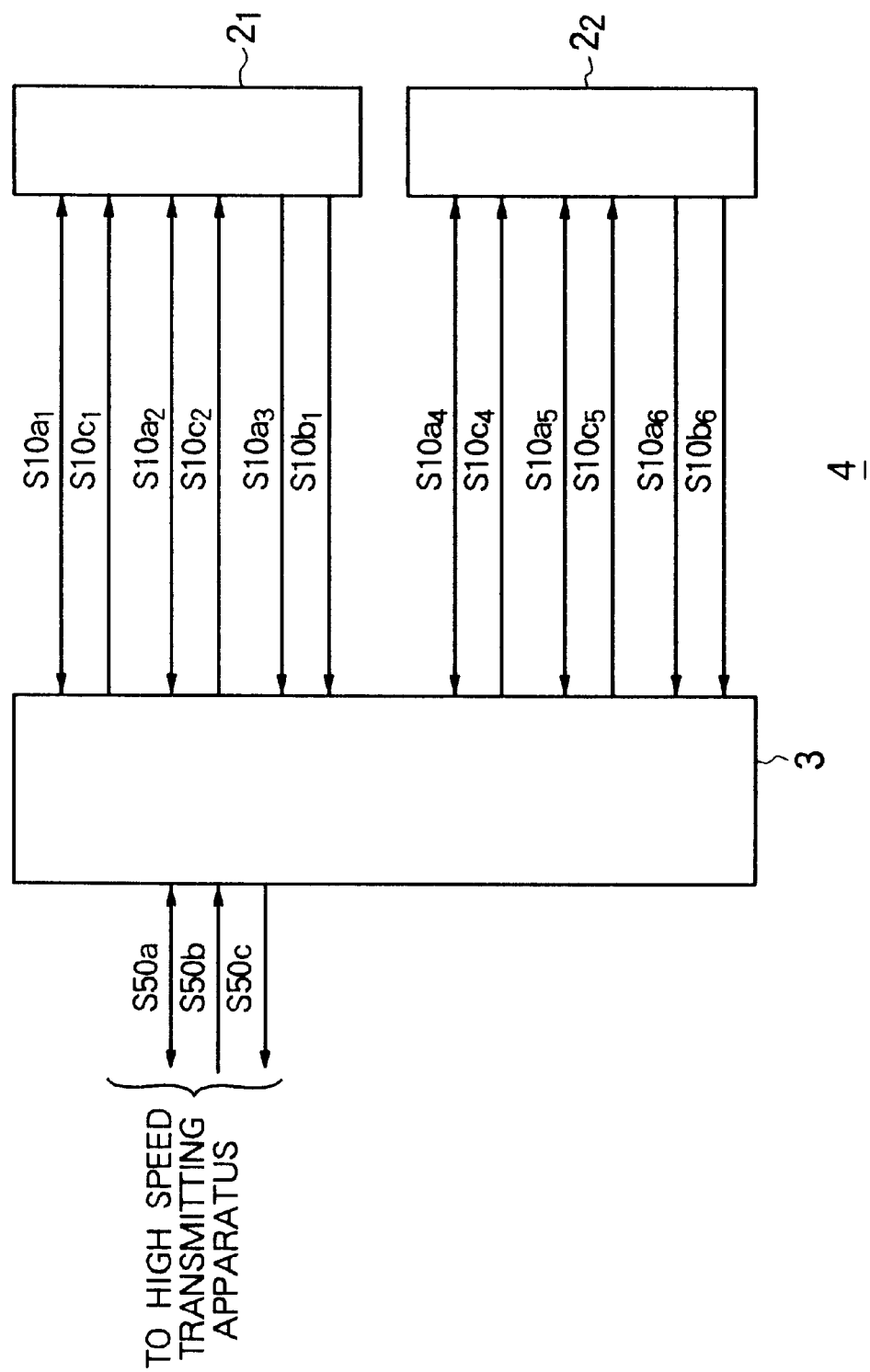
FIG. 11 is a view of the configuration of the data recording and reproducing system in a fourth embodiment.

FIG. 11 is a view of the configuration of the data recording and reproducing system 4 in the fourth embodiment.

As shown in FIG. 11, the data recording and reproducing system 4 is constituted by the data recording and reproducing apparatus 3 and external apparatuses $2_1$ and $2_2$.

In the data recording and reproducing system 4, the data recording and reproducing apparatus 3 has for example six AV data input/output controlling circuits $10_1$ to $10_6$ (n=6) and one AV data input/output controlling circuit 50, the AV data input/output controlling circuits $10_1$ to $10_3$ are connected to the external apparatus $2_1$, and the AV data input/output controlling circuits $10_4$ to $10_6$ are connected to the external apparatus $2_2$. Further, the AV data Input/output controlling circuit 50 of the data recording and reproducing apparatus 3 is connected to the high speed transmitting apparatus (not illustrated) transmitting the audio and/or video data with a non-real time data rate higher than for example the real time data rate and transmits and receives the control signal S50$a$ and the audio and/or video data S50$b$ and S50$c$ with the high speed transmitting apparatus.

The external apparatuses $2_1$ and $2_2$ are for example editing apparatuses performing editing on the audio and/or video data, the external apparatus $2_1$ transmits and receives three control signals S10$a_1$ to S10$a_3$, two sets of input (when seen from the external apparatus $2_1$ side) audio and/or video data S10$c_1$ and S10$c_2$ and one set of output audio and/or video data S10$b_3$ with the AV data input/output controlling circuits $10_1$ to $10_3$ of the data recording and reproducing apparatus 3.

The external apparatus $2_2$ transmits and receives three control signals S10$a_4$ to S10$a_6$, two sets of input audio and/or video data S10$c_4$ and S10$c_5$ and one set of output audio and/or video data S10$b_6$ with for example the AV data input/output controlling circuits $10_4$ to $10_6$ of the data recording and reproducing apparatus 3 similar to the external apparatus $2_1$.

In the data recording and reproducing system 4 constituted as mentioned above, each of the external apparatuses $2_1$ and $2_2$ can receive the audio and/or video data (stock data) to be edited from the data recording and reproducing apparatus 3 and can record the audio and/or video data obtained as a result of editing in the data recording and reproducing apparatus 3.

By adopting the configuration shown in the data recording and reproducing system 4, the data recording and reproducing apparatus 3 can record and reproduce the audio and/or video data according to the request of two external apparatuses $2_1$ and $2_2$.

Further, the data recording and reproducing system 4 can record and reproduce the audio and/or video data received from the high speed transmitting apparatus, reproduce the recorded audio and/or video data, and supply the same to the data recording and reproducing system 4.

Further, it is possible to supply the audio and/or video data input from the external apparatuses $2_1$ and $2_2$ via the AV data input/output controlling circuits $10_1$ to $10_n$ from the data recording and reproducing system 4 to the high speed transmitting apparatus via the data bus 22, or output the audio and/or video data supplied from the high speed transmitting apparatus to the external apparatuses $2_1$ and $2_2$.

Therefore, according to the data recording and reproducing system 4 shown in the fourth embodiment, the recording and reproducing requests for audio and/or video data by a plurality of external apparatuses 2 can be responded to, and in addition, it becomes possible to transmit and receive the non-real time audio and/or video data input S50b in response to the request of the high speed transmitting apparatus.

Further, according to the data recording and reproducing system 4 shown in the fourth embodiment, the stock data used by the external apparatuses $2_1$ and $2_2$ can be received in advance from the high speed transmitting apparatus and prepared in the data recording and reproducing apparatus 3, so the efficiency of the editing work is improved.

Note that the modifications shown in the first embodiment to the third embodiment are possible with respect to the components of the data recording and reproducing system 4 shown in the fourth embodiment as well.

Fifth Embodiment

Below, a fifth embodiment of the present invention will be explained as the second use of the data recording and reproducing apparatus 3 according to the present invention.

There is a demand that a plurality of external apparatuses 2 be respectively connected to the plurality of data recording and reproducing apparatuses 1 shown in the first embodiment and the second embodiment and that the audio and/or video data be recorded in the plurality of data recording and reproducing apparatuses 1 by the plurality of external apparatuses 2. So as to satisfy such a demand, when the plurality of external apparatuses 2 are respectively connected to the plurality of data recording and reproducing apparatuses 1, each of the plurality of external apparatuses 2 will exclusively use the AV data input/output controlling circuit $10_i$ of each of the plurality of data recording and reproducing apparatuses 1.

Accordingly, for example, when a plurality of external apparatuses 2 are simply connected to two data recording and reproducing apparatuses $1_1$ and $1_2$ each having n number of AV data input/output controlling circuits $10_1$ to $10_n$, the number of the external apparatuses 2 to which the two data recording and reproducing apparatuses $1_1$ and $1_2$ can be connected becomes n or less.

The data recording and reproducing system 5 shown in the fifth embodiment was made so as to solve such a problem. That is, the data recording and reproducing system 5 uses the data recording and reproducing apparatus 3 (FIG. 7) in place of the data recording and reproducing apparatus 1 (FIG. 2). The object thereof is to enable the recording and reproduction of the audio and/or video data with respect to a plurality of data recording and reproducing apparatuses by the external apparatus 2, and in addition, connect as large a number of external apparatuses 2 as possible to the plurality of data recording and reproducing apparatuses.

Figure 12:
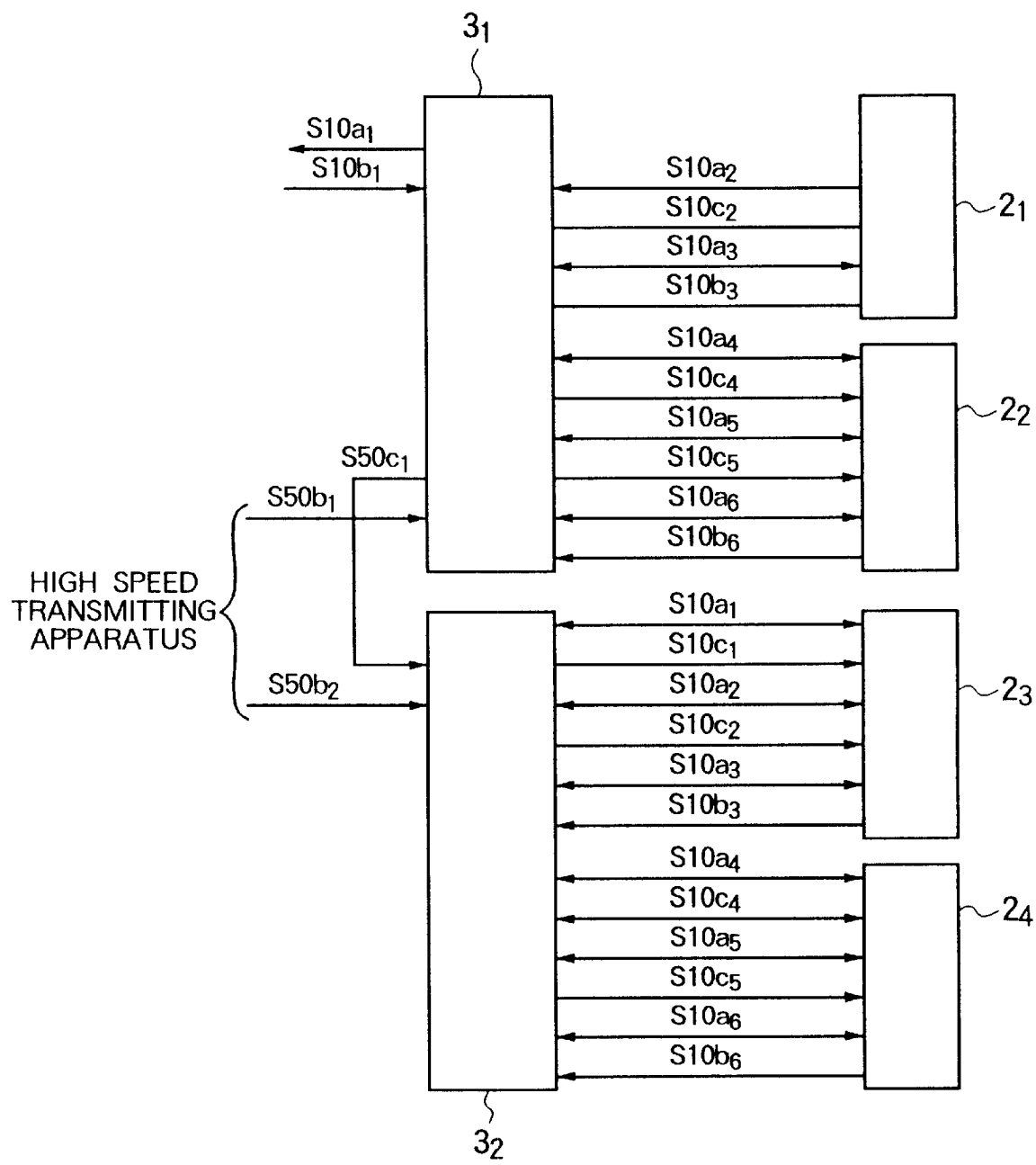
FIG. 12 is view of the configuration of the data recording and reproducing system in a fifth embodiment.

FIG. 12 is a view of the configuration of the data recording and reproducing system 6 in the fifth embodiment.

As shown in FIG. 12, the data recording and reproducing system 5 is constituted by two data recording and reproducing apparatuses $3_1$ and $3_2$ and four external apparatuses $2_1$ to $2_4$.

In the data recording and reproducing system 5, the data recording and reproducing apparatuses $3_1$ and $3_2$ have for example six AV data input/output controlling circuits $10_1$ to $10_n$ (n=6) and one AV data input/output controlling circuit 50.

The AV data input/output controlling circuit 50 of the data recording and reproducing apparatus 3 (FIG. 7, FIG. 8) receives the non-real time audio and/or video data S50$b_1$ from the high speed transmitting apparatus and outputs the audio and/or video data S50$c_1$ to the AV data input/output controlling circuit 50 of the data recording and reproducing apparatus $3_2$.

Further, the AV data input/output controlling circuits $10_1$ to $10_6$ of the data recording and reproducing apparatus $3_1$ transmits and receives the control signal S10$a_1$ with the external unit and then receives the real time audio and/or video data S10$b_1$.

Further, the AV data input/output controlling circuits $10_1$ to $10_6$ of the data recording and reproducing apparatus $3_1$ respectively transmit and receive the control signals S10$a_2$ to S10$a_6$ with the external apparatuses $2_1$ and $2_2$, receive the audio and/or video data S10$b_3$ and S10$b_6$ from the external apparatuses $2_1$ and $2_2$, and output the audio and/or video data S10$c_2$, S10$c_3$, S10$c_4$, and S10$c_5$ to the external apparatuses $2_1$ and $2_2$.

The AV data input/output controlling circuit 50 of the data recording and reproducing apparatus $3_2$ receives the non-real time audio and/or video data S50$b_2$ from the high speed transmitting apparatus and receives the audio and/or video data S50$c_1$ from the AV data input/output controlling circuit 50 of the data recording and reproducing apparatus $3_1$.

Further, the AV data input/output controlling circuits $10_1$ to $10_6$ of the data recording and reproducing apparatuses $3_2$ respectively transmit and receive the control signals S10$a_1$ to S10$a_6$ with the external apparatuses $2_3$ and $2_4$, receive the audio and/or video data S10$b_3$ and S10$b_6$ from the external apparatuses $2_3$ and $2_4$, and output the audio and/or video data S10$c_1$ and S10$c_2$, S10$c_4$ and S10$c_5$ to the external apparatuses $2_3$ and $2_4$.

Further, the AV data input/output controlling circuit 50 of the data recording and reproducing apparatuses $3_1$ and $3_2$ respectively receive the audio and/or video data S50$b_1$ and S50$b_2$ from the high speed transmitting apparatus shown in the fourth embodiment.

The external apparatuses $2_1$ to $2_4$ are for example editing apparatuses performing the edit processing for the audio and/or video data.

In the data recording and reproducing system 5, the data recording and reproducing apparatus $3_2$ can receive the audio and/or video data recorded in the data recording and reproducing apparatus $3_1$ as the audio and/or video data S50$c_1$. Accordingly, among the external apparatuses $2_1$ to $2_4$, the external apparatuses $2_3$ and $2_4$ connected to the data recording and reproducing apparatus $3_2$ can regard also the audio and/or video data recorded in either of the data recording and reproducing apparatuses $3_1$ and $3_2$ as the target of the editing and can record the audio and/or video data obtained as a result of editing in the data recording and reproducing apparatus $3_2$.

Further, the external apparatuses $2_2$ to $2_4$ other than the external apparatus $2_1$ respectively can receive two sets of stock data from the data recording and reproducing apparatuses $3_1$ and $3_2$ and perform the editing.

According to the data recording and reproducing system 5 shown in the fifth embodiment, the data recording and reproducing apparatus $3_1$ can receive the real time audio and/or video data S10$b_1$ according to a control signal S10$a_1$ from other than the external apparatuses $2_1$ to $2_4$ while responding to the request of four external apparatuses $2_1$ to $2_4$ and further can perform the copying of the audio and/or video data received with the data recording and reproducing apparatuses $3_1$ and $3_2$ according to the control signal S10$a_1$. Accordingly, the data recording and reproducing apparatuses $3_1$ and $3_2$ can supply the audio and/or video data S10$b_1$ to each of the external apparatuses $2_1$ to $2_4$ according to a control signal $10a_1$ from other than the external apparatuses $2_1$ to $2_4$ as a whole.

Note that, for example, it is possible to respectively input the audio and/or video data $S50b_1$ and $S50b_2$ obtained by multiplexing for example the audio and/or video data in a time division manner, utilize the data recording and reproducing apparatuses $3_1$ and $3_2$ as if they were time division exchangers, and increase the flexibility of supply of the audio and/or video data with respect to the external apparatuses $2_1$ to $2_4$.

The modifications shown in the first embodiment to the third embodiment are possible with respect to the components of the data recording and reproducing system 5 shown in the fifth embodiment, for example.

According to the video data recording and reproducing apparatus and the audio and/or video data recording and reproducing system explained above, it is possible to dub audio and/or video data from a VTR or other external unit to a recording and reproducing apparatus in a server system in a relatively short time.

Further, according to the audio and/or video recording and reproducing apparatus and an audio and/or video data recording and reproducing system explained above, it is possible to the scale and function of the server system for audio and/or video data in a broadcast system of a television broadcasting station corresponding to the size of operations of the television broadcasting station or the type of the operations to which the broadcast system in the same television broadcasting station. Accordingly, in the audio and/or video data recording and reproducing apparatus and audio and/or video data recording and reproducing system according to the present invention, the change of the functions and structure is easy, the expandability is high, and the cost is low.

Further, according to the audio and/or video data recording and reproducing apparatus and audio and/or video data recording and reproducing system explained above, the audio and/or video data can be handled in slave synchronization with a reference synchronization signal etc. input from an external unit taking into account the fact that in a broadcast system in a television broadcasting station, the audio and/or video data is usually sent and transmitted in strict synchronization with the reference synchronization signal or the time code and taking into account the ease of connection to the already existing broadcast equipment.

Further, according to the audio and/or video data recording and reproducing apparatus and audio and/or video data recording and reproducing system mentioned above, it is possible to eliminate as many of the parts causing the system delay time in the audio and/or video data handled and thereby reduce the system delay time and, when operating under the control of an external control device, possible to quickly adapt to control from the external control device by having the control commands from the external control device directly supplied to the portion performing the processing.

Further, according to the audio and/or video data recording and reproducing apparatus and audio and/or video data recording and reproducing system explained above, it is possible to have the audio and/or video data transferred and exchanged in synchronization with the reference synchronization signal as much as possible in the broadcast system and reduce the portions requiring the synchronous/ asynchronous conversion processing.

Further, according to the audio and/or video data recording and reproducing apparatus and an audio and/or video data recording and reproducing system explained above, it is possible to transfer and exchange base band digital audio and/or video data.

Further, the audio and/or video data recording and reproducing apparatus and audio and/or video data recording and reproducing system explained above can record and reproduce non-real time audio and/or video data in addition to the conventional recording and reproduction of the real time video audio data, can shorten the transmission time of the audio and/or video data, and are preferred for, for example, the editing of news videos for which the editing time is limited.

Non-tracking System

To clarify the objects and features of the embodiments explained below and make them easier to understand, the non-tracking system and its problems will be explained.

On a video tape (VTR tape), audio and/or video data is recorded by alternately inverting the azimuth angle of adjoining helical tracks. If the azimuth angle is alternately inverted for every helical track in this way, even if the helical tracks having different azimuth angles are scanned (traced) by a reproducing head, the audio and/or video data cannot be reproduced.

Further, even in a case where the reproducing head traces the helical tracks having the same azimuth angle, when the reproducing head and the helical track are offset from each other, much error occurs in the reproduced audio and/or video data.

A so-called non-tracking type video apparatus (VTR apparatus) positively utilizing such a nature regarding the reproducing heads and the azimuth angle of the helical tracks at the time of reproduction of audio and/or video data has been proposed.

On the tape travelling surface of the drum of the non-tracking type video apparatus, two positive azimuth angle reproducing heads (positive azimuth heads) are disposed at one helical track's worth of interval, and two negative azimuth angle reproducing heads (negative azimuth heads) are disposed at symmetrical positions with for example the positive azimuth heads with respect to the center of rotation of the drum at one helical track's worth of interval.

In the non-tracking type VTR apparatus, the helical tracks are scanned by these four reproducing heads in total to read the audio and/or video data. The audio and/or video data having a lower error rate read by the reproducing head which correctly traced the helical tracks is selected from among the two sets of audio and/or video data reproduced by the reproducing heads having an azimuth angle coincident with that of the helical tracks (positive azimuth heads or negative azimuth heads) and output. By adopting such a method, the non-tracking type VTR apparatus greatly eases the condition of the tracking control of the reproducing head with respect to the helical tracks.

Further, there is a case where a multiple speed reproduction facility for reproducing all audio and/or video data with a fast data rate of any higher speed such as a whole multiple of the data rate (normal speed) at usual reproduction, for example, 2×, X, . . . , or 2.1× and 4.2× is required in a VTR apparatus for a television broadcasting station etc.

In a non-tracking type VTR apparatus, for realizing a multiple speed reproduction facility, consideration can be given to a method in which the tape is made to travel at a speed corresponding to the multiple speed of the multiple speed reproduction and, at the same time, the drum is rotated at a rotational speed corresponding to the multiple speed of the multiple speed reproduction.

When this method is adopted, however, the load on the motor for rotating the drum becomes large and in addition a high precision is required in the VTR apparatus in view of the mechanism such as the contact precision between the tape travelling surface of the drum and the VTR tape, which makes realization difficult.

Further, when this method is adopted, the frequency of the audio and/or video data (recording signal) read from the VTR tape becomes high, and the operation frequency of the equalizing processing circuit of the recording signal becomes high. Further, also the processing such as error correction with respect to the audio and/or video data reproduced from the recording signal becomes high in speed. Realization is difficult also from the viewpoint of the hardware and software.

The VTR apparatuses shown as embodiments below overcome these disadvantages and enable multiple speed reproduction by the non-tracking system while using mechanical parts having a precision equivalent to that of a VTR apparatus performing normal speed reproduction.

Further, the VTR apparatuses shown as embodiments below enable multiple speed reproduction by the non-tracking system without use of special high speed operating parts in an equalizing processing circuit or an error correction processing circuit etc.

Further, the VTR apparatuses shown as embodiments below which enhance the performances of other special reproduction processing facilities, for example, the jog shuttle reproduction facility, by actively using the components used for realizing the multiple speed reproduction.

Sixth Embodiment

The sixth embodiment of the present invention will be explained below taking as an example a case where the external unit 2 connected to the AV data input/output control circuit 50 of the data recording and reproducing apparatus 3 shown in FIG. 7 is a video tape recorder (VTR) apparatus for recording audio and/or video tape on a magnetic tape and reproducing audio and/or video data from the magnetic tape.

FIG. 13 is a view of the configuration of a digital video apparatus (VTR apparatus) 1 according to the sixth embodiment.

As shown in FIG. 13, a VTR apparatus 601 is constituted by a recording unit 610, a reproduction unit 620, and a tape travelling unit 616.

The recording unit 610 is constituted by a video data compressing circuit (Bit-Rate Reduction ENCODE) 700, a data packing circuit 702, an outer code encoder circuit (ECC OUTER ENCODER) 704, a memory circuit 706, an inner code encoder circuit (ECC INNER ENCODER) 708, and a recording head unit 612.

The reproduction unit 620 is constituted by a reproducing head unit 622, an equalizing unit 624, an inner code correcting unit (ECC INNER CORRECTION) 626, a non-tracking processing unit 28, a memory unit 30, an outer code correcting unit (ECC OUTER CORRECTION) 632, a data depacking unit 634, a jog memory unit 636, a data decimation circuit (RATE decimation) 638, and a video data expanding circuit (Bit-Rate Reduction DECODE) 640.

The tape travelling unit 616 includes components for running the VTR tape 614 such as a drum motor, capstan motor, and a driving circuit for these motors, makes the VTR tape 614 travel, and makes two reproducing heads of the reproducing head unit 622 scan the helical tracks of the VTR tape 614 (FIG. 16B). Note that, the tape travelling unit 616 makes the VTR tape 614 travel at the same speed as that at the normal speed reproduction even in a case where the reproduction unit 620 of the VTR apparatus 601 performs multiple speed reproduction such as 2×speed reproduction.

Further, the drum 820 of the recording head unit 612 and the drum 820 of the reproducing head unit 622 are actually the same.

The VTR apparatus 601 compresses and codes the video data VIN and audio data AIN input from an external unit by these components according to a compression and coding system, for example, the MPEG system, generates the recorded data, and records the same on a video tape (VTR tape) 514. Further, the VTR apparatus 601 reproduces the recorded data recorded on the VTR tape 614 by the non-tracking system, expands and decodes the same, and outputs the resultant data as the video data VOUT and the audio data AOUT.

Below, each component of the recording unit 610 (FIG. 13) will be explained.

The video data compressing circuit 700 compresses and codes the noncompressed video data VIN input from the editing apparatus or the like connected to an external unit by the MPEG system so that for example two frames constitute one GOP (GROUP OF PICTURE) and outputs the compressed and coded data as the compressed video data of the data rate Nbps to the data packing circuit 702.

Figures 14A, 14B:
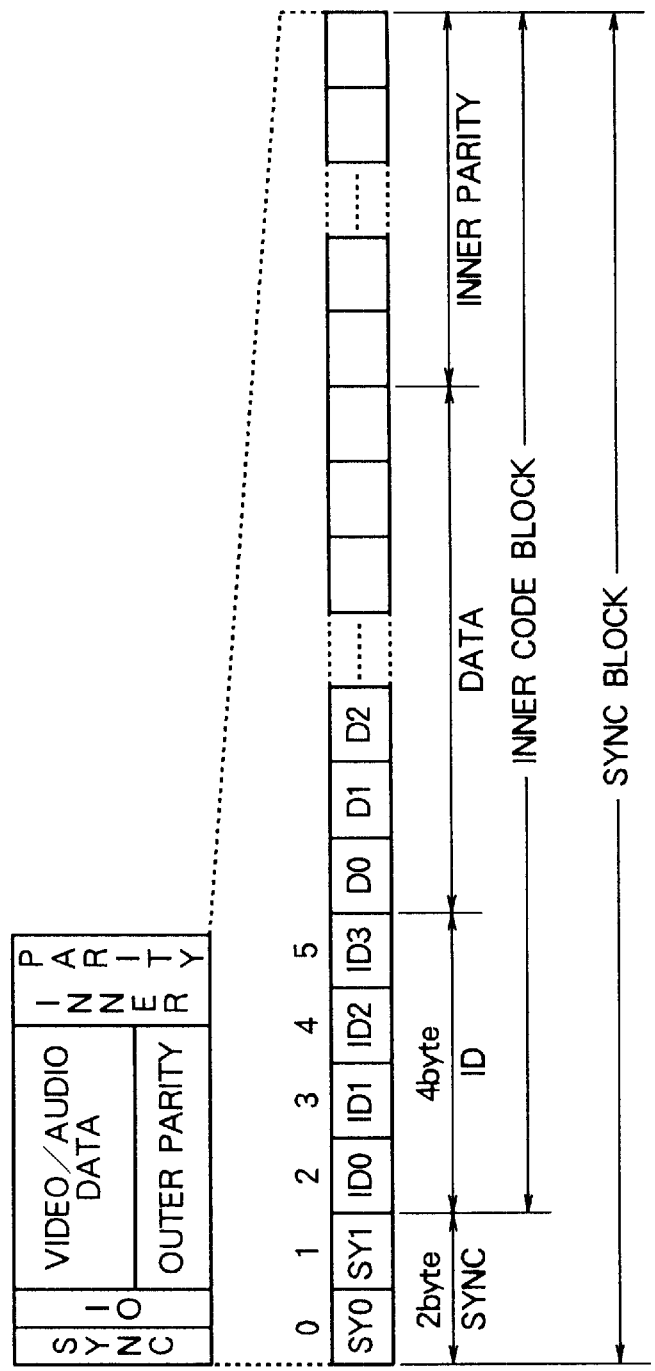
FIGS. 14A and 14B are views of the configuration of a synchronization block of audio and/or video data to be recorded on a VTR tape shown in FIG. 13.

FIG. 14 is a view of the configuration of a synchronization block of the audio and/or video data to be recorded on the VTR tape 614 shown in FIG. 13, in which FIG. 14A shows the structure of the synchronization block after adding synchronization data SYNC, identification data ID, outer code (OUTER PARITY), and inner code (INNER PARITY) to the audio and/or video data (VIDEO/AUDIO DATA) assembled by the data packing circuit 702 shown in FIG. 13; and FIG. 14B shows the data structure of the synchronization block shown in FIG. 14A in the lateral direction (line: SYNC block).

The data packing circuit 702 (FIG. 13) assembles the compressed video data of the data rate Nbps input from the video data compressing circuit 700 and the noncompressed audio data AOUT input from the external unit in units of GOPs, generates the audio and/or video data (VIDEO/AUDIO DATA) in the synchronization block shown in FIG. 14A, and outputs the same to the ECC outer encoder 704.

The ECC outer encoder 704 stores the input audio and/or video data in a memory circuit 706, generates the outer code shown in FIG. 14A with respect to the audio and/or video data, adds this to the audio and/or video data, and outputs the resultant data to the ECC inner encoder 708.

The ECC inner encoder 708 interleaves the audio and/or video data added with the outer code in units of GOPs so that the inner code and outer code (the inner code and the outer code shown in FIG. 14A will be generally referred to as a product code together) exhibits the highest error correction capability, generates the inner code shown in FIGS. 14A and 14B, and adds the same.

Further, the ECC inner encoder 708 generates the synchronization data SYNC of 2 bytes and the identification data ID of 4 bytes (FIGS. 14A and 14B), generates the recorded data of the synchronization block having a structure shown in FIG. 14A, and outputs the same to the recording head unit 612.

Figures 15A, 15B:
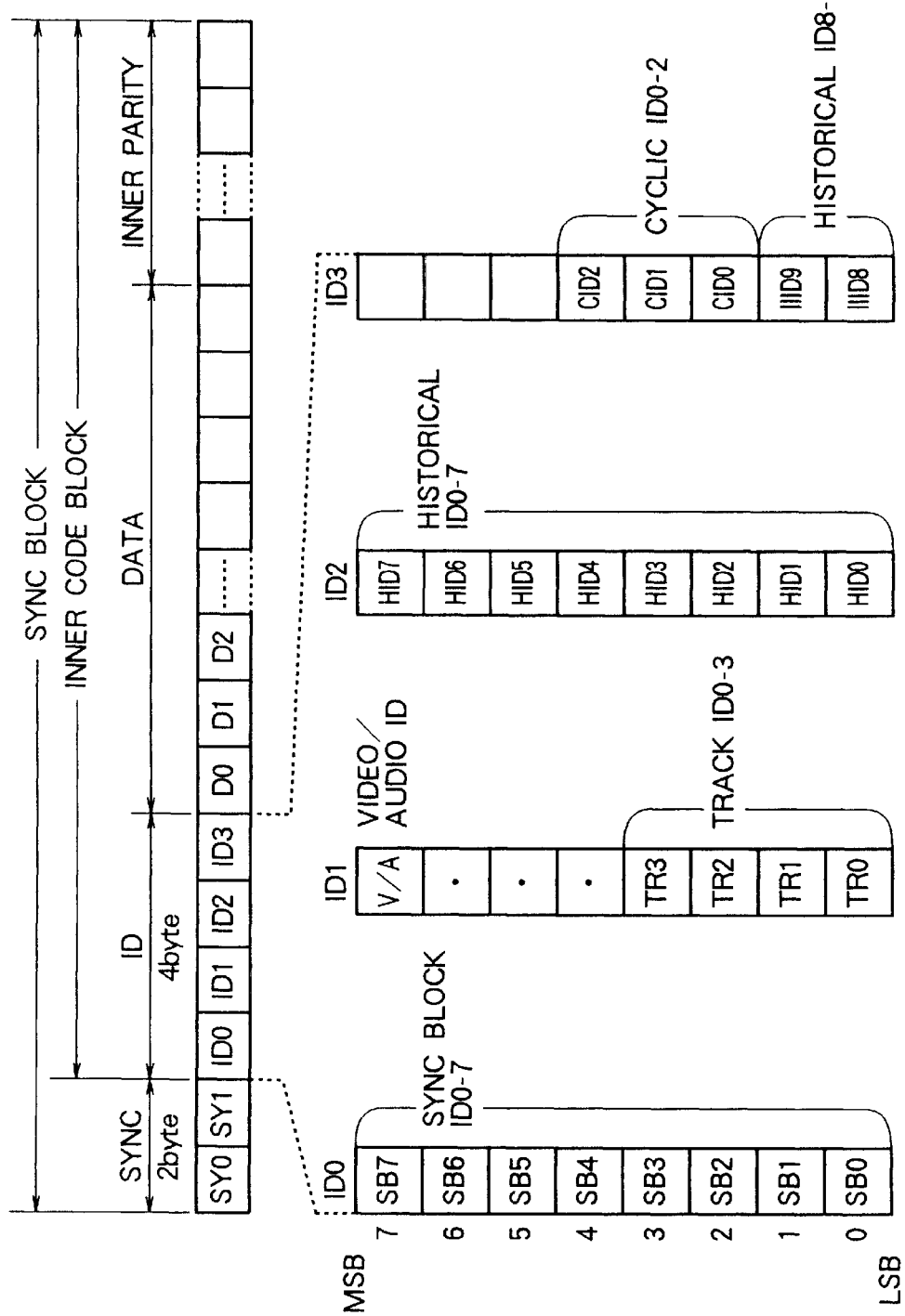
FIGS. 15A and 15B are views showing the data structure of identification data ID shown in FIGS. 14A and 14B.

FIG. 15 is a view showing the data structure of the identification data ID shown in FIG. 14B, in which FIG. 15A corresponds to FIG. 14B and shows the data structure of each line (SYNC block) of the recording format; and FIG. 15B shows the structure of the identification data ID shown in FIG. 15A.

As shown in FIG. 15B, the synchronization block ID (Sync Block ID) indicating the order in the helical track (FIG. 14B) in which the line (SYNC block) is recorded is placed in the first byte (ID0) of the identification data ID.

The audio and/or video data ID (VIDEO/AUDIO DATA) enters into the most significant bit (MSB) of the second byte (ID1) of the identification data ID, and the track ID is placed in the third bit to the least significant bit (LSB).

The audio and/or video data ID indicates whether the data which has been placed in the data region of that line (SYNC block) (DATA: audio and/or video data (VIDEO/AUDIO DATA) or outer code (OUTER PARITY) shown in FIG. 14A) is the audio data or video data, and the track ID indicates the order of the helical track (FIG. 16B) in which that line (SYNC block) is recorded for every GOP.

A historical ID and audio and/or video data ID (VIDEO/AUDIO ID) are placed in the first bit and the least significant bit of the third byte (ID2) and the fourth byte (ID3) of the identification data ID, and a cyclic ID is placed in the fourth bit to second bit of the fourth byte.

The historical ID indicates the history of the processing such as editing applied to the recorded data.

The cyclic ID is incremented in units of GOPs and indicates the order of the audio and/or video data for every eight GOPs.

The recording head unit 612 has two recording heads, modulates the recording data generated by the ECC inner encoder 108, and generates the recording signal, and records the same on the VTR tape 14 at a data rate of J (=R×(L+N), where R is redundancy by addition of the product code and synchronization data SYNC, etc.) per recording head.

FIGS. 16A to 16C is a view showing the recording format when recording data (recording signal: FIG. 14A) on the VTR tape 14 (FIG. 13).

As shown in FIG. 16A, the recording data is recorded over a plurality of helical tracks in units of GOPs. As shown in FIGS. 16B and 16C, a plurality of lines (SYNC blocks) are recorded in each helical track.

Below, the structure of the reproduction unit 620 (FIG. 13) will be explained.

The equalizing unit 624 performs the equalization processing for the recording signal read by each of the two sets of reproducing heads (one set of reproducing heads has two positive azimuth heads and negative azimuth heads) of the reproducing head unit 622, reproduces the recorded data (FIG. 14A), and outputs the same to the inner code correcting unit 626.

Here, only the reproducing heads having the azimuth angle coincident with that of the VTR tape 614 and correctly tracing the helical tracks of the VTR tape 614 (FIG. 16B) among the eight reproducing heads (four positive azimuth heads and four negative azimuth heads) in total of the reproducing head unit 622 can correctly read the recording signal.

Further, the data rate of the recorded data reproduced by the equalizing unit 624 becomes 8 Jbps as a whole where 4×speed reproduction is carried out.

The inner code correcting unit 626 performs the error detection and error correction processing using the inner code (FIG. 14A) with respect to the recorded data input from the equalizing unit 624 and outputs the resultant data to the non-tracking processing unit 628.

Here, the data rate when the recording head unit 612 writes the recorded data on the VTR tape 614 is Jbps as mentioned above. When it is intended to reproduce this recorded data at 4× speed, the data rate of the recorded data to be read by the reproducing head unit 622 becomes 8 Jbps.

The non-tracking processing unit 628 selects the data having the smallest error from among the sets of the recorded data input from the inner code correcting unit 626 and stores the same in the memory unit 630 in units of lines (SYNC blocks).

The non-tracking processing unit 628 arranges the recorded data stored in the memory unit 630 in the arrangement suited to the processing of the outer code correcting unit 632 (performs the deinterleave processing corresponding to the interleave processing in the ECC inner encoder 708 (FIG. 13)) and outputs the resultant data to the outer code correcting unit 632.

The outer code correcting unit 632 performs the error correction with respect to the recorded data by using the outer code (FIG. 14A) contained in the recorded data input from the non-tracking processing unit 628 and outputs the corrected data to the data depacking unit 634.

The data depacking unit 634 demultiplexes the audio and/or video data and identification data ID etc. (FIG. 14B) from the input recorded data and outputs the same to the external unit and the data decimation circuit 638.

The data decimation circuit 638 decimates the video data and audio data from the audio and/or video data input from the data depacking unit 634, outputs the audio data AOUT to the external unit, and outputs the video data to the video data expanding circuit 640. The data decimation circuit 638 is used for taking out one frame's worth of data for every four frames worth of data where for example the VTR apparatus 601 performs 4×speed reproduction and generating audio and/or video data of the same data rate as that in the normal speed reproduction suitable for being displayed on for example a monitor.

The video data expanding circuit 640 expands and decodes the video data input from the data decimation circuit 638 by an expanding and decoding system corresponding to the compressing and coding system of the video data compressing circuit 700 and outputs the expanded and decoded data to the external unit as the video data VOUT.

The controller 600 outputs a recording speed request signal to the AV data input/output controlling circuit 50 shown in FIG. 7 as the control signal S50a. The controller 600 uses this recording speed request signal to notify the data rate of the non-real time audio and/or video data to be recorded in the data recording and reproducing apparatus 3.

The AV data input/output controlling circuit 50 outputs a recording speed authorization signal notifying that recording at the notified data rate is possible to the controller 600 as the control signal S50a.

The AV data input/output controlling circuit 50 receiving the recording speed authorization signal outputs a recording request signal to the recording and reproduction controlling circuit 34 via the control bus 20.

The recording and reproduction controlling circuit 34 receiving the recording request signal searches for the empty recording regions of the storage device 26 and outputs a region assignment signal indicating the recording regions assigned to the audio and/or video data for which the recording was requested to the AV data input/output controlling circuit 50 and the storage device 26.

The AV data Input/output controlling circuit 50 receiving the region assignment signal outputs the recording authorization signal to the controller 600 as the control signals S50a.

The controller 600 receiving the recording authorization signal outputs the recording command signal to the AV data input/output controlling circuit 50 as the control signal S50a. The AV data input/output controlling circuit 50 outputs the received recording command signal to the storage device 26 via the control bus 20.

Further, the controller 600 designates the reproduction speed authorized by the recording speed authorization signal to the processing circuits of the reproduction unit 620 of the VTR apparatus 601 through the control signal S100.

By this, the audio and/or video data reproduced at the designated reproduction speed is output from the data packing unit 634 and the audio and/or video data is supplied to the AV data input/output controlling circuit 50.

The audio and/or video data S50b supplied to the AV data Input/output controlling circuit 50 is output through the data bus 22 to the storage device 26. The storage device 26 records this audio and/or video data S50b.

When the audio and/or video data is recorded in all of the recording regions assigned by the recording and reproduction controlling circuit 34, the storage device 26 outputs the recording completion notification signal to the AV data input/output controlling circuit 50 via the control bus 20.

The AV data input/output controlling circuit 50 receiving the recording completion notification signal outputs the recording completion notification signal to the controller 600.

Note that first, instead of the controller 600 outputting the recording speed request signal to the AV data input/output controlling circuit 50 shown in FIG. 7 as the control signal S50a, it is also possible to have the control signal S50a for designating the recording speed to be supplied from the AV data input/output controlling circuit 50 side to the controller 600 and for the controller to control the processing circuits of the VTR apparatus 601 so as to reproduce the audio and/or video data at that speed.

Below, the recording operation of the VTR apparatus 601 will be explained.

In the recording unit 610, the video data compressing circuit 700 compresses and codes the video data VIN by the MPEG system so that for example 2 frames constitute one GOP.

The data packing circuit 702 assembles the compressed video data input from the video data compressing circuit 700 and the noncompressed audio data AOUT input from the external unit in units of GOPs and generates the audio and/or video data (FIG. 14A).

The ECC outer encoder 704 stores the input audio and/or video data in the memory circuit 706, generates the outer code (FIG. 14A) with respect to the recorded audio and/or video data, and adds the same.

The ECC inner encoder 708 generates the recorded data assembled to the synchronization block (FIG. 16A) by interleaving the audio and/or video data added with the outer code, generating the inner code (FIGS. 14A and 14B), and adding the same and further adding the synchronization data SYNC and the identification data ID (FIGS. 14A and 14B).

The recording head unit 612 modulates the recording data, generates the recording signal, and records the same on the VTR tape 614.

Below, the reproducing operation of the VTR apparatus 601 will be explained.

The equalizing unit 624 performs the equalization processing for the recording signal read from the VTR tape 614 by two sets of reproducing heads of the reproducing head unit 622 and reproduces the recorded data (FIG. 14A).

The inner code correcting unit 626 performs the error detection and error correction processing using the inner code (FIG. 14A) with respect to the reproduced recorded data and outputs the same to the non-tracking processing unit 628.

The non-tracking processing unit 628 selects the data having the smallest error from among the recorded data subjected to the error detection and error correction, stores the same in the memory unit 630 in the unit of lines, and further performs the deinterleave processing.

The outer code correcting unit 632 performs the error correction with respect to the recorded data by using the outer code (FIG. 14A) contained in the recorded data input from the non-tracking processing unit 628.

The data depacking unit 634 demultiplexes the audio and/or video data, the identification data ID, etc. (FIG. 14B) from the error-corrected recorded data.

The data decimation circuit 638 decimates the audio and/or video data to generate the audio and/or video data suitable for display on the monitor.

The video data expanding circuit 640 expands and decodes the video data input from the data decimation circuit 638 and outputs the same as the video data VOUT to the external unit.

As mentioned above, according to the VTR apparatus 601 of the present invention, the recorded data (audio and/or video data) recorded on the VTR tape 614 can be reproduced by the non-tracking system.

When the audio and/or video data is reproduced by the non-tracking system, the conditions regarding the tracking servo control are eased, therefore, other than the multiple speed reproduction of whole multiples such as 2×, 4×, . . . , multiple speed reproduction of any multiple speed, for example, 2.1×, is possible.

Note that, in the sixth embodiment, the explanation was made of a case where the azimuth angle has two values-positive and negative-, but it is also possible to perform the reproduction of the audio and/or video data by further increasing for example the number of azimuth angles and providing the reproducing heads individually corresponding to these azimuth angles in the recording head unit 612 and the reproducing head unit 622.

Further, the positional relationship between the positive azimuth heads and the negative azimuth heads of the reproducing head unit 622 need not always be symmetrical with respect to the center of rotation of the drum 820.

Seventh Embodiment

In the reproduction unit 620 of the VTR apparatus 601 (FIG. 13) shown in the sixth embodiment, the multiple speed of the multiple speed reproduction is limited by the operational speed of the components of the reproduction unit 620. Where for example the operational speed of the components of the reproduction unit 620 is enough to deal with only processing for 2×speed reproduction at most, the reproduction unit 620 cannot perform the high speed reproduction of a multiple speed higher than 2×.

The reproduction unit 650 shown in the second embodiment is used in the VTR apparatus 601 in place of the reproduction unit 620 and is designed to perform high speed reproduction up to n×speed reproduction while keeping the rotational speed of the drum 820 the same as that at the normal speed reproduction.

Figure 17:
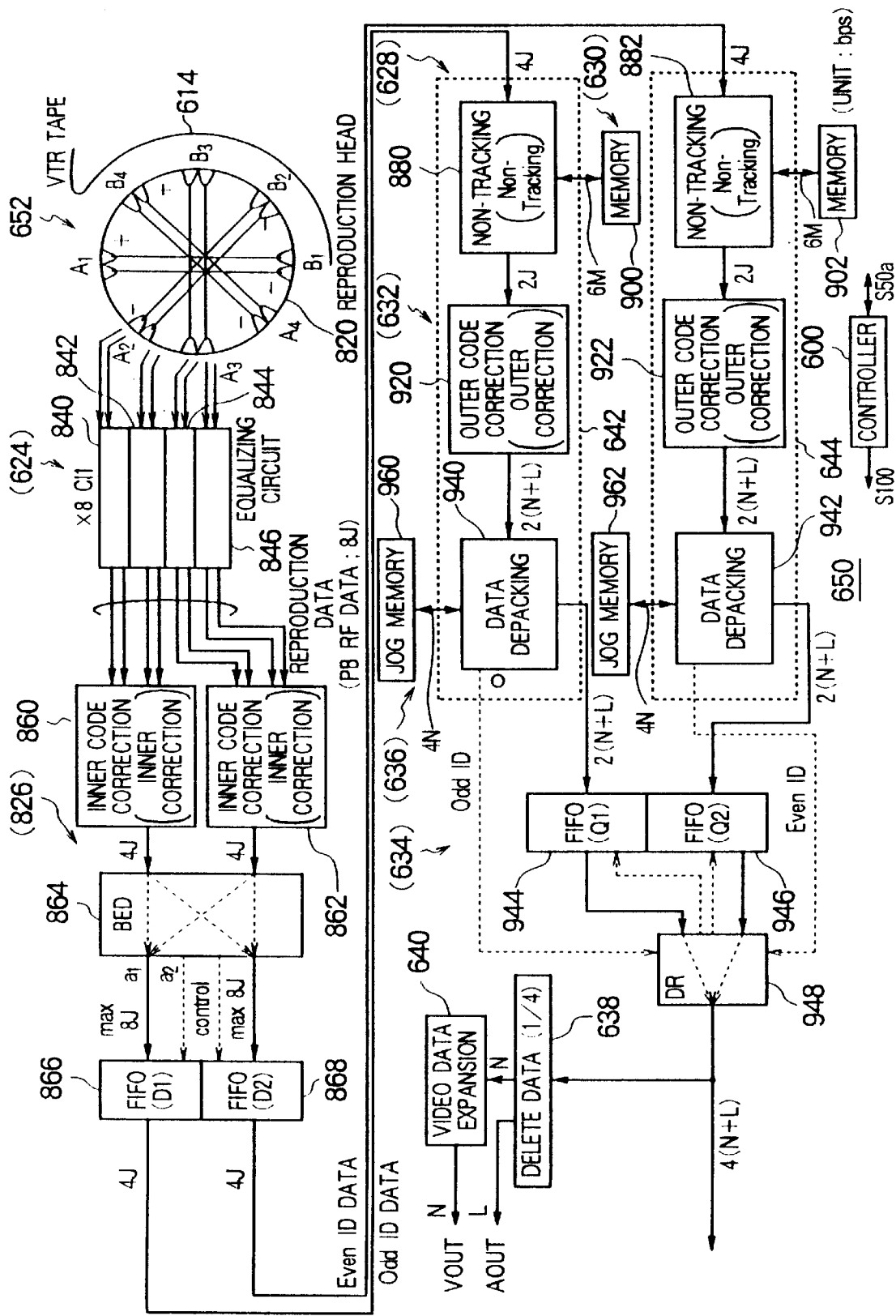
FIG. 17 is a view of the configuration of a reproduction unit according a seventh embodiment of the present invention.

FIG. 17 is a view of the configuration of the reproduction unit 650 according to the seventh embodiment of the present invention.

As shown in FIG. 17, in the seventh embodiment, four equalizing circuits 840, 842, 844, and 846 correspond to the equalizing unit 624 (FIG. 13). Note that, each of the equalizing circuits 840, 842, 844, and 846 has two circuits for two sets of positive azimuth heads and negative azimuth heads of the reproducing head unit 652 (they will be mentioned later referring to FIG. 18), so the equalizing unit 624 adopts an eight circuit structure as a whole. Note that, the positive azimuth heads and the negative azimuth heads of the reproducing heads 824, 826, 828, and 830 will be also referred to collectively as, simply, "reproducing heads".

Note that, the number of the reproducing heads of the reproducing head unit 652 is 16 in total, but the positive azimuth heads and the negative azimuth heads are disposed at symmetrical positions with respect to the center of rotation of the drum 820 (offset by 180 degrees). In addition, the VTR tape 614 is wound around the drum 820 by only the amount of a semicircle, therefore, eight circuits are alternately used whenever the drum 820 rotates by a half circle and are brought into correspondence with 16 reproducing heads, so an increase of the circuit size is suppressed.

The inner code correcting circuit 860 corresponding to each of the equalizing circuits 840 and 842, the inner code correcting circuit 862 corresponding to the equalizing circuits 844 and 846, the buffering and distributing circuit (Time-sharing Buffer, Data distribute: BD circuit) 864, and the FIFO circuits (D1, D2) 866 and 868 correspond to the inner code correcting unit 626 (FIG. 13).

The non-tracking processing circuits 880 and 882 individually corresponding to the FIFO circuits 866 and 868 correspond to the non-tracking processing unit 628 (FIG. 13).

The memory circuits 900 and 902 respectively corresponding to the FIFO circuits 866 and 868 correspond to the memory unit 630 (FIG. 13).

The outer code correcting circuits 920 and 922 respectively corresponding to the non-tracking processing circuits 880 and 882 correspond to the outer code correcting unit 632 (FIG. 13).

The data depacking circuits 940 and 942 respectively corresponding to the outer code correcting circuits 920 and 922, the FIFO circuits (Q1, Q2) 944 and 946, and the data recombining circuit (DR) 948 correspond to the data depacking unit 634 (FIG. 13).

The jog memory circuits 960 and 962 respectively corresponding to the data depacking circuits 940 and 942 correspond to the jog memory unit 636 (FIG. 13).

Note that, as indicated by surrounding dotted lines in FIG. 17, the non-tracking processing circuit 880, the memory circuit 900, the outer code correcting circuit 920, the data depacking circuit 940, and the jog memory circuit 960 constitute the first signal processing unit 642, and the non-tracking processing circuit 882, the memory circuit 902, the outer code correcting circuit 922, the data depacking circuit 942, and the jog memory circuit 962 constitute the seventh signal processing unit 644. The signal processing systems 642 and 644 are constituted so as to process the recorded data in parallel.

Further, the controller 600 controls the reproduction speed of the audio and/or video data in the reproduction unit 650. The control operation of the controller 600 is substantially the same as the operation explained with reference to FIG. 13, so an explanation is omitted.

Figure 18:
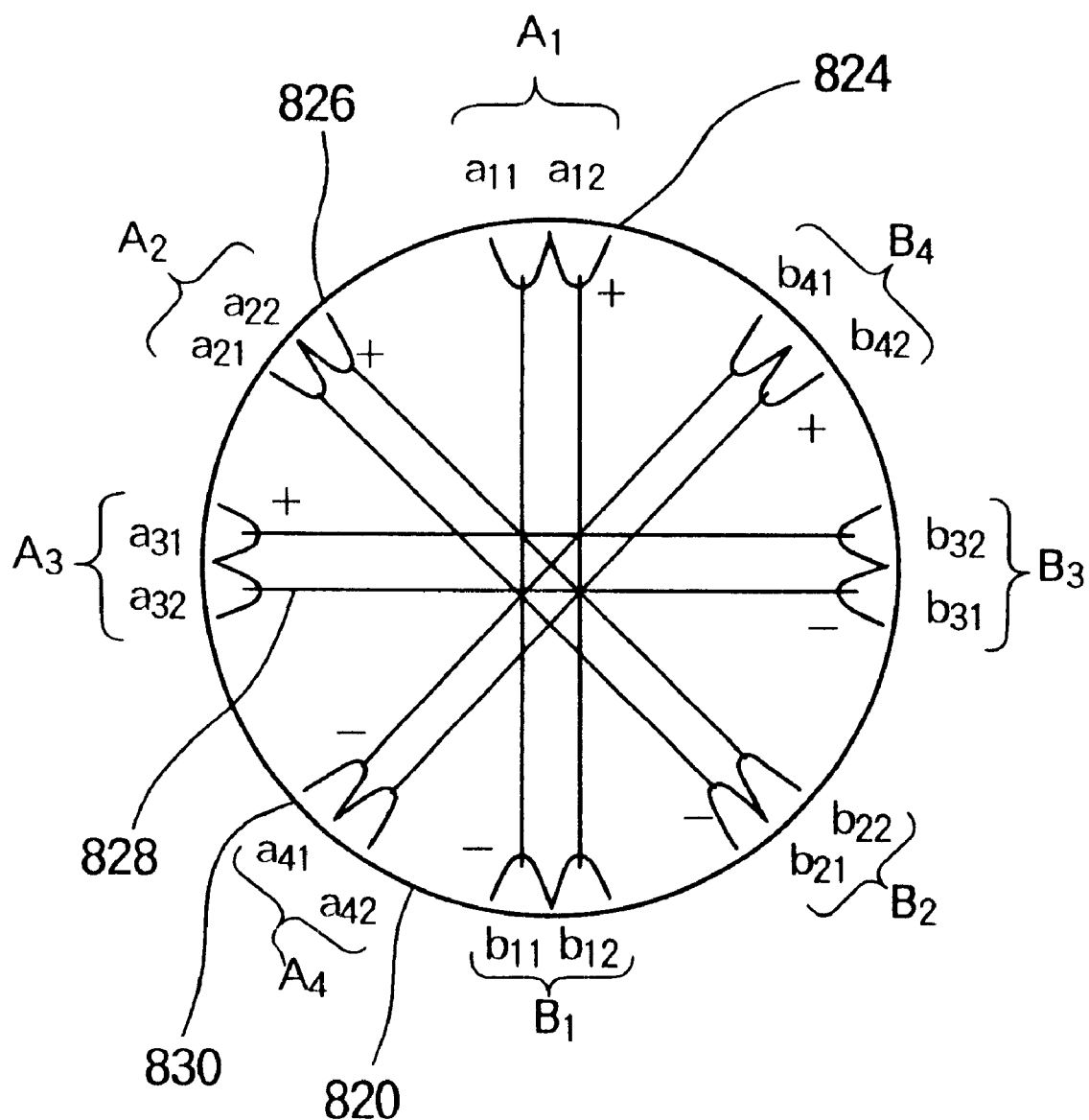
FIG. 18 is view exemplifying the structure of a reproducing head unit shown in FIG. 17 for a case where the number of the reproducing heads is four.

FIG. 18 is a view exemplifying the structure of the reproducing head unit 652 shown in FIG. 17 for a case where the number of the reproducing heads is n (n=4).

In the reproducing head unit 652 (FIG. 17) for the non-tracking system, as shown in FIG. 18, on the tape travelling surface of the drum 820, n (n≧4) number of reproducing heads 824, 826, 828 and 830 are disposed—each having two positive azimuth angle reproducing heads (positive azimuth heads) $a_{11}$, $a_{12}$,($A_1$), $a_{21}$, $a_{22}$ ($A_2$), $a_{31}$, $a_{32}$ ($A_3$) and $a_{41}$, $a_{42}$ ($A_4$) at one helical track's worth of interval of the VTR tape 614 and two negative azimuth angle reproducing heads (negative azimuth heads) $b_{11}$, $b_{12}$ ($B_1$), $b_{21}$, $b_{22}$ ($B_2$), $b_{31}$, $b_{32}$ ($B_3$) and $b_{41}$, $b_{42}$ ($B_4$) at symmetrical positions with the positive azimuth angle reproducing heads $A_1$ to $A_4$ with respect to the center of rotation of for example the drum 820 at one helical track's worth of interval.

In the non-tracking system, by selecting the audio and/or video data having a lower error rate read by the reproducing head with an azimuth angle coincident with that of the helical tracks of the scanned (traced) VTR tape 614 and in addition correctly tracing the helical tracks from among the 16 sets of audio and/or video data in total read from the VTR tape 614 by the four reproducing heads of these reproducing heads 824, 826, 828 and 830 and outputting the same, the tracking control of the reproducing head with respect to the helical tracks is made substantially unnecessary.

Below, the configuration of the reproduction unit 650 (FIG. 17) in the seventh embodiment will be explained.

The equalizing circuits 840, 842, 844, and 846 (equalizing unit 624) perform the equalization processing for the recording signals read by the positive azimuth heads $A_1$ to $A_4$ and negative azimuth heads $B_1$ to $B_4$ (FIG. 6) of the reproducing heads 824, 826, 828, and 830, reproduce the recorded data (FIG. 14A), and output the same to the inner code correcting unit 626.

Here, as mentioned above, only the reproducing head with the azimuth angle coincident with that of the VTR tape 614 and in addition correctly tracing the helical tracks (FIG. 16B) of the VTR tape 614 among the positive azimuth heads $A_1$ to $A_4$ and the negative azimuth heads $B_1$ to $B_4$ of the drum 820 can correctly read the recording signal.

The inner code correcting circuits 860 and 862 (inner code correcting unit 626) have performances sufficient so that error correction processing using the Inner code is possible with respect to recorded data solely reproduced at least 2×speed, that is, recorded data of a data rate of two times the data rate at the normal speed reproduction, process the recorded data input from the reproducing heads 824 and 826 and the reproducing heads 828 and 830 in an 8-bit parallel manner, perform the error detection and error correction processing using the inner code (FIG. 14A) with respect to the recorded data, and output the resultant data to the BD circuit 864.

The BD circuit 864 buffers the recorded data input from the inner code correcting circuit 860 and 62, changes the routing in accordance with the processing, and outputs the resultant data to the FIFO circuits 866 and 868.

Further, the BD circuit 864 controls the buffering operation of the FIFO circuits 866 and 868 via the control signals $a_2$ and $b_2$.

The FIFO circuits 866 and 868 buffer the recorded data input from the BD circuit 864 under the control of the BD circuit 864 and outputs the same to the non-tracking processing circuits 880 and 882, respectively.

The non-tracking processing circuits 880 and 882 (non-tracking processing unit 628) select the data having the smallest error from among the recorded data input from the inner code correcting circuits 860 and 862 and store the same in the memory circuits 900 and 902 in units of lines (SYNC blocks), respectively.

The non-tracking processing circuits 880 and 882 further arrange the recorded data stored in the memory circuits 900 and 902 to an arrangement suited to the processing of the outer code correcting circuits 920 and 922 (perform the deinterleave processing corresponding to the interleave processing in the ECC inner encoder 708 (FIG. 13)) and output the resultant data to the outer code correcting circuits 920 and 922, respectively.

The outer code correcting circuits 920 and 922 perform the error detection and error correction with respect to the recorded data by using the outer code (FIG. 14A) contained in the recorded data input from the non-tracking processing circuits 880 and 882, and output the resultant data to the data depacking circuits 940 and 942, respectively.

The data depacking circuits 940 and 942 demultiplex the audio and/or video data, the identification data ID, etc. (FIG. 14B) from the input recorded data, output the identification data to the data recombining circuit 948, and output the audio and/or video data to the FIFO circuits 944 and 946, respectively (depacking processing).

The FIFO circuits 944 and 946 respectively buffer the audio and/or video data input from the data depacking circuits 940 and 942 and output the buffered data to the data recombining circuit 948.

The data recombining circuit 948 returns the order of the audio and/or video data input from the FIFO circuits 944 and 946 to the original order (order at the time of the recording) by using the cyclic ID of the identification data ID input from the data depacking circuits 940 and 942 and outputs the same to the data decimation circuit 638 (data recombining processing).

The structure and operation of the data decimation circuit 638 and the video data expanding circuit 640 are as explained in the sixth embodiment.

Below, the operation of the reproduction unit 650 will be explained.

Operation at 4×Speed Reproduction

First, an explanation will be made of the operation where the reproduction unit 650 reproduces the recorded data (recording signals) recorded on the VTR tape 614 by the recording unit 610 of the VTR apparatus 601 (FIG. 13) at 4×speed.

FIG. 19 is a timing chart showing the operation timing of the components of the reproduction unit 650 shown in FIG. 17, in which FIG. 19A shows the recording signals reproduced from the VTR tape 614 (FIG. 13) in units of GOPs; FIG. 19B shows an NT pulse signal indicating the boundary of the GOPs of the recording signals shown in FIG. 19A; FIG. 19C shows the timing at which the BD circuit 864 resets the FIFO circuit 866; FIG. 19D shows a WRA signal (control signal $a_2$) defining the timing for writing the recorded data in the FIFO circuit 866 by the BD circuit 864; FIG. 19E shows the timing at which the non-tracking processing circuit 880 reads the recorded data from the FIFO circuit 866; FIG. 19F shows the timing at which the BD circuit 864 resets the FIFO circuit 868; FIG. 19G shows a WRB signal (control signal $b_2$) indicating the timing for defining the timing at which the BD circuit 864 writes the recorded data in the FIFO circuit 868; FIG. 19H shows the timing at which the non-tracking processing circuit 882 reads the recorded data from the FIFO circuit 868; FIG. 19I shows the recorded data output from the non-tracking processing circuit 880; FIG. 19J shows the timing at which the recorded data is output from the non-tracking processing circuit 880; FIG. 19K shows the recorded data output from the non-tracking processing circuit 882; FIG. 19L shows the timing at which the recorded data is output from the non-tracking processing circuit 882; FIG. 19M shows the synchronization signal defining the timing at which the outer code correcting circuits 920 and 922 output the recorded data; FIG. 19N shows the recorded data output from the outer code correcting circuit 920; FIG. 19O shows the recorded data output from the outer code correcting circuit 922; and FIG. 19P shows the audio and/or video data output by the data recombining circuit 948. Note that the asterisks given in FIGS. 19B to 19H and FIGS. 19J and FIG. 19L indicate the corresponding signals have a negative logic.

The tape travelling unit 616 makes the VTR tape 614 travel at a speed four times the speed at the normal speed reproduction. The drum 820 rotates at the same rotational speed as that at the normal speed reproduction to make the four sets of, i.e., eight, positive azimuth heads and four sets of, i.e., eight, negative azimuth heads of the reproducing heads 824, 826, 828, and 830 of the reproducing head unit 652 trace the helical tracks of the VTR tape 614 (FIG. 16B).

As shown in FIG. 19A, in the positive azimuth heads and negative azimuth heads (FIG. 18) of the reproducing heads 824, 826, 828, and 830, the data rate of the recording signals (recorded data) read from the VTR tape 614 becomes gradually high for a while from the start of the travelling and the start of rotation of the drum 820 and becomes constant after the speed of each reaches the target speed.

The quantizing circuits 840, 842, 844, and 846 perform the equalization processing for the read recording signals and reproduce the recorded data.

The inner code correcting circuits 860 and 862 generate the NT pulse signals (FIG. 19B) indicating the boundary of GOPs of the recorded data based on the reproduced recorded data. The components after the inner code correcting circuits 860 and 862 perform the processing in synchronization with this NT pulse signal.

Further, the inner code correcting circuits 860 and 862 perform the error detection processing and error correction processing using the inner code with respect to the reproduced recorded data.

The BD circuit 864 buffers the recorded data subjected to the error detection. Where the number of cyclic ID contained in the recorded data (FIG. 15B) is an even number, it writes the recorded data in the FIFO circuit 866 at a timing shown in FIG. 19D, and where it is an odd number, as shown in FIG. 19C, it resets the FIFO circuit 866 at the rising point of the NT pulse.

Further, the BD circuit 864 buffers the error-detected recorded data. Where the number of cyclic ID contained in the recorded data is an odd number, it writes the recorded data in the FIFO circuit 868 at a timing shown in FIG. 19G, and where it is an even number, as shown in FIG. 19F, it resets the FIFO circuit 868 at the rising point of the NT pulse.

That is, the BD circuit 864 alternately buffers the recorded data in the FIFO circuits 866 and 868 in accordance with whether the number of cyclic ID contained in the recorded data is the odd number or the even number.

Note that, in the BD circuit 864, there is a possibility that the recorded data of 4 Jbps will be continuously output to either one of FIFO circuits 866 and 868 from either of the output terminals $a_1$ and $b_1$, therefore the data rate becomes 8 Jbps at the maximum.

The non-tracking processing circuits 880 and 882 respectively alternately read and buffer the recorded data from the FIFO circuits 866 and 868 at the timings shown in FIGS. 19E and 19H and select the recorded data having a low error rate. The recorded data is alternately read from the FIFO circuits 866 and 868, therefore the data rate of the recorded data read from the FIFO circuits 866 and 868 to the non-tracking processing circuits 880 and 882 becomes 4 Jbps.

The non-tracking processing circuits 880 and 882 select the data having the smallest error from among the recorded data respectively input from the inner code correcting circuits 860 and 862 of the inner code correcting unit 626, store the same in the memory circuits 900 and 902 (perform the non-tracking processing) in units of lines (SYNC blocks), and further perform the deinterleave processing and output the deinterleaved recorded data to the outer code correcting circuits 920 and 922 at the timings shown in FIGS. 19J and 19L (FIGS. 19I and 19K), respectively.

The non-tracking processing circuits 880 and 882 select and output two among the four sets of input recorded data, therefore the data rate between the non-tracking processing circuits 880 and 882 and the outer code correcting circuits 920 and 922 becomes 2 Jbps.

The outer code correcting circuits 920 and 922 perform the error correction processing using the outer code (FIG. 14A) with respect to the deinterleaved recorded data. The redundant part of the recorded data is removed by the outer code correcting circuits 920 and 922, so the data rate between the outer code correcting circuits 920 and 922 and the data depacking circuits 940 and 942 becomes $2 \times (N+L)$ bps.

The data depacking circuits 940 and 942 demultiplex the audio and/or video data from the recorded data, output the identification data (Odd ID, Even ID) to the data recombining circuit 948, and output the audio and/or video data to the FIFO circuits 944 and 946.

Further, if necessary, the data depacking circuits 940 and 942 performs also the jog shuttle reproduction processing etc. by using the jog memory circuits 960 and 962.

The FIFO circuits 944 and 946 respectively buffer the audio and/or video data input from the data depacking circuits 940 and 942 and output the same to the data recombining circuit 948 in synchronization with the synchronization signal shown in FIG. 19M (FIGS. 19N and 19O).

The data recombining circuit 948 returns the order of the audio and/or video data to the order at the time of the recording by using the cyclic ID of the input identification data ID and outputs the resultant data to the external unit and the data decimation circuit 638 with a data rate four times the data rate at the normal speed reproduction (FIG. 19P).

The data decimation circuit 638 decimates the input audio and/or video data in a proportion in accordance with the multiple speed of the multiple speed reproduction, outputs the audio data AOUT to the external unit, and outputs the video data to the video data expanding circuit 640.

Note that, in the case of the 4×speed reproduction, the data decimation circuit 638 decimates ¾ of the input audio and/or video data and generates the audio and/or video data having the same data rate as the data rate at the normal speed reproduction.

The video data expanding circuit 640 expands and decodes the video data, generates the video data VOUT, and outputs the same to the external unit.

An explanation will be further made of the operation speed where 4×speed reproduction is carried out in the reproduction unit 650 constituting components in parallel.

Figures 20A, 20B:
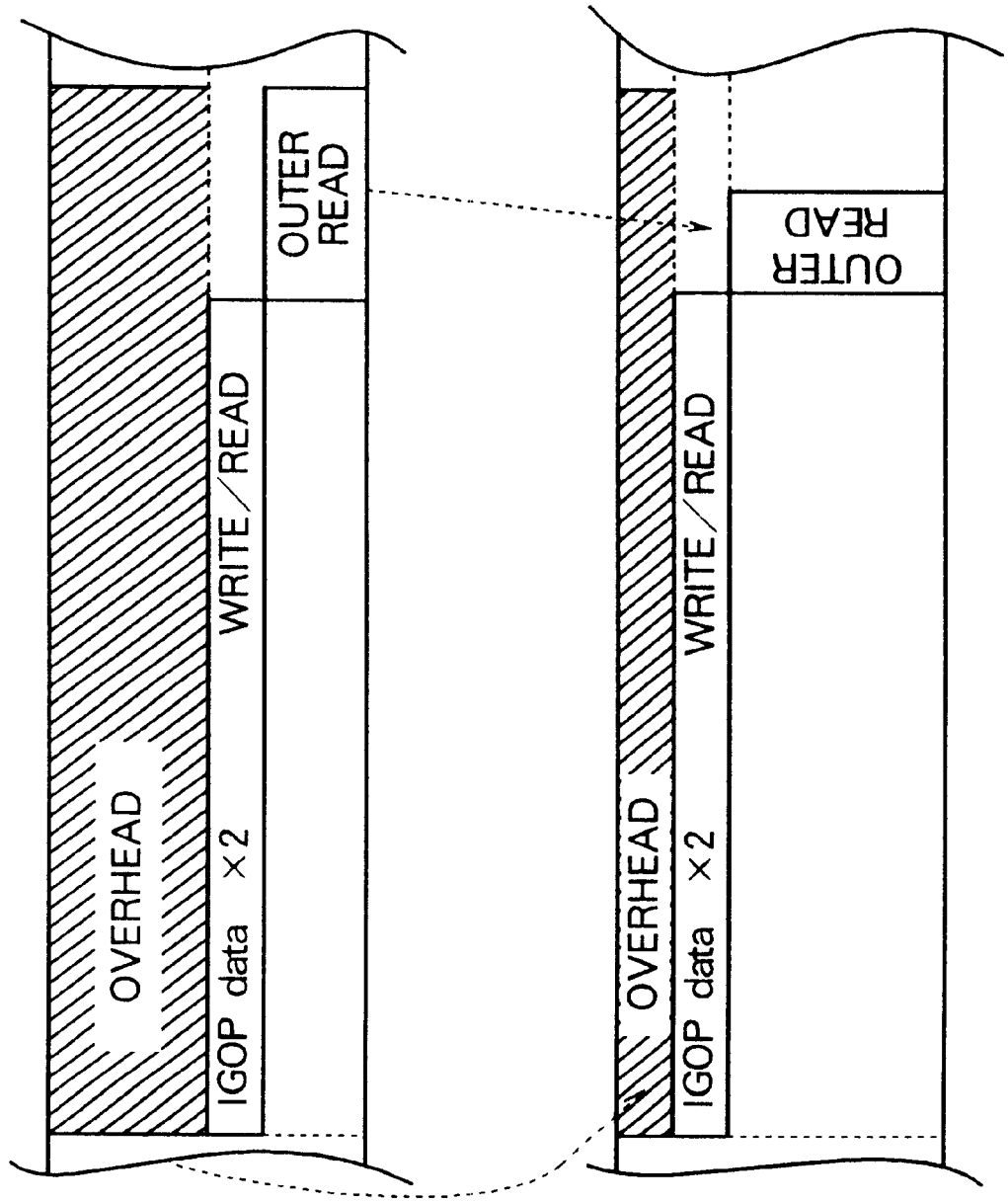
FIGS. 20A and 20B are views showing a relationship between an overhead regarding the non-tracking processing and a bus band width.

FIG. 20 is a view showing a relationship between an overhead regarding the non-tracking processing and a bus band width, in which FIG. 20A shows the relationship between the overhead regarding the non-tracking processing in the bus band width between the non-tracking processing unit 628 and the memory unit 630 in the reproduction unit 620 shown in FIG. 13 and the bus band width usable for reading the recorded data from the memory unit 630 to the outer code correcting unit 632; and FIG. 20B shows the relationship between the overhead regarding the non-tracking processing in the bus band width between the non-tracking processing circuits 880 and 882 and the memory circuits 900 and 902 of the reproduction unit 650 shown in FIG. 17 and the bus band width usable for reading the recorded data from the memory circuits 900 and 902 to the outer code correcting circuits 920 and 922.

The data rate when the recording head unit 612 writes the recorded data on the VTR tape 614 is Jbps as mentioned above. When it is intended to reproduce this recorded data at 4×speed, the data rate of the recorded data to be read by the reproducing head unit 652 becomes 8 Jbps.

On the other hand, the circuit performing the error detection and error correction by the inner code is divided into two systems of the inner code correcting circuits 860 and 862. Further, the inner code correcting circuits 860 and 862 perform the 8-bit parallel processing. Therefore the operation frequency of the inner code correcting circuits 860 and 862 becomes $4 \times J/8$ Hz.

For example, where J is 50 (50 Mbps), the operation frequency of the inner code correcting circuits 860 and 862 becomes $4 \times J/8 = 25$ MHz, and the operation frequency becomes low in comparison with the operation frequency (50 MHz) where the structure of the reproduction unit 620 shown in the sixth embodiment (FIG. 13) is adopted. Accordingly, when the structure (FIG. 17) shown in the seventh embodiment is adopted, the inner code correcting circuits 860 and 862 and other components can be constituted by using for example a usual CMOS logical element, so it is seen that the use of special high speed operating parts is unnecessary.

Further, the operation frequency of the non-tracking processing circuits 880 and 882 becomes 25 MHz under the above conditions. Further, the transfer frequency of the recorded data between the non-tracking processing circuits 880 and 882 and the memory circuits 900 and 902 is kept low, i.e. 12.5 MHz (at the time of 8-bit parallel operation).

When the bus band width of the data bus between the non-tracking processing circuits 880 and 882 and the memory circuits 900 and 902 is set to for example about 75 MHz (75 MBps), which is just a general value, the bus band width usable for reading the recorded data from the memory circuits 900 and 902 to the outer code correcting circuits 920 and 922, by subtracting the bus band width 25 MHz required for writing of the recorded data into the memory circuits 900 and 902, becomes 50 MHz.

Further, as mentioned above, the overhead regarding the non-tracking processing of the bus band width between the non-tracking processing circuits 880 and 882 and the memory circuits 900 and 902 is 12.5 MHz, and it is seen that the data transfer (OUTER READ) from the memory circuits 900 and 902 to the outer code correcting circuits 920 and 922 can be performed in a very short time (FIG. 20B).

On the other hand, where the configuration of the reproduction unit 620 (FIG. 13) is adopted, the overhead regarding the non-tracking processing of the bus band width between the non-tracking processing unit 628 and the memory unit 30 is 25 MHz, and a long time is taken for the data transfer (OUTER READ) from the memory unit 630 to the outer code correcting unit 32 (FIG. 20A).

Figure 21A:
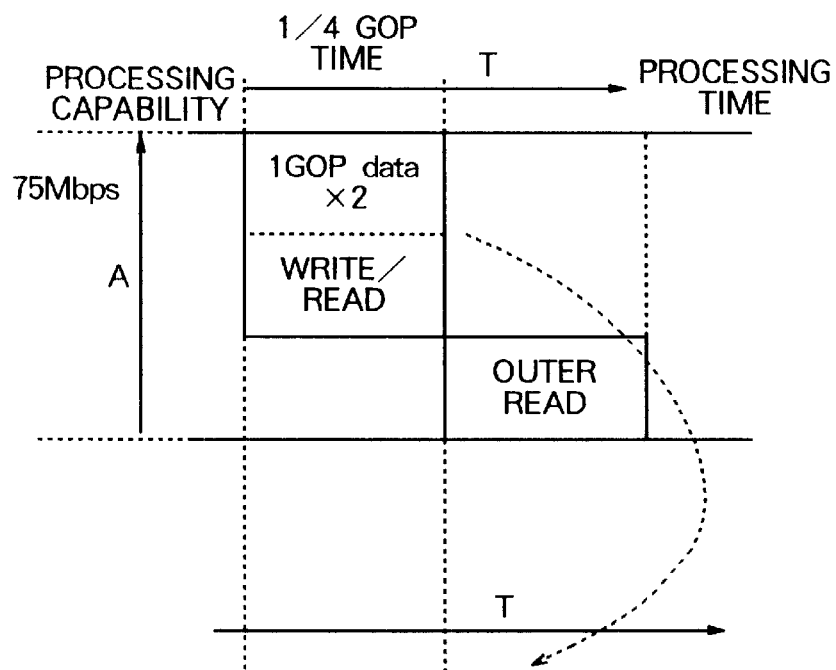
FIGS. 21A and 21B are views showing the relationship between the overhead regarding the non-tracking processing, a processing capability required for the components performing the non-tracking processing, and the bus band width.

FIG. 21 is a view showing the relationship between the overhead regarding the non-tracking processing, the processing capability required for the components for performing the non-tracking processing, and the bus band width, in which FIG. 21A shows the relationship between the overhead regarding the non-tracking processing in the bus band width between the non-tracking processing unit 628 and the memory unit 630 in the reproduction unit 620 shown in FIG. 13 and the processing capability required for the non-tracking processing unit 628; and 21B shows the relationship between the overhead regarding the non-tracking processing in the bus band width between the non-tracking processing circuits 880 and 882 and the memory circuits 900 and 902 in the reproduction unit 650 shown in FIG. 17 and the processing capability required for the non-tracking processing circuits 880 and 882.

Figure 21B:
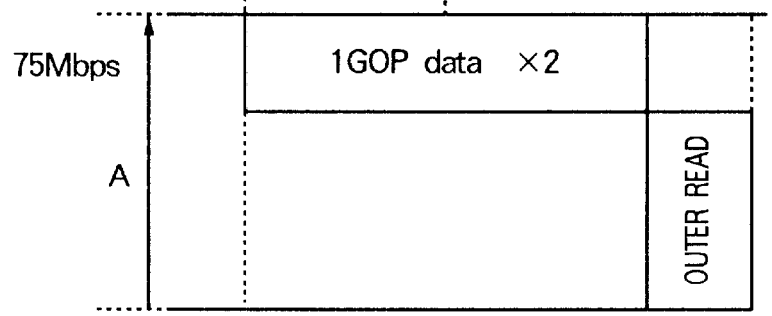

In the reproduction unit 650, ¼ (=12.5 MHz/50 MHz) of the time T (GOP time) required for the processing of one GOP worth of the recorded data is sufficient as the time for transferring one GOP worth of data from the memory circuits 900 and 902 to the outer code correcting circuits 920 and 922, therefore a relatively small processing capability A of the non-tracking processing circuits 880 and 882 is sufficient (FIG. 21B).

On the other hand, in the reproduction unit 620 (FIG. 13), the time for transferring one GOP worth of data from the memory unit 630 to the outer code correcting unit 632 must be ½ of the time T (GOP time) required for the processing of one GOP worth of the recorded data, therefore it is seen that a high processing capability A is required for the non-tracking processing unit 628 (FIG. 21B).

Accordingly, where the non-tracking processing circuits 880 and 882 are constituted by the same parts, a processing operation with more leeway in comparison with the non-tracking processing unit 628 becomes possible, and where the same processing performances are required, the use of general parts having a slower operation speed than that of the non-tracking processing unit 628 becomes possible.

The easing of the operational conditions in the non-tracking processing circuits 880 and 882 by adopting the configuration of the reproduction unit 650. is true also for the other components such as the data depacking circuits 940 and 942.

Operation at Normal Speed Reproduction

Below, an explanation will be made of the operation where the reproduction unit 650 reproduces the recorded data (recording signals) recorded on the VTR tape 614 by the recording unit 610 of the VTR apparatus 601 (FIG. 13) at normal speed.

Figure 22:
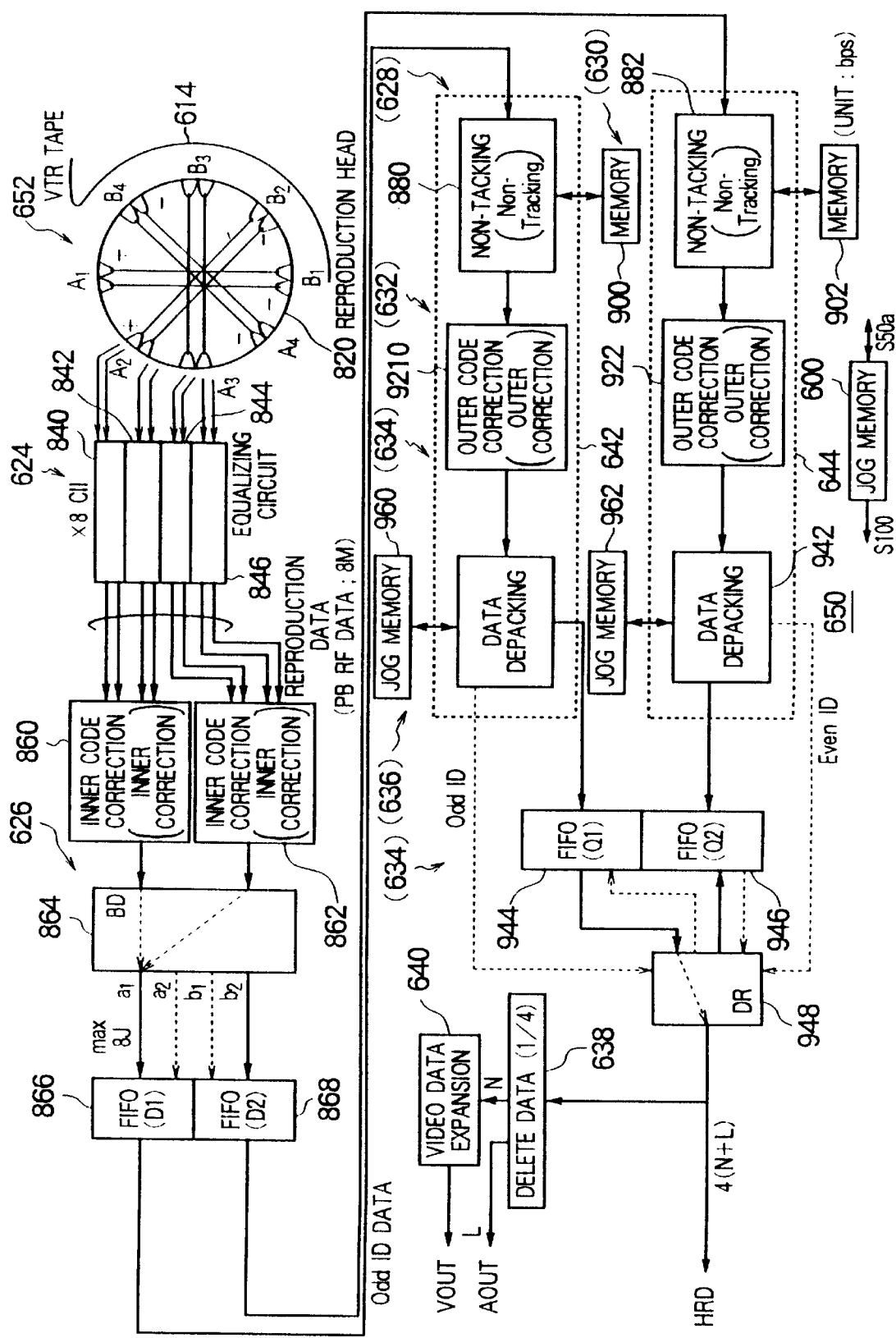
FIG. 22 is a view of the configuration of a case where the reproduction unit shown in FIG. 17 reproduces the recorded data at normal speed.

FIG. 22 is a view of the configuration where the reproduction unit 650 shown in FIG. 13 reproduces the recorded data at normal speed.

As shown in FIG. 22, where the reproduction unit 650 reproduces the recorded data at normal speed (usual reproduction speed), for example, the BD circuit 864 performs the routing so that also the recorded data input from either of the inner code correcting circuits 860 and 862 are output to the FIFO circuits 866 and 868, only the signal processing system 642 and FIFO circuit 944 operate, and the signal processing system 644 and the FIFO circuit 946 do not perform the processing.

Where the reproduction is carried out at normal speed, only the recording signal read by for example the reproducing head 824 among the reproducing heads 824, 826, 828, and 830 of the reproducing head unit 652 (FIG. 18) is used.

The tape travelling unit 616 makes the VTR tape 614 travel at the speed at the time of normal speed reproduction, while the drum 820 rotates at the rotational speed at the time of normal speed reproduction.

The equalizing circuit 840 equalizes the recording signal read by the reproducing head 824 and reproduces the recorded data.

The inner code correcting circuit 860 performs the error detection and the error correction using the inner code with respect to the recorded data.

The BD circuit 864 buffers the recorded data and outputs the same via the FIFO circuit 866 to the signal processing system 642.

The signal processing system 642 performs the non-tracking processing and the error correction and depacking processing using the outer code with respect to the recorded data and outputs the resultant data via the FIFO circuit 944 to the data recombining circuit 948.

The data recombining circuit 948 performs the data recombining processing and outputs the audio and/or video data of the normal speed to the external unit.

Note that, for example, it is also possible to read the recorded data from the VTR tape 614 by using not only the reproducing head 824, but also the reproducing heads 826 and 828, reproduce three sets of recorded data by using the signal processing systems 642 and 644 in parallel, and take a majority decision so as to enhance the reliability of the recorded data.

Operation at 2×Speed Reproduction

Below, an explanation will be made of a case where the reproduction unit 650 reproduces the recorded data (recording signals) recorded on the VTR tape 614 by the recording unit 610 of the VTR apparatus 601 (FIG. 13) at 2×speed.

Even in a case where the recorded data is reproduced at 2×speed, as shown in FIG. 22, for example, the BD circuit 864 performs the routing so as to output also the recorded data input from either of the inner code correcting circuits 860 and 862 to the FIFO circuits 866 and 868, only the signal processing system 642 and the FIFO circuit 944 operate, and the signal processing system 644 and the FIFO circuit 946 do not perform the processing.

Where the reproduction is carried out at normal speed, only the recording signals read by for example the reproducing heads 824 and 826 among the reproducing heads 824, 826, 828, and 830 of the reproducing head unit 652 (FIG. 18) are used.

The tape travelling unit 616 makes the VTR tape 614 travel at a speed two times the speed at the normal speed reproduction, while the drum 820 rotates at the rotational speed at the time of normal speed reproduction.

The equalizing circuits 840 and 842 respectively equalize the recording signals read by the reproducing heads 824 and 826 and reproduce the recorded data.

The inner code correcting circuit 860 performs the error detection and the error correction using the inner code with respect to the recorded data.

The BD circuit 864 buffers the recorded data and outputs the same via the FIFO circuit 866 to the signal processing system 642.

The signal processing system 642 performs the non-tracking processing and the error correction and depacking processing using the outer code with respect to the recorded data and outputs the resultant data via the FIFO circuit 944 to the data recombining circuit 948.

Note that, the inner code correcting circuit 860, the BD circuit 864 and the signal processing system 642 can respectively solely operate at the processing speed regarding the 2×speed reproduction as mentioned above.

The data recombining circuit 948 performs the data recombining processing and outputs the audio and/or video data of the normal speed to the external unit.

Note that, for example, similar to the case where the normal speed reproduction is carried out, it is also possible to read the recorded data from the VTR tape 614 by using not only the reproducing heads 824 and 826, but also the reproducing heads 828 and 830, reproduce each two same recorded data by using the signal processing systems 642 and 644 in parallel, and take a coincidence of these recording data so as to enhance the reliability of the recorded data.

Operation at Head Clog

Below, an explanation will be made of an operation (countermeasure) where a head clog is caused in a reproducing head when the reproduction unit 650 performs the normal speed reproduction.

For example, as mentioned above, there is sometimes a problem when the recorded data is reproduced by using the reproducing head 824 when the reproducing head 824 clogs and thus the recorded data can not be normally reproduced.

When the head clog occurs in the reproducing head 824, the error rate of recorded data detected at the inner code correcting circuit 860 becomes high.

In such a case, for example, where both of the error rates of the two recorded data detected at the outer code correcting circuit 920 exceed a constant threshold value, the reproducing heads 826, 828, and 830 are sequentially used in place of the reproducing head 824 to read the recorded data (recording signals) is read and carry out the reproduction processing.

By constituting the reproduction unit 650 in this way, even if a head clog is caused in one of the reproducing heads 824, 826, 828, and 830, the recorded data can be correctly reproduced.

Operation at Jog Shuttle Reproduction

Below, an explanation will be made of the operation of shuttle reproduction for the recorded data from the VTR tape 614 (FIG. 13) by the reproduction unit 650.

Here, shuttle reproduction means a reproduction method enabling the VTR tape to travel at any speed (m times; m is not equal to 1) different from the travelling speed for reproducing the recorded data from the VTR tape 614 at normal speed and using only one reproducing head to reproducing as much of the audio and/or video data as possible. This is different from the multiple speed reproduction in which all of the audio and/or video data must be reproduced. Note that, a case of $1 \geq |m|$ will be particularly referred to as jog reproduction, and a case where $1 < |m|$ will be particularly referred to as shuttle reproduction.

The tape travelling unit 616 makes the recorded data run from the VTR tape 614 at any speed. Only the reproducing head 824 is used. The drum 820 rotates at a rotational speed corresponding to the tape running speed and makes the reproducing head 824 (FIG. 18) of the reproducing head unit 52 scan the helical tracks of the VTR tape 614.

Below, an explanation will be made of a case where m >>1, for example, m is equal to about 20.

The reproducing head 824 reads the recording signal from the VTR tape 614.

The equalizing circuit 840 performs the equalization processing for the read recording signal and reproduces the recorded data.

The inner code correcting circuit 860 performs the error detection processing and error correction processing using the inner code with respect to the reproduced recorded data.

The BD circuit 864 outputs all of the recorded data for which the error correction etc. were carried out, so as to enable as long a string of GOPs as possible to input to the non-tracking processing circuits 880 and 882, up to the limit of the processing capability of the non-tracking processing circuits 880 and 882, to the non-tracking processing circuit 880 via the FIFO circuit 866.

That is, where for example the non-tracking processing circuit 880 has a capability of processing k number (k>1) of GOPs worth of recorded data within one GOP time (FIG. 21), the BD circuit 864 outputs k number of continuous, correlated GOPs worth of the recorded data to the non-tracking processing circuit 880 for every GOP time and abandons the recorded data which cannot be processed by the non-tracking processing circuit 880.

The non-tracking processing circuit 880 sequentially buffers the k number of GOPs worth of recorded data input via the FIFO circuit 866, selects the recorded data having a low error rate, and performs the deinterleave processing with respect to the selected recorded data.

The outer code correcting circuit 920 performs the error correction processing using the outer code (FIG. 14A) with respect to the deinterleaved recorded data.

The data depacking circuit 940 demultiplexes the audio and/or video data etc. from the recorded data, buffers the same in the jog memory circuit 960, and outputs this via the FIFO circuit 944 to the data recombining circuit 948.

The data recombining circuit 948 bypasses the audio and/or video data to be input in the case of the jog shuttle reproduction and outputs this to the data decimation circuit 638.

Also the data decimation circuit 638 bypasses the audio and/or video data to be input in the case of the jog shuttle reproduction, outputs the audio data AOUT to the external unit, and outputs the video data to the video data expanding circuit 640.

In this way, in accordance with the processing capability of the non-tracking processing circuit 880, by supplying the recorded data of continuous GOPs to the non-tracking processing circuit 880, the recorded data (audio and/or video data) of k number of correlated GOPs is continuously output to the external unit.

When the processing mentioned here is not carried out, but the jog shuttle reproduction is carried out, random audio and/or video data not correlated with each other will be output to the external unit, and the quality of the audio and/or video data is remarkably lowered.

However, as mentioned here, by constituting the reproduction unit 650 so as to output the audio and/or video data of continuous GOPs as much as possible to the external unit, a larger amount of audio and/or video data having a large correlation obtained by performing the jog shuttle reproduction can be reproduced, and the quality of the reproduced audio and/or video data can be improved.

Note that, as m, any positive or negative value can be used.

Further, for example, where −1<m<1 is set, by making the inner code correcting circuit 860 and the signal processing system 642 etc. perform the same processing as that in the normal speed reproduction and repeatedly outputting the audio and/or video data buffered to the jog memory circuit 960, the audio and/or video data lost since the multiple speed m was set to be smaller than 1 may be supplemented. Note that it does not matter if the components of the VTR apparatus 601 and reproduction units 620 and 650 shown in the above explained embodiments are constituted by software or constituted by hardware so far as they can realize the same facility and performances.

Further, the number of the reproducing heads of the reproducing head unit 652 given was only an example.

Further, by suitably performing the control with respect to the components of the tape travelling unit 616, drum 820, and reproduction unit 650 of the VTR apparatus 601, particularly the jog memory circuits 960 and 962, multiple speed reproduction of a non-whole multiple speed, for example, 2.1×, is also possible in addition to multiple speed reproduction of a whole multiple speed.

In the above data reproducing apparatus (VTR apparatus 601 and reproduction units 620 and 650), the conditions placed on the operational speed of the components are easier, therefore, when developing the VTR apparatus 601, it is not necessary to use special high speed operating parts. Accordingly, step-by-step development is possible, for example, proceeding with development using general parts and, when the high speed operating parts become cheap and more readily available, replacing the components constituted by general parts by them so as to further improve the performance. Further, research and development costs are lower as well.

Further, according to the above data reproducing apparatus, even when providing a model able to perform only usual reproduction (normal speed reproduction) with a multiple speed reproduction (high speed reproduction) facility, especially high costs are not necessary, therefore greater system flexibility can be provided.

Further, according to the above data reproducing apparatus, even if a head clog is caused in a reproducing head, no inconvenience occurs in the usual reproduction.

In addition, according to the above data reproducing apparatus, the quality of the audio and/or video data obtained by the jog shuttle reproduction can be improved.

Also, according to the above data reproducing apparatus, there can be provided a non-tracking type data reproducing apparatus (VTR apparatus) which can perform multiple speed reproduction while using mechanical parts with a precision equivalent to that of a VTR apparatus for performing normal speed reproduction.

Further, according to the above data reproducing apparatus, there can be provided a non-tracking type data reproducing apparatus which can perform multiple speed reproduction without the use of special high speed operating parts in the equalization processing circuit or error correction processing circuit, etc.

Further, according to the above data reproducing apparatus, the performances of other special reproduction processing facilities, for example, the jog shuttle reproduction facility, can be enhanced by actively using the components used for realizing the multiple speed reproduction.

INDUSTRIAL APPLICABILITY

The video data recording and reproducing apparatus, audio and/or video data recording and reproducing apparatus and its system, and data recording apparatus can be used for editing systems used in editing work of videos in television broadcasting stations etc. and for server systems for storing and managing audio and/or video data.

What is claimed is:

1. An audio and/or video data recording and reproducing apparatus comprising:

recording and reproducing means for recording and reproducing audio and/or video data;

first input/output controlling means for receiving a control input signal from an external unit and inputting and outputting the audio and/or video data of a first data rate with the recording and reproducing means in accordance with the received control input signal;

second input/output controlling means for receiving the control input signal and inputting and outputting the audio and/or video data of a second data rate higher than the first data rate with the recording and reproducing means in accordance with the received control input signal; and recording and reproduction controlling means for transmitting and receiving a predetermined control signal to and from at least the first input/output controlling means and the second input/output controlling means and controlling the input/output controlling means of the first input/output controlling means and the second input/output controlling means;

said recording and reproduction controlling means having recording region assigning means for receiving a notification of a recording request signal requesting the recording of the input audio and/or video data input from the external unit to the recording and reproducing means from the first input/output controlling means and the second input/output controlling means and assigning the recording regions of the recording and reproducing means in which the input audio and/or video data is to be recorded and recording region notifying means for notifying the first input/output controlling means and the second input/output controlling means of the recording region notification signal indicating the recording regions of the recording and reproducing means assigned to the input audio and/or video data, and wherein each of the first input/output controlling means and the second input/output controlling means has recording request notifying means for notifying the recording and reproduction controlling means of the recording request signal from the external unit and recording controlling means for receiving the recording region notification signal and controlling the recording and reproducing means and making the same record the input audio and/or video data in the recording regions of the recording and reproducing means indicated by the received recording region notification signal.

2. An audio and/or video data recording and reproducing apparatus as set forth in claim 1, where the recording and reproducing control means has a recording region searching means for receiving the notification of the reproduction request signal requesting the reproduction of the audio and/or video data recorded in the recording and reproducing means and output of the same to the external unit from the input/output controlling means and searching for the reproduction regions of the recording and reproducing means in which the audio and/or video data for which the reproduction was requested is recorded and a reproduction region notifying means for notifying the first input/output controlling means of the reproduction region notification signal indicating the reproduction regions of the recording and reproducing means found as a result of search;

each of the first input/output controlling means and the second input/output controlling means has a recording and reproduction notifying means for receiving the reproduction request signal from the external unit and notifying the recording and reproduction controlling means of the same, a reproduction controlling means for receiving the reproduction region notification signal from the reproduction region notifying means of the recording and reproduction controlling means and controlling the recording and reproducing means, reproducing the input audio and/or video data from the reproduction regions of the recording and reproducing means indicated by the received reproduction region notification signal, and outputting the same to the external unit, and an ending notifying means for receiving an audio and/or video data ending signal indicating the ending of the audio and/or video data for which the reproduction was requested from the recording and reproducing means and notifying the external unit of the same; and the recording and reproducing means has an audio and/or video data ending means for notifying the first input/output controlling means of the audio and/or video data ending signal indicating the ending of the audio and/or video data when the reproduced audio and/or video data is ended.

3. An audio and/or video data recording and reproducing apparatus as set forth in claim 1, where the first input/output controlling means, the second input/output controlling means, and the recording and reproducing means are connected via a same data bus and the first input/output controlling means, the second input/output controlling means, and the recording and reproducing means are connected via the same control bus.

4. An audio and/or video data recording and reproducing apparatus as set forth in claim 1, where the recording and reproducing means records and reproduces audio and/or video data with respect to a recording medium capable of recording and reproducing audio and/or video data of a base band of the first data rate.

5. An audio and/or video data recording and reproducing system having a plurality of audio and/or video data recording and reproducing apparatuses;

each of the audio and/or video data recording and reproducing apparatuses having a recording and reproducing means for recording and reproducing the audio and/or video data, a first input/output controlling means for receiving a control input signal from the external unit and inputting and outputting audio and/or video data of a first data rate with the recording and reproducing means in accordance with the received control input signal, a second input/output controlling means for receiving a control input signal and inputting and outputting audio and/or video data of a second data rate higher than the first data rate with the recording and reproducing means in accordance with the received control input signal, and a recording and reproduction controlling means for transmitting and receiving a predetermined control signal to and from at least the first input/output controlling means and the second input/output controlling means and controlling the first input/output controlling means and the second input/output controlling means;

the recording and reproduction controlling means having a recording region assigning means for receiving a notification of a recording request signal requesting the recording of the input audio and/or video data input from the external unit to the recording and reproducing means from the first input/output controlling means and the second input/output controlling means and assigning recording regions of the recording and reproducing means in which the input audio and/or video data is to be recorded and a recording region notifying means for notifying the first input/output controlling means and the second input/output controlling means of the recording region notification signal indicating the recording regions of the recording and reproducing means assigned to the input audio and/or video data; and each of the first input/output controlling means and the second input/output controlling means having a recording request notifying means for notifying the recording and reproduction controlling means of the recording request signal from the external unit and a recording controlling means for receiving the recording region notification signal and controlling the recording and reproducing means and making the same record the input audio and/or video data in the recording regions of the recording and reproducing means indicated by the received recording region notification signal; and the second input/output controlling means of the plurality of audio and/or video data recording and reproducing apparatuses are connected, and the audio and/or video data of the second data rate is transmitted and received between these audio and/or video data recording and reproducing apparatuses.

6. A data reproducing apparatus having a rotary drum, n (n>2) number of data reading head means disposed on an outer peripheral surface of the rotary drum and a data reproducing means for reproducing recorded data alternately recorded on helical tracks of the tape recording medium at a first azimuth angle and a second azimuth angle by using identification data recorded on the helical tracks and indicating an order of the recorded data, in which the rotary drum rotates at a constant rotational speed to make the n number of data readings each of the n number of data reading head means has two first reproducing heads which scan the helical tracks given the first azimuth angle and a helical track separated by one track distance and read the recorded data and the identification data and two second reproducing heads which scan the helical tracks given the first azimuth angle and a helical track separated by one track distance and read the recorded data and the identification data;

the data reproducing means has an error detecting means for detecting the error of each of the identification data and the recorded data read by the n number of data reading head means, a data selecting means for selecting each recorded data having the smallest error from among the recorded data read by each of the n number of data reading head means, and a data arranging means for arranging the recorded data selected based on the identification data corresponding to each of the selected recorded data in the order of the time of the recording and outputting the same.

7. A data reproducing apparatus as set forth in claim 6, wherein the data reproducing means has a plurality of error detecting means which are provided individually corresponding to the n number of data reading head means or parts and detect the error of each of the recorded data read by the respectively corresponding data reading head means and a plurality of data selecting means which are provided individually corresponding to the n number of data reading head means or parts and select the recorded data having the smallest error from among the recorded data whose error was detected by the respectively corresponding error detecting means; and the data arranging means arranges and outputs the recorded data selected by each of the n number of data selecting means in the order of the time of recording based on the corresponding identification data.

8. A data reproducing apparatus as set forth in claim 7, wherein the tape recording medium travels at a travelling speed of m times ($2 \leq |m| \leq n$) the travelling speed when reproducing the recorded data at normal speed;

the rotary drum rotates at a rotational speed corresponding to the travelling speed of the tape recording medium when reproducing the recorded data at normal speed to make the n number of data reading head means scan the helical tracks;

the n number of data reading head means scanning the helical tracks read the recorded data and the identification data from each of the scanned helical tracks; and the data reproducing means arranges the recorded data read by the m number of data reading head means among the n number of data reading head means in the order of the time of the recording based on the corresponding identification data and outputs the recorded data at m×speed.

9. A data reproducing apparatus as set forth in claim 7, wherein the recorded data is audio and/or video data;

the tape recording medium travels at a travelling speed different from the travelling speed when reproducing the audio and/or video data at normal speed;

the rotary drum rotates at a rotational speed corresponding to the travelling speed of the tape recording medium to makes all or one part of the n number of data reading head means scan the helical tracks;

each of the data reading head means scanning the helical tracks reads the audio and/or video data and the identification data from each of the scanned helical tracks;

the data reproducing means further has a buffering means for buffering the audio and/or video data arranged in the order of the time of recording and outputting the same; and the audio and/or video data read by the data reading head means scanning the helical tracks is sequentially output to perform jog shuttle reproduction.

* * * * *